(12) United States Patent
Oyama et al.

(10) Patent No.: US 11,395,208 B2
(45) Date of Patent: Jul. 19, 2022

(54) MOBILITY INFORMATION PROVISION SYSTEM FOR MOBILE BODIES, SERVER, AND VEHICLE

(71) Applicant: SUBARU CORPORATION, Tokyo (JP)

(72) Inventors: Hajime Oyama, Tokyo (JP); Tomoyuki Kitamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/118,170

(22) Filed: Dec. 10, 2020

(65) Prior Publication Data

US 2021/0204188 A1 Jul. 1, 2021

(30) Foreign Application Priority Data

Dec. 30, 2019 (JP) .............................. JP2019-240029
Dec. 30, 2019 (JP) .............................. JP2019-240030
(Continued)

(51) Int. Cl.
*H04W 36/32* (2009.01)
*H04W 36/14* (2009.01)
(Continued)

(52) U.S. Cl.
CPC .......... *H04W 36/32* (2013.01); *H04W 36/14* (2013.01); *H04W 48/18* (2013.01); *H04W 84/005* (2013.01)

(58) Field of Classification Search
CPC ..... H04W 36/14; H04W 36/32; H04W 48/18; H04W 84/005
(Continued)

(56) References Cited

U.S. PATENT DOCUMENTS

2011/0054716 A1 3/2011 Stahlin et al.
2012/0271544 A1* 10/2012 Hein ................... G01C 21/3407
701/423
(Continued)

FOREIGN PATENT DOCUMENTS

EP 3 543 864 A1 9/2019
JP 2019-212095 A 12/2019
(Continued)

OTHER PUBLICATIONS

Extended European Search Report issued in corresponding European Patent Application No. 20217640.0-1213, dated Mar. 30, 2021.
(Continued)

*Primary Examiner* — Joel Ajayi
(74) *Attorney, Agent, or Firm* — McDermott Will & Emery LLP

(57) ABSTRACT

A mobility information provision system, for mobile bodies, includes terminal devices and communication apparatuses. The terminal devices are usable in respective mobile bodies. The communication apparatuses are provided in respective predetermined zones or sections in which the mobile bodies are to move. The communication apparatuses are each configured to communicate with the terminal device used in a mobile body moving in the predetermined zone or section of which the communication apparatus is in charge, out of the mobile bodies. The communication apparatuses are each configured to transmit information to the terminal device used in the mobile body moving in the predetermined zone or section of which the communication apparatus is in charge. The information to be transmitted includes information used to determine movement of corresponding one of the mobile bodies or information used to control the movement of the corresponding one of the mobile bodies.

18 Claims, 19 Drawing Sheets

(30) Foreign Application Priority Data

Dec. 30, 2019 (JP) .............................. JP2019-240031
Aug. 31, 2020 (JP) .............................. JP2020-145304

(51) Int. Cl.
*H04W 48/18* (2009.01)
*H04W 84/00* (2009.01)

(58) Field of Classification Search
USPC .................................................. 455/436–448
See application file for complete search history.

(56) References Cited

U.S. PATENT DOCUMENTS

| | | |
|---|---|---|
| 2017/0371349 A1 | 12/2017 | Kim et al. |
| 2018/0299274 A1* | 10/2018 | Moghe .................... H04W 4/44 |
| 2018/0299285 A1 | 10/2018 | Morita |
| 2019/0028862 A1 | 1/2019 | Futaki |
| 2020/0166945 A1 | 5/2020 | Kim et al. |
| 2020/0183389 A1 | 6/2020 | Kim et al. |
| 2020/0256681 A1 | 8/2020 | Kim et al. |
| 2020/0394918 A1 | 12/2020 | Chen |

FOREIGN PATENT DOCUMENTS

| | | |
|---|---|---|
| WO | 2017/111126 A1 | 6/2017 |
| WO | 2019/031853 A1 | 2/2019 |
| WO | 2019/165737 A1 | 9/2019 |

OTHER PUBLICATIONS

Extended European Search Report issued in corresponding European Patent Application No. 20217529.5-1001, dated Dec. 15, 2021.

* cited by examiner

NO MAPPING IN PAST
=
TEMPORARILY UNTRAVELABLE

MOBILITY INFORMATION PROVISION SYSTEM FOR MOBILE BODIES, SERVER, AND VEHICLE

CROSS-REFERENCE TO RELATED APPLICATIONS

The present application claims priority from Japanese Patent Application Nos. 2020-145304 filed on Aug. 31, 2020, 2019-240029 filed on Dec. 30, 2019, 2019-240030 filed on Dec. 30, 2019, and 2019-240031 filed on Dec. 30, 2019, the entire contents of each of which are hereby incorporated by reference.

BACKGROUND

The technology relates to a mobility information provision system for mobile bodies, a server, and a vehicle.

An automatic driving technique has been developed for traveling of a vehicle, such as an automobile, to a destination. Reference is made to Japanese Unexamined Patent Application Publication No. 2019-212095.

The vehicle travels along a route to the destination, for example. During the travel, it is desired that the vehicle use a sensor, such as a camera, provided in the own vehicle to capture images of surroundings of the vehicle, for example, and travel safely by avoiding contact with a mobile body such as another vehicle.

An aspect of the technology provides a mobility information provision system, for mobile bodies, that includes a plurality of terminal devices and a plurality of communication apparatuses. The plurality of terminal devices is usable in respective mobile bodies. The plurality of communication apparatuses are provided in respective predetermined zones or respective predetermined sections in which the mobile bodies are to move. The communication apparatuses are each configured to communicate with the terminal device used in a mobile body moving in the predetermined zone or the predetermined section of which the communication apparatus is in charge, out of the mobile bodies. The communication apparatuses are each configured to transmit information to the terminal device used in the mobile body moving in the predetermined zone or the predetermined section of which the communication apparatus is in charge. The information to be transmitted includes information used to determine movement of corresponding one of the mobile bodies or information used to control the movement of the corresponding one of the mobile bodies.

An aspect of the technology provides a server configured to be coupled to the communication apparatuses in the mobility information provision system for mobile bodies described above. The server includes an information acquiring unit, a generator, and a transmitting unit. The information acquiring unit is configured to acquire information which is field information related to movement of the mobile bodies or preliminary processed information obtained by processing the field information. The generator is configured to generate primary processed information on the basis of the information acquired by the information acquiring unit. The primary processed information is to be used to determine movement of the mobile bodies by the mobile bodies, the terminal devices, or both or is to be used to control the movement of the mobile bodies by the mobile bodies, the terminal devices, or both. The transmitting unit is configured to transmit the generated primary processed information to the terminal devices provided in the respective mobile bodies via the communication apparatuses.

An aspect of the technology provides a vehicle configured to serve as any of the mobile bodies in the mobility information provision system for mobile bodies described above. The vehicle includes a movement controller. The movement controller is configured to control the movement of the mobile body on the basis of information received by the terminal device from any of the communication apparatuses provided separately in the respective zones or the respective sections. The information received by the terminal device includes the information used to determine the movement of the corresponding one of the mobile bodies or the information used to control the movement of the corresponding one of the mobile bodies. The movement controller is configured to determine a course of the vehicle on the basis of field information related to the movement of the mobile bodies received by the terminal device, primary processed information obtained on the basis of the field information, or both, and to control or assist travel of the vehicle on the basis of the determined course.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Achievement of automatic driving, for example, of a mobile body, such as a vehicle, is expected to enable the mobile body to move to a destination regardless of an intention of a user, or to assist a driving operation performed by the user to enhance safety of movement.

However, in a situation in which individual mobile bodies such as vehicles independently execute detection and control, it is not necessarily possible to accurately sense movement of another mobile body.

For example, unpredicted movement of another mobile body, another mobile body stopped at a blind spot, and another mobile body coming out from a blind spot can make it necessary for the mobile body, such as a vehicle, to execute abrupt traveling control, for example, to avoid contact with these other mobile bodies.

Regarding movement of a mobile body such as a vehicle, it is desired to reduce an influence of another mobile body on the own mobile body.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology.

Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

First Example Embodiment

Figure 1:
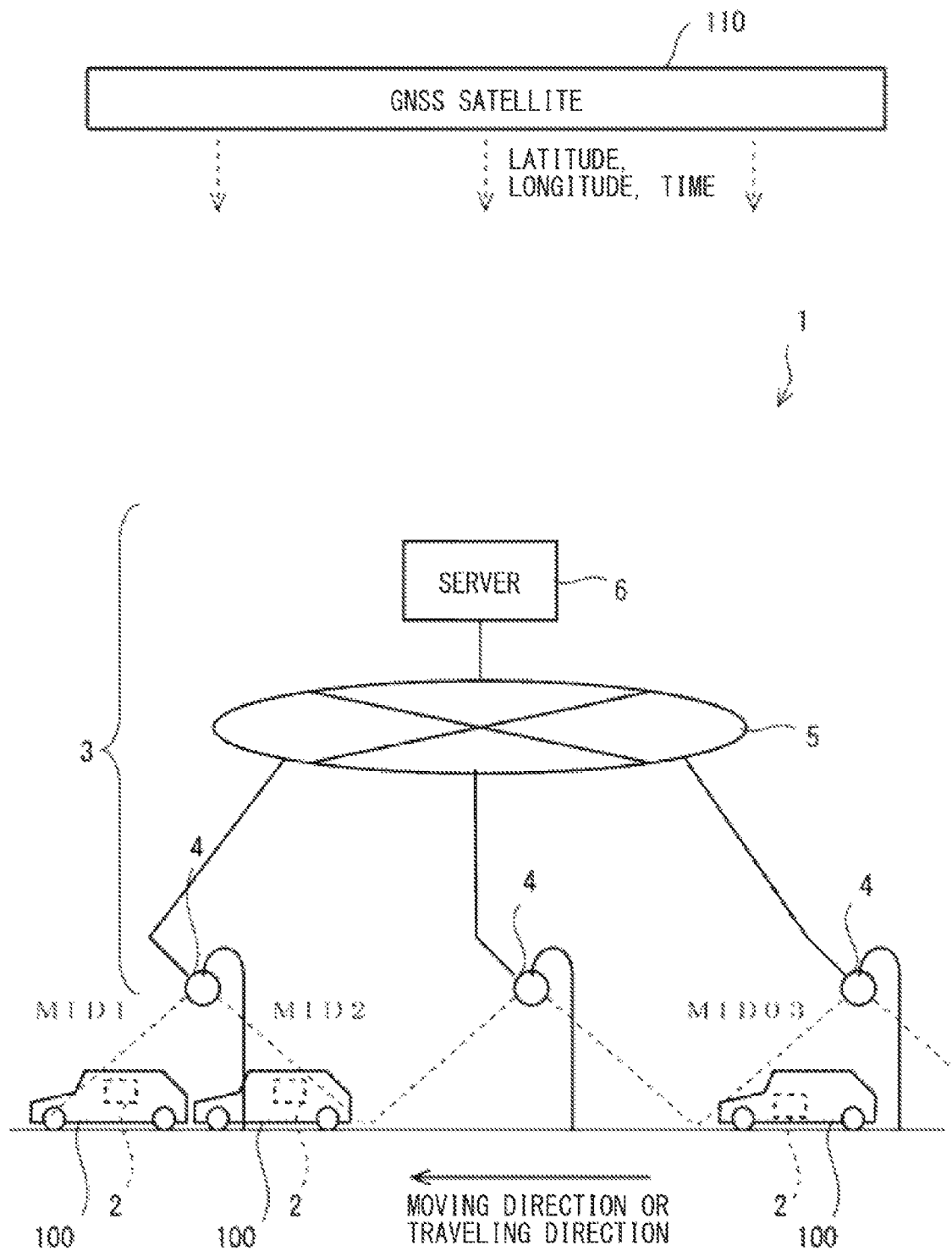
FIG. 1 is a configuration diagram illustrating a mobility information provision system for mobile bodies according to one example embodiment of the technology.

FIG. 1 is a configuration diagram illustrating a mobility information provision system 1 for mobile bodies according to first example embodiment of the technology.

The mobility information provision system 1 illustrated in FIG. 1 may include a plurality of terminal devices 2 and a plurality of wireless base stations 4. The respective terminal devices 2 are usable in a plurality of vehicles 100 that travel on a road. The vehicles 100 may serve as a plurality of mobile bodies. The wireless base stations 4 may serve as a plurality of communication apparatuses. The wireless base stations 4 may be provided along the road on which the vehicles 100 travel.

FIG. 1 also illustrates one of global navigation satellite system (GNSS) satellites 110. The GNSS satellite 110 may emit a radio wave toward the Earth's surface. The radio wave may include information on a latitude and a longitude, indicating a position of each of the satellites, superimposed on information on an absolute time synchronized among the satellites. The terminal device 2 and a server 6 may receive radio waves of the GNSS satellites 110, and thereby generate information on a latitude and a longitude indicating a position of a point where the radio waves have been received. The server 6 will be described later. On the basis of a distance determinable from the generated latitude and longitude and the latitudes and the longitudes of the satellites, it is possible to calculate time taken for the radio waves to reach the reception point. This makes it possible to obtain, in regard to the reception point, an accurate time based on the time of the GNSS satellite 110.

Examples of the mobile body may include, in addition to the vehicle 100, a pedestrian, a bicycle, a motorcycle, and a cart. The terminal device 2 may be provided for these mobile bodies. The terminal device 2 may be provided fixedly or detachably in the vehicle 100, for example.

Another vehicle 100 may travel on the road provided with the wireless base stations 4. Examples of the other vehicle 100 may include the other vehicle 100 not provided with information from the mobility information provision system 1 illustrated in FIG. 1, and the other vehicle 100 provided with another piece of information from another mobility information provision system. The vehicle 100 and other mobile bodies may not be configured to travel on a fixed track, unlike a train, for example. It is possible for the vehicle 100 and other mobile bodies to move while freely and independently changing their traveling directions and traveling speeds. The mobility information provision system 1 may be configured to, instead of providing mobility information to all these mobile bodies, provide mobility information to a limited number of mobile bodies out of the mobile bodies.

The wireless base stations 4 may be coupled to a dedicated network 5 provided for the mobility information provision system 1. The server 6 may further be coupled to the dedicated network 5.

The server 6 may be coupled to the terminal devices 2 via the wireless base stations 4 of the dedicated network 5 in a communicable manner. The wireless base stations 4, the dedicated network 5, and the server 6 may configure a system 3 on the base station side. The system 3 may provide mobility information to mobile bodies. The wireless base stations 4 may be arranged for respective sections along a single road. In this case, each of the wireless base stations 4 may be configured to provide information to the terminal device 2 used in the mobile body moving in the section of which the wireless base station 4 is in charge. Alternatively, the wireless base stations 4 may be provided for respective areas. The area may be wider than the single road. In this case, each of the wireless base stations 4 may be configured to provide information to the terminal device 2 used in the mobile body moving in the area of which the wireless base station 4 is in charge.

In some example embodiments, an "area" may refer to a place (distance) defined as a planar space. The "area" may be a zone.

In some example embodiments, a "section" may refer to a span from a certain point to the next point. The "section" may include a concept of time.

The dedicated network 5 may be provided for the mobility information provision system 1. The dedicated network 5 may be a private closed network. The dedicated network 5 may be provided to be dedicated for a section of a certain road or an area of a certain region, but may be any network as long as it limits usage by imposing specific conditions, such as a specific system or section. In contrast, the Internet may be a public, open wide-area communication network. Examples of the wide-area communication network may include, in addition to the Internet, a dedicated communication network to be used in an advanced traffic system such as advanced driver-assistance systems (ADAS), and an ATM switched network to be dedicated for telephone exchange. The mobility information provision system 1 may use any of these wide-area communication networks, in place of or together with the dedicated network 5. On an open network, transmission delay tends to be longer than on a closed network. Performing coding such as encryption on data enables a certain degree of confidentiality to be secured on an open network. However, using the dedicated network 5 makes it possible to execute low-delay, large-capacity high-speed communication mutually stably as data communication between the wireless base stations 4 and the server 6, as compared with a case of using the Internet, for example. Even if the dedicated network 5 is, for example, configured to transmit and receive information via asynchronous frames based on Transmission Control Protocol/Internet Protocol (TCP/IP), and is configured to retransmit frames in response to collision detection, transmission delay due to such transmission is unlikely to be too long. On the dedicated network 5, it is possible to keep transmission delay short, as compared with the Internet on which a large amount of data is transmitted and received asynchronously in some cases.

It is to be noted that two or more servers 6 may be provided for a communication network including the dedicated network 5 or the Internet. The servers 6 may be provided to be distributed between allocated regions such as roads or areas. Alternatively, the servers 6 may be provided to be distributed downstream and upstream. The downstream server may directly communicate with the wireless base stations 4. The upstream server may be provided upstream of the downstream server. The servers 6 may be provided to be distributed between two or more groups into which the terminal devices 2 are separated. In any case, cooperative operation of the two or more servers 6 makes it is possible to reduce processing load of each of the servers 6. Moreover, appropriately distributing and disposing the servers 6 on the communication network makes it possible to reduce an amount of transmitted information on each part and the whole of the communication network.

In the mobility information provision system 1 described above, the terminal devices 2 of the vehicles 100 and the server 6 may transmit and receive data to and from each other, by data packet routing control on the communication network including the dedicated network 5 and the wireless base stations 4. If the terminal device 2 moves together with the vehicle 100, and the wireless base station 4 in charge of an area accommodating the terminal device 2 changes, the wireless base stations 4 and the server 6 may switch the routing. The server 6 may thus communicate with the terminal device 2 via the wireless base station 4 in charge of an area that newly accommodates the moving vehicle 100. The wireless base stations 4 before and after the switching may transmit and receive information related to the moving vehicle 100 and the terminal device 2 to and from each other.

It is to be noted that the terminal devices 2 may be accommodated in the area or a wireless coverage of the wireless base stations 4. The information may be transmitted and received as far as the terminal devices 2 is located in at least one of wireless coverages of the wireless base stations 4 provided in the respective areas.

By such communication, the server 6 may collect field information related to traveling of the vehicles 100. The field information to be collected may include information about a mobile body other than the vehicle 100, for example. On the basis of the collected field information, the server 6 may generate, for example, information on a course or a movable range in a short section for each of the vehicles 100. In one embodiment, the information on the course or the movable range may serve as "course-related information". The courses or the movable ranges may allow the vehicles 100 to travel therewithin safely without colliding with each other, for example. The server 6 may repeatedly transmit the generated information, as primary processed information, to the terminal devices 2 of the vehicles 100 every predetermined period. The server 6 may organize the collected field information itself for each of the vehicles 100, for example, and repeatedly transmit the organized field information to the terminal devices 2 of the vehicles 100 every predetermined period.

In a case where only one vehicle 100 corresponds to a predetermined zone and/or a predetermined section of which the wireless base station 4 is in charge, the wireless base station 4 may take charge of only the one vehicle 100. In that case, the server 6 may generate the primary processed information on the basis of a map collected in advance and field information of the one vehicle 100. Communication may be performed only once in a period of time in which the vehicle 100 passes through the predetermined zone and/or the predetermined section of which the wireless base station 4 is in charge.

In some example embodiments, a "short section" may refer to a section in the traveling direction (front, rear, left, right) of the vehicle 100 that undergoes control or assist. The "short section" may be defined as, for example, a distance to be traveled in 200 milliseconds at a speed of 60 km per hour.

The term "in charge of" may refer to a state in which the wireless base station 4 is able to communicate with a device in the corresponding area.

By such communication, the terminal device 2 provided in the vehicle 100 may repeatedly receive, every predetermined period from the wireless base station 4 in charge of an area accommodating the terminal device 2, the primary processed information or the field information transmitted by the server 6. On the basis of the information received by the terminal device 2, the vehicle 100 may execute control for the movement of the vehicle 100. In a case of automatic driving, the vehicle 100 may determine a course for the automatic driving, and cause the own vehicle to travel in accordance with the course. In a case of driving assist of manual driving, the vehicle 100 may adjust a driving operation performed by a user riding therein to prevent the own vehicle from deviating greatly from the determined course, and cause the own vehicle to travel. It is possible for the vehicle 100 to travel along the determined course. It is to be noted that the vehicle 100 may notify the riding user of the information received by the terminal device 2 or information based on the received information by, for example, display or sound output.

The field information to be collected by the base station side, such as the server 6, may be information related to the movement of mobile bodies such as the vehicles 100. Examples of the field information may include information to be collected from each of the vehicles 100, monitoring information of a road, and traffic information of a region based on the monitoring information. Examples of the information to be collected from each of the vehicles 100 may include traveling information of the vehicle 100, occupant information related to the user, peripheral information of the vehicle 100, traffic information of a region. Examples of the traveling information of the vehicle 100 may include, in addition to the traveling direction and the traveling speed, a current location, a destination, and an attitude or movement of a vehicle body of the vehicle 100. Examples of the attitude of the vehicle body may include a yaw rate.

The primary processed information to be transmitted by the base station side, such as the server 6, to the terminal device 2 of each of the vehicles 100 may be, for example, information usable by each of the vehicles 100 for control or determination of the traveling of the vehicle 100. Examples of the primary processed information may include the traveling direction and the traveling speed in a short section of the vehicle 100. Information to be transmitted by the server 6 to the terminal device 2 of each of the vehicles 100 may include, for example, information on an estimated current location of the vehicle 100, a maximum movable distance or a maximum movable range from the estimated current location of the vehicle 100, and information on an estimated current time. The terminal device 2 may keep receiving these pieces of information repeatedly every short, predetermined period. This enables the vehicle 100 to keep traveling with safety ensured on the basis of the information. The vehicle 100 may repeatedly acquire information for each short section every predetermined period, and travel in accordance with the information. This enables the vehicle 100 to travel safely to a desired destination, for example.

In existing techniques, the vehicle 100 sets a route to a destination, for example, in a navigation device, and a user him/herself performs a driving operation while ensuring safety in accordance with guidance of the route, which enables the vehicle 100 to move safely to the destination. During the movement, the vehicle 100 having a driving assist function is able to use a sensor, such as a camera, provided in the vehicle 100 to capture an image of the interior or exterior of the vehicle, and adjust a course to avoid contact with a mobile body such as the other vehicle 100 to assist driving.

However, in such autonomous automatic driving or driving assist, it is not necessarily possible to accurately predict and sense the movement of the other vehicle 100, for example.

For example, the other vehicle 100 operated by a user can make unpredicted movement, such as changing a course abruptly. Another mobile body can run out into a course, or the other vehicle 100 can be parked around a corner that is out of sight. For example, bad weather such as snowstorm can cause viewability to decrease. In a weather such as snowstorm, it can be difficult to visually recognize an oncoming vehicle. At an intersection or a merging point of an exit of a highway, the other vehicle 100 can approach from a lateral direction or a diagonal rear direction. In these cases, it is necessary for the own vehicle during automatic driving to execute abrupt traveling control to avoid contact with the other vehicle 100 to, for example, prevent the own vehicle from coming into contact with the other vehicle 100 whose traveling changes abruptly, or from hindering a course of the other vehicle 100. It is desired that such events be avoided for prevention of an accident. In a case of controlling the movement of a mobile body such as the vehicle 100, it is desired that the movement be less likely to be influenced by unpredicted movement of another mobile body.

Figure 2:
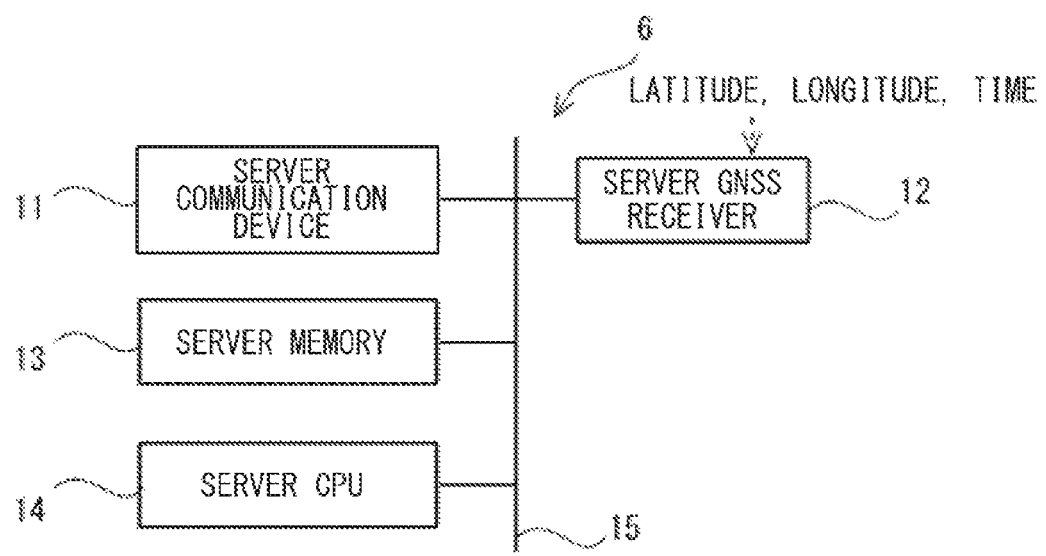
FIG. 2 is a hardware configuration diagram illustrating a server illustrated in FIG. 1.

FIG. 2 is a hardware configuration diagram illustrating the server 6 illustrated in FIG. 1.

The server 6 illustrated in FIG. 2 may include a server communication device 11, a server GNSS receiver 12, a server memory 13, a server central processing unit (CPU) 14, and a server bus 15. The server communication device 11, the server GNSS receiver 12, the server memory 13, and the server CPU 14 may be coupled to the server bus 15.

The server communication device 11 may be coupled to the communication network including the dedicated network 5. The server communication device 11 may transmit and receive data to and from another device coupled to the communication network, for example, the wireless base stations 4 or the terminal device 2 of the vehicle 100.

The server GNSS receiver 12 may receive the radio wave of the GNSS satellite 110 to obtain a current time. The server 6 may include an unillustrated server timer calibrated on the basis of the current time of the server GNSS receiver 12.

The server memory 13 may record a program to be executed by the server CPU 14, and data.

The server CPU 14 may read the program from the server memory 13 and execute the program. Thus, a server controller may be implemented in the server 6.

The server CPU 14 serving as the server controller may manage overall operation of the server 6. The server CPU 14 may acquire information to be collected in the mobility information provision system 1, generate information to be provided to the communication apparatuses, and transmit the information.

In one embodiment, the server CPU 14 may serve as a "collector", a "mapping unit", and a "generator".

It is to be noted that the communication apparatus may be the server 6 or the wireless base station 4. Since the wireless base station 4 is closer to the server CPU 14 on the network, responsiveness is improved when the server CPU 14 communicates with the wireless base station 4.

Figure 3:
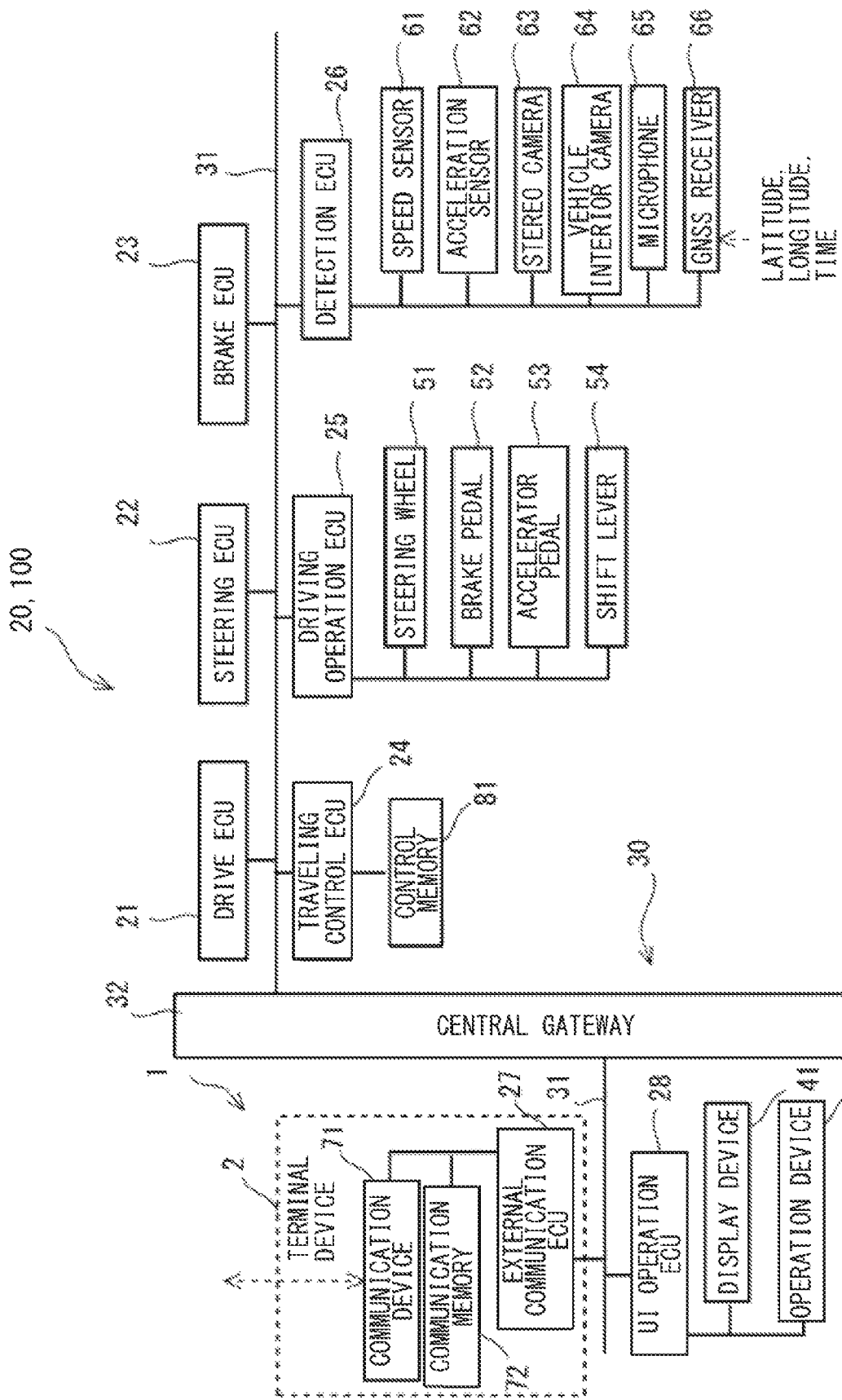
FIG. 3 is a configuration diagram illustrating a control system that controls automatic driving, for example, of a vehicle illustrated in FIG. 1.

FIG. 3 is a configuration diagram illustrating a control system 20 that controls the automatic driving, for example, of the vehicle 100 illustrated in FIG. 1.

FIG. 3 illustrates, as representatives, respective control electronic control units (ECUs) incorporated in a plurality of control devices included in the control system 20 in the vehicle 100. Like the server 6 illustrated in FIG. 2, each of the control devices may include, in addition to the control ECU, for example, a memory, an input and output port, a timer, and an internal bus. The memory may be configured to record a control program and data. The input and output port may be coupled to a target to be controlled or to a state detector for the target to be controlled. The timer may be configured to measure a time and a time period. The internal bus may be coupled to the above-described components.

In one example, the control ECUs illustrated in FIG. 3 may be a drive ECU 21, a steering ECU 22, a brake ECU 23, a traveling control ECU 24, a driving operation ECU 25, a detection ECU 26, an external communication ECU 27, and a user interface (UI) operation ECU 28. The control system 20 in the vehicle 100 may include another non-illustrated control ECU.

These control ECUs may configure a controller of the control system 20 of the vehicle 100.

In one embodiment, these control ECUs may serve as a "controller".

The plurality of control ECUs may be coupled to a vehicle network 30 such as a controller area network (CAN) or a local interconnect network (LIN) employed in the vehicle 100. The vehicle network 30 may include a plurality of bus cables 31 and a central gateway (CGW) 32. The plurality of bus cables 31 may allow the plurality of control ECUs to be coupled to each other. The central gateway (CGW) 32 may serve as a relay to which the plurality of bus cables 31 is coupled. Identifications (IDs) different from each other may be allocated to the plurality of control ECUs. The IDs may each serve as identification information. The control ECUs may each output data periodically to other control ECUs. The data may have an ID for one of the control ECUs and another ID for another one of the control ECUs. The one of the control ECUs may represent a source of output. The other one of the control ECUs may represent a destination of output. Each of the other control ECUs may monitor the bus cables 31. In a case where an ID that represents a destination of output corresponds to the ID of one of the control ECUs, for example, the one of the control ECUs may acquire data, and execute processing on the basis of the data. The central gateway 32 may monitor each of the plurality of bus cables 31 being coupled. In a case where one of the control ECUs representing a source of output is coupled to one of the bus cables 31, another one of the control ECUs is coupled to another one of the bus cables 31, and the central gateway 32 detects that an ID representing a destination of output corresponds to the other one of the control ECUs, the central gateway 32 may output data to the other one of the bus cables 31. Through the relay processing performed by the central gateway 32, while one of the plurality of control ECUs is coupled to one of the bus cables 31, and another one of the control ECUs is coupled to another one of the bus cables 31, exchanging of data to be inputted and outputted may be achieved between the one of the plurality of control ECUs and the other one of the plurality of control ECUs.

The UI operation ECU 28 may be coupled to a user interface device for the user riding the vehicle 100. For example, the UI operation ECU 28 may be coupled to a display device 41 and an operation device 42. The display device 41 may be, for example, a liquid crystal device or an image projection device. The operation device 42 may be, for example, a touch panel, a keyboard, or a noncontact operation detection device. The display device 41 and the operation device 42 may be installed, for example, on an inner surface of a vehicle compartment in which the user rides. The UI operation ECU 28 may acquire data from the vehicle network 30, and cause the display device 41 to perform display on the basis of the data. When the operation device 42 accepts an operation input, the UI operation ECU 28 may output the operation input to the vehicle network 30. The UI operation ECU 28 may execute processing on the basis of the operation input. The UI operation ECU 28 may include a result of the processing in the data. The UI operation ECU 28 may cause the display device 41 to display, for example, a navigation screen for setting of a destination, search for a route to the destination selected by an operation input, and include the route data in the data. The route data may include attribute information of a lane, for example, of a road to be used for the movement from the current location to the destination.

The driving operation ECU 25 may be coupled, for example, to operation members. The operation members may be used by the user to control the traveling of the vehicle 100. Examples of the operation members may include a steering wheel 51, a brake pedal 52, an accelerator pedal 53, and a shift lever 54. As one of the operation members is operated, the driving operation ECU 25 may output data to the vehicle network 30. The data may include whether there is an operation and an amount of the operation. The driving operation ECU 25 may execute processing regarding the operation that is made on the one of the operation members. The driving operation ECU 25 may include a result of the processing in the data. In a case where, for example, the accelerator pedal 53 is operated in a situation where another mobile body or a fixed object lies in front of the vehicle 100 in the traveling direction, the driving operation ECU 25 may determine that the operation is abnormal. The driving operation ECU 25 may include a result of the determination in the data.

The detection ECU 26 may be coupled, for example, to detection members. The detection members may each detect a traveling state of the vehicle 100. Examples of the detection members may include a speed sensor 61, an acceleration sensor 62, a camera such as a stereo camera 63, a vehicle interior camera 64, a microphone 65, and a GNSS receiver 66. The speed sensor 61 may be configured to detect a speed of the vehicle 100. The acceleration sensor 62 may be configured to detect a rate of acceleration of the vehicle 100. The stereo camera 63 may be configured to capture an image of an outside area of the vehicle 100. The vehicle interior camera 64 may be configured to capture an image of the user in the vehicle compartment. The microphone 65 may be configured to convert sound inside and outside the vehicle 100 into data. The GNSS receiver 66 may be configured to detect a position of the vehicle 100. The GNSS receiver 66 may receive the radio waves from the GNSS satellites 110, like the server GNSS receiver 12, to obtain a latitude and a longitude, indicating the current position of the own vehicle, and a current time. It is thus expected that the current time of the vehicle 100 match, with high precision, the current time based on the server GNSS receiver 12 of the server 6. The detection ECU 26 may acquire detection information from each of the detection members, and output data including the detection information to the vehicle network 30. The detection ECU 26 may execute processing on the basis of the detection information. The detection ECU 26 may include a result of the processing in the data. In a case where, for example, the acceleration sensor 62 detects acceleration, and a rate of the acceleration exceeds a threshold for collision detection, the detection ECU 26 may determine that a collision is detected. The detection ECU 26 may include a result of the collision detection in the data. The detection ECU 26 may extract a mobile body on the basis of a captured image obtained by the stereo camera 63. The mobile body may be a pedestrian or the other vehicle 100, for example, present around the own vehicle. The detection ECU 26 may determine a type and an attribute of the mobile body. The detection ECU 26 may estimate a relative direction, a relative distance, and a moving direction of the mobile body in accordance with a position, a size, and a change of the mobile body in the image. The detection ECU 26 may include information on the mobile body, including a result of the estimation, in the data, and output the data to the vehicle network 30.

The external communication ECU 27 may be coupled to a communication device 71 and a communication memory 72. The terminal device 2 may include the external communication ECU 27, the communication device 71, and the communication memory 72. The communication device 71 may transmit and receive, to and from a device outside the vehicle, data to be transmitted and received by the external communication ECU 27. The device outside the vehicle may be, for example, the wireless base station 4 or the communication device 71 of the other vehicle 100. The communication device 71 may communicate with the communication apparatuses provided for respective areas or sections. The communication memory 72 may be a computer-readable recording medium. The communication memory 72 may record a program to be executed by the external communication ECU 27, set values, and data to be transmitted and received by the external communication ECU 27. The external communication ECU 27 may, via the communication device 71, transmit and receive data to and from the server 6, for example. The external communication ECU 27 may, for example, collect own vehicle information via the vehicle network 30, and transmit the own vehicle information to the server 6. The external communication ECU 27 may acquire, from the communication device 71, the primary processed information transmitted by the server 6 to the own vehicle, for example, and record the primary processed information in the communication memory 72.

Examples of the own vehicle information to be collected by the external communication ECU 27 may include vehicle interior information such as a state of the user riding the own vehicle, information on the traveling state of the own vehicle, peripheral information such as a traveling environment of the own vehicle, and information on a region where the own vehicle is traveling. The peripheral information may include information about another mobile body present around the own vehicle. Examples of the information on the traveling state of the own vehicle include information detected by an autonomous sensor, like the above-described sensors, provided in the own vehicle. The autonomous sensor may be a vehicle-mounted sensor, examples of which may include an acceleration sensor, a global positioning system (GPS) sensor, a gyro sensor, an electromagnetic compass, an air pressure sensor, a camera, a radar sensor, an ultrasonic sensor, and an infrared sensor. The autonomous sensor may detect information related to the movement of the own vehicle, information on the user of the own vehicle, vehicle information such as a vehicle number, or the peripheral information or the region information of the own vehicle. The information on the traveling state of the own vehicle may include information on the traveling state calculatable on the basis of the detection by such sensors, for example, information on the yaw rate. The own vehicle information to be transmitted by the external communication ECU 27 may be the own vehicle information collected by the external communication ECU 27 and unprocessed. Alternatively, the own vehicle information may be the collected information subjected to processing, filtering, coding, or quantization. The external communication ECU 27 may, as the terminal device 2, repeatedly transmit the own vehicle information to the communication apparatuses.

Information to be acquired by the external communication ECU 27 from the server 6 may include, in addition to the primary processed information addressed to the own vehicle, primary processed information addressed to another surrounding mobile body. The information to be acquired may also include interpolation information not acquirable by the autonomous sensor. The external communication ECU 27 may, as the terminal device 2, repeatedly receive at least information usable for determination or control of the movement of the own vehicle, from the communication apparatuses.

The traveling control ECU 24 may be coupled to a control memory 81. The control memory 81 may be a computer-readable recording medium. The control memory 81 may record a program to be executed by the traveling control ECU 24, set values, and other information. The control memory 81 may record information on details of the control performed by the traveling control ECU 24. The traveling control ECU 24 may read the program from the control memory 81, and execute the program. This enables the traveling control ECU 24 to serve as a controller configured to control the traveling of the vehicle 100.

The traveling control ECU 24 may acquire data from, for example, the external communication ECU 27, the detection ECU 26, and the driving operation ECU 25 via the vehicle network 30, and control the traveling, e.g., automatic driving or manual driving assist, of the vehicle 100. The traveling control ECU 24 may generate, on the basis of the acquired data, traveling control data to be used to control the traveling of the vehicle 100. The traveling control ECU 24 may output the traveling control data to the drive ECU 21, the steering ECU 22, and the brake ECU 23. The drive ECU 21, the steering ECU 22, and the brake ECU 23 may control the traveling of the vehicle 100 on the basis of the inputted travel control data. The traveling control ECU 24 may, as movement control device, control the movement of the vehicle 100 by using the information received by the terminal device 2.

Next, description will be given on control of courses of the vehicles 100 by the mobility information provision system 1 having the above-described configuration.

Figure 4:
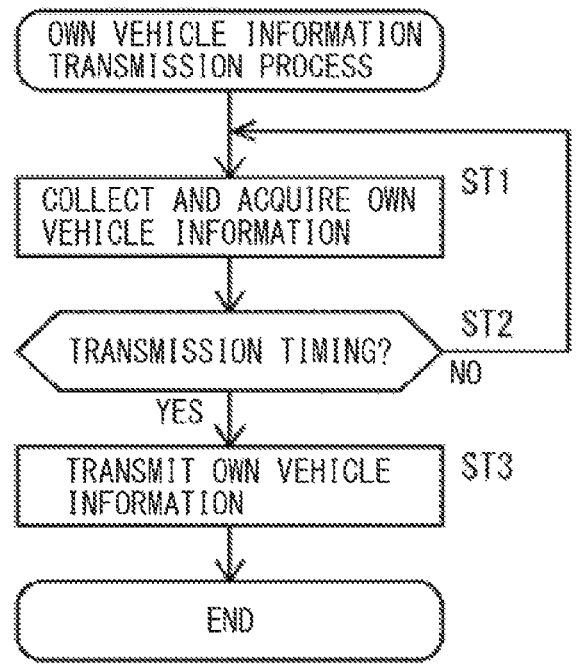
FIG. 4 is a flowchart illustrating a process of transmitting own vehicle information by an external communication ECU illustrated in FIG. 3.

FIG. 4 is a flowchart illustrating a process of transmitting the own vehicle information by the external communication ECU 27 illustrated in FIG. 3.

The external communication ECU 27 of the terminal device 2 provided in each of the vehicles 100 may, in a case of being able to communicate with the wireless base station 4, for example, repeatedly execute the own vehicle information transmission process illustrated in FIG. 4. A cycle by which the external communication ECU 27 transmits the own vehicle information may be within a range of, for example, about several ten milliseconds to about several seconds.

In Step ST1, the external communication ECU 27 may collect and acquire the own vehicle information from the vehicle interior. For example, the external communication ECU 27 may acquire data, via the vehicle network 30, from the traveling control ECU 24, the detection ECU 26, and the driving operation ECU 25. The external communication ECU 27 may thus collect, for example, the traveling state of the own vehicle, the state of the riding user, the peripheral information of the own vehicle, and the information on the region where the own vehicle is traveling. The traveling state of the own vehicle may be information such as the current position, the traveling direction, or the traveling speed of the own vehicle. The external communication ECU 27 may also calculate, on the basis of the acquired information, information not obtainable as a detection value of the autonomous sensor, for example, information on the yaw rate. The external communication ECU 27 may record these pieces of collected data in the communication memory 72. The data collected by the external communication ECU 27 may include a detection time of each piece of the data.

In Step ST2, the external communication ECU 27 may determine whether a transmission timing of the own vehicle information has arrived. For example, the external communication ECU 27 may determine, on the basis of the current time of the GNSS receiver 66, whether time elapsed from the previous transmission timing has reached a predetermined transmission cycle. The control system 20 of the vehicle 100 may include, for example, a vehicle timer coupled to the vehicle network 30, the central gateway 32, the external communication ECU 27, or the traveling control ECU 24 and calibrated on the basis of the current time of the GNSS receiver 66. In that case, a time of the vehicle timer may be used. In a case where the transmission cycle has not been reached (Step ST2: NO), the external communication ECU 27 may cause the process to return to Step ST1. Upon determining that the transmission cycle has been reached and the transmission timing has arrived (Step ST2: YES), the external communication ECU 27 may cause the process to proceed to Step ST3.

In Step ST3, the external communication ECU 27 may transmit the information collected in Step ST1 to the server 6 via the communication device 71. The communication device 71 may transmit the information collected in Step ST1 to the wireless base station 4 with which the communication device 71 is able to communicate in a communication environment at the time of the transmission. The wireless base station 4 may transmit the information received from the communication device 71 of the vehicle 100 to the server 6 via the dedicated network 5. The information transmitted from the communication device 71 of the vehicle 100 to the wireless base station 4 may include, for example, the own vehicle information, the latest current location of the vehicle 100, and the latest time of the vehicle 100. The own vehicle information may be, for example, a value detected by the vehicle 100 and its detection time.

As described above, the terminal device 2 of each the vehicles 100 may repeatedly transmit the current or past detection information, obtained by the autonomous sensor of each of the vehicles, to the communication apparatus 4 in charge of an area or a section accommodating the vehicle. Each of the communication apparatuses may repeatedly receive, from the terminal device 2 of the vehicle 100 moving in the area or the section of which the communication apparatus is in charge, the current or past information of the corresponding vehicle 100. Each of the communication apparatuses may transmit, to the server 6, the information received from the terminal device 2 of the vehicle 100.

Figure 5:
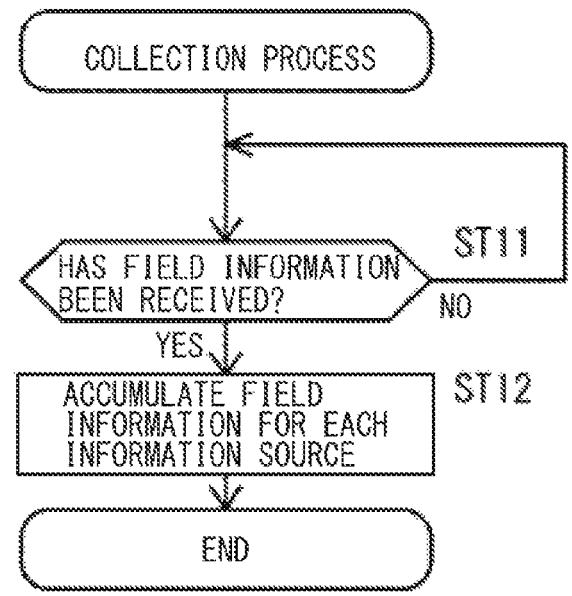
FIG. 5 is a flowchart illustrating a process of collecting field information related to movement of a plurality of vehicles by a server CPU illustrated in FIG. 2.

FIG. 5 is a flowchart illustrating a process of collecting the field information related to the movement of the vehicles 100 by the server CPU 14 of the server 6 illustrated in FIG. 2.

The server CPU 14 of the server 6 may repeatedly execute the collection process illustrated in FIG. 5, each time the server communication device 11 of the server 6 receives new field information.

In Step ST11, the server CPU 14 may determine whether the field information has been received. Examples of the field information may include the own vehicle information transmitted by the terminal device 2 of each of the vehicles 100, and detection information of a detection device, such as a camera, installed on a road. An unillustrated server of the advanced traffic system may transmit, to the server 6, traffic information of a region managed by the advanced traffic system, for example. The server communication device 11 may receive these pieces of information. In a case where the server communication device 11 has not received the field information (Step ST11: NO), the server CPU 14 may repeat the process in Step ST11. When the server communication device 11 receives the field information (Step ST11: YES), the server CPU 14 may cause the process to proceed to Step ST12.

It is to be noted that the server of the advanced traffic system may server as the server 6. In this case, the process of generating information on a course or a movable range within which each of the vehicles 100 is able to travel in a short section is performed after the traffic information of the advanced traffic system is collected, and thus communications between the serves can be reduced.

In Step ST12, the server CPU 14 may classify the received field information, according to information sources thereof, and accumulate the classified field information in the server memory 13. The server memory 13 of the server 6 may thus accumulate and record, as the field information related to the movement of the vehicles 100, the information about the vehicle 100 and the user or the peripheral information received from each of the vehicles 100, or the traffic information of the region in which each of the vehicles 100 is moving. The server CPU 14 may record, in association with the received field information, a time at which each piece of the field information has been received.

Figure 6:
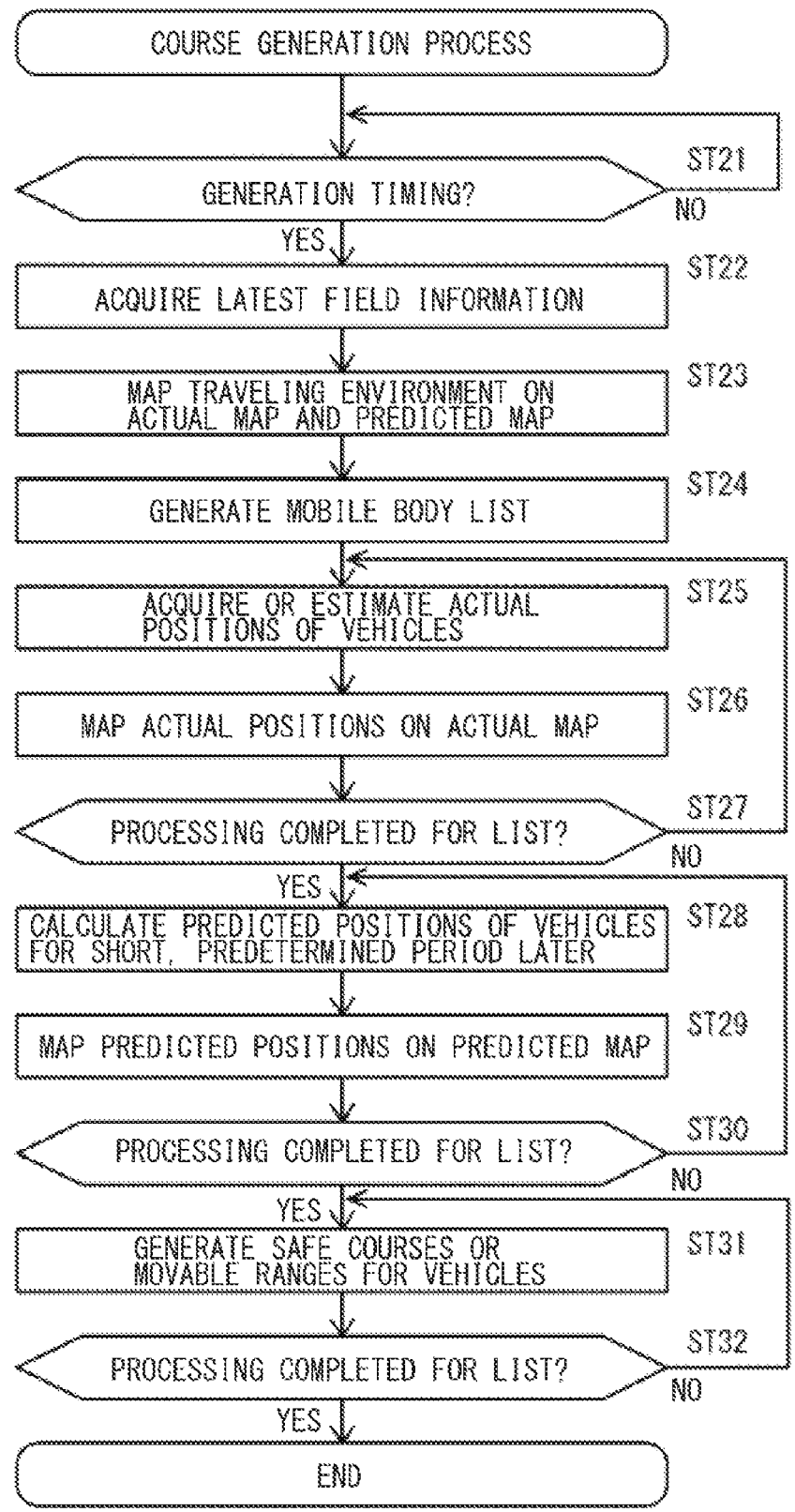
FIG. 6 is a flowchart illustrating a process of generating, by the server CPU illustrated in FIG. 2, as primary processed information, information on a course or a movable range within which each of the vehicles is able to travel in a short section.

FIG. 6 is a flowchart illustrating a process of generating, by the server CPU 14 of the server 6 illustrated in FIG. 2, as the primary processed information, information on a course or a movable range within which each of the vehicles 100 is able to travel in a short section.

The server CPU 14 of the server 6 may repeatedly execute the course generation process illustrated in FIG. 6. A cycle by which the server CPU 14 executes the course generation process may be, for example, shorter than time taken for the vehicle 100 to travel through a course based on the primary processed information. For example, the cycle may be about several ten milliseconds to about several hundred milliseconds.

In Step ST21, the server CPU 14 may determine whether a timing of generating new courses for the vehicles 100 has arrived. The server CPU 14 may determine, on the basis of the current time of the server GNSS receiver 12, whether time elapsed from the previous generation timing has reached a predetermined generation cycle. In a case where the generation cycle has not been reached (Step ST21: NO), the server CPU 14 may repeat the determination process in Step ST21. Upon determining that the generation cycle has been reached and the generation timing has arrived (Step ST21: YES), the server CPU 14 may cause the process to proceed to Step ST22.

In Step ST22, the server CPU 14 may acquire, from the server memory 13, the latest field information that has been received by the server communication device 11. For example, the server CPU 14 may acquire the field information related to the movement of the vehicles 100 collected from the vehicles 100. The server CPU 14 may acquire preliminarily processed information processed by the wireless base station 4 on the basis of the field information, for example. The server CPU 14 may acquire, as the field information related to the movement of the vehicles 100, information related to the movement of the vehicles 100, information on the users of the vehicles 100, and the peripheral information or the region information of the vehicles 100, from the respective vehicles 100.

In Step ST23, the server CPU 14 may map the traveling environment on an actual map and a predicted map. The traveling environment may be, for example, information about a traffic congestion situation or a road closure situation indicating a state of each road.

The actual map and the predicted map may each be a road map of a region about which the mobility information provision system 1 provides information. The actual map and the predicted map may each be a world map. The actual map and the predicted map may be recorded in the server memory 13.

The actual map may be a road map on which actual positions of the vehicles 100 at the current time of the server GNSS receiver 12 are to be mapped in real time. It is to be noted that the actual map may be a road map on which the actual positions at a time later than the current time of the server GNSS receiver 12 by a short, predetermined period of time are to be mapped substantially in real time.

The predicted map may be a road map on which predicted positions of the vehicles 100 estimated for a time later than the time of the actual map by a predetermined period are to be mapped. For example, the predicted map may be a road map at a point in time later than the time of the actual map by about several seconds.

In Step ST24, the server CPU 14 may generate, from the latest field information, a mobile body list about the vehicles 100 to which it is necessary for the server 6 to issue notification at this point in time. The mobile body list may include another mobile body, such as the other vehicle 100, to which it is not necessary for the server 6 to issue notification.

From Step ST25, the server CPU 14 may start a process for mapping of the actual positions of the target vehicles 100 on the actual map.

The server CPU 14 may acquire or estimate, from the latest field information, the actual position of the vehicle 100 included in the mobile body list and not subjected to processing yet. The term "actual" or "this point in time" does not necessarily refer to the time itself of the server GNSS receiver 12, and may be a point in time later than the time of the server GNSS receiver 12 by several hundred milliseconds. In a case where a time lag between a time corresponding to the latest current location of the vehicle 100 and this point in time is equal to or less than a threshold of about several hundred milliseconds, the server CPU 14 may regard the acquired current location as the actual position of the vehicle 100. In a case where the time lag is greater than the threshold, the server CPU 14 may use the own vehicle information, such as the moving direction, the movement speed, or the attitude of the vehicle 100, to calculate a direction and an amount of movement that has occurred from the acquired latest current location. The server CPU 14 may regard a position based on a result of the calculation as the actual position of the vehicle 100.

In Step ST26, the server CPU 14 may map, on the actual map, the actual positions of the mobile bodies estimated on the basis of the latest field information. Thus, the actual positions based on the latest information about the vehicles 100 may be mapped on the actual map with high accuracy.

In Step ST27, the server CPU 14 may determine whether processing has been completed for the vehicles 100 of the mobile body list. In a case where processing for all the vehicles 100 of the mobile body list has not been completed (Step ST27: NO), the server CPU 14 may cause the process to return to Step ST25. The server CPU 14 may select the next vehicle 100 not subjected to processing yet, and repeat the processes from Step ST25 to Step ST27. Upon completion of the processing for all the vehicles 100 of the mobile body list (Step ST27: YES), the server CPU 14 may terminate the process of mapping on the actual map, and cause the process to proceed to Step ST28. Thus, the actual positions of the target vehicles 100 may be mapped, on the actual map, to represent a relative positional relationship between the target vehicles 100.

From Step ST28, the server CPU 14 may start a process for mapping, on the predicted map, of future predicted positions of the target vehicles 100 for a predetermined period later. Here, the predicted positions may be predicted positions at a time several seconds after the time of the actual map.

The server CPU 14 may estimate, by calculation from the latest field information, the predicted position of the vehicle 100 included in the mobile body list and not subjected to processing yet. The server CPU 14 may use the information on the vehicle 100 to be subjected to the calculation, to calculate the predicted position at a prediction time later than the actual time by a short period. The prediction time may be a time later than the actual time by several hundred milliseconds to several seconds. The server CPU 14 may use the own vehicle information, such as the moving direction, the movement speed, or the attitude of the vehicle 100, to calculate a moving direction and an amount of movement from the actual position, in consideration of a behavior of the vehicle 100. The server CPU 14 may regard a position based on a result of the calculation as the predicted position of the vehicle 100.

In Step ST29, the server CPU 14 may map, on the predicted map, the predicted positions of the mobile bodies estimated on the basis of the latest field information. Thus, the predicted positions based on the latest information about the vehicles 100 may be mapped on the predicted map.

In Step ST30, the server CPU 14 may determine whether processing has been completed for the vehicles 100 of the mobile body list. In a case where processing for all the vehicles 100 of the mobile body list has not been completed (Step ST30: NO), the server CPU 14 may cause the process to return to Step ST28. The server CPU 14 may select the next vehicle 100 not subjected to processing yet, and repeat the processes from Step ST28 to Step ST30. Upon completion of the processing for all the vehicles 100 of the mobile body list (Step ST30: YES), the server CPU 14 may terminate the process of mapping on the predicted map, and cause the process to proceed to Step ST31. Thus, the predicted positions of the target vehicles 100 may be mapped, on the predicted map, to represent a relative positional relationship between the target vehicles 100.

In Step ST31, the server CPU 14 may generate courses or ranges that allow the target vehicles 100 to travel safely. For example, the server CPU 14 may generate, for each of the target vehicles 100, a safe course not interfering with or approaching another mobile body, from the actual position of the vehicle 100 on the actual map toward the predicted position of the vehicle 100 on the predicted map. If the vehicle 100 is assumed to move from the actual position to the predicted position, and a course of the vehicle 100 does not intersect with a course of the other vehicle 100, or intersects with the course of the other vehicle 100 with a time lag, the server CPU 14 may, for example, generate a traveling course from the actual position to the predicted position. In contrast, if the vehicle 100 is assumed to move from the actual position to the predicted position, and a course of the vehicle 100 intersects with a course of the other vehicle 100 at substantially the same time, the server CPU 14 may generate a course from the actual position to a position immediately before the intersection, as a traveling course. In this case, the server CPU 14 may generate a course of decelerating to stop at the position immediately before the intersection. These processes enable the server CPU 14 to generate, on the basis of virtual courses of the vehicles 100 from the positions on the actual map to the positions on the predicted map, a course within which each of the vehicles 100 is able to travel safely in a short section, to prevent the courses of the vehicles 100 from intersecting with each other. The server CPU 14 may generate, instead of such a specific course, a safely movable range that allows each of the vehicles 100 to travel safely. The safely movable range may be generated, for example, not to overlap the safely movable range of the other vehicle 100. The server CPU 14 may record the course or the range generated for each of the vehicles 100, as the primary processed information obtained from the field information, in the server memory 13. The server CPU 14 may generate, on the basis of the acquired information, the primary processed information usable for determination or control of the movement of the vehicle 100 in each of the vehicles 100 or the terminal devices 2.

In Step ST32, the server CPU 14 may determine whether processing has been completed for the vehicles 100 of the mobile body list. In a case where processing for all the vehicles 100 of the mobile body list has not been completed (Step ST32: NO), the server CPU 14 may cause the process to return to Step ST31. The server CPU 14 may select the next vehicle 100 not subjected to processing yet, and repeat the processes from Step ST31 to Step ST32. Upon completion of the processing for all the vehicles 100 of the mobile body list (Step ST32: YES), the server CPU 14 may terminate the course generation process illustrated in FIG. 6.

As described above, the server CPU 14 may map, on the actual map, the actual positions of the plurality of mobile bodies estimated on the basis of the collected field information. The server CPU 14 may also estimate the future predicted positions of the plurality of mobile bodies, on the basis of the actual map, and the traveling direction, the traveling speed, or the traveling state of each of the plurality of mobile bodies estimated on the basis of the collected field information. The server CPU 14 may map the predicted positions on the predicted map. The server CPU 14 may generate, assuming the movement of the plurality of mobile bodies from the positions on the actual map to the positions on the predicted map, a course or a movable range within which each of the plurality of mobile bodies is able to travel in a short section, as the primary processed information obtained on the basis of the field information.

Figure 7:
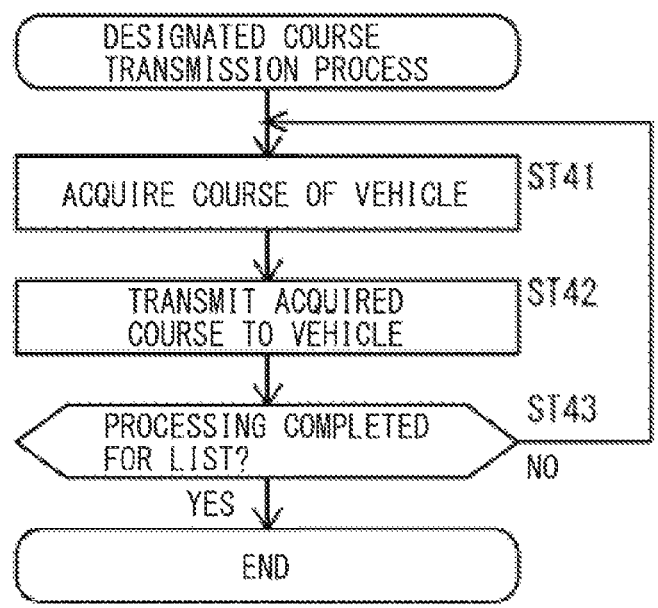
FIG. 7 is a flowchart illustrating a process of transmitting, by the server CPU illustrated in FIG. 2, information usable for determination or control of the movement of the vehicle and generated in the generation process illustrated in FIG. 6.

FIG. 7 is a flowchart illustrating a process of transmitting, by the server CPU 14 illustrated in FIG. 2, the information usable for determination or control of the movement of the vehicle 100 and generated in the generation process illustrated in FIG. 6.

In the generation process illustrated in FIG. 6, the server CPU 14 of the server 6 may generate, as the primary processed information, information on a course or a movable range within which each of the plurality of mobile bodies is able to travel in a short section. The server CPU 14 of the server 6 may repeatedly execute the primary processed information transmission process illustrated in FIG. 6.

The server CPU 14 of the server 6 may repeatedly execute the transmission process illustrated in FIG. 7, each time the server CPU 14 executes the course generation process illustrated in FIG. 6.

In Step ST41, the server CPU 14 may acquire, as the primary processed information, the latest information related to the course or the movable range of the vehicle 100 and recorded in the server memory 13.

In Step ST42, the server CPU 14 may transmit the acquired primary processed information, via the server communication device 11, to the communication device 71 of the vehicle 100 corresponding to the primary processed information. The primary processed information may be transmitted from the server 6 to the wireless base station 4 via the dedicated network 5, and may thereafter be transmitted from the wireless base station 4 to the terminal device 2 of the vehicle 100. The communication apparatuses may transmit the generated primary processed information to the terminal devices 2 provided in the vehicles 100.

In Step ST43, the server CPU 14 may determine whether processing has been completed for the vehicles 100 of the mobile body list. In a case where processing for all the vehicles 100 of the mobile body list has not been completed (Step ST43: NO), the server CPU 14 may cause the process to return to Step ST41. The server CPU 14 may select the next vehicle 100 not subjected to processing yet, and repeat the processes from Step ST41 to Step ST43. Upon completion of the processing for all the vehicles 100 of the mobile body list (Step ST43: YES), the server CPU 14 may terminate the transmission process illustrated in FIG. 7.

The server 6 may thus transmit, to the vehicles 100, the primary processed information to be used for the control or determination of each of the vehicles 100. For example, the server 6 may transmit, to each of the vehicles 100, the primary processed information indicating the traveling direction and the traveling speed of the vehicle 100. The primary processed information may further include, as information for verification, the actual position, the actual time, and the prediction time, for example. By repeating the process illustrated in FIG. 7, the server 6 may keep transmitting, repeatedly, the primary processed information related to the course in the short section to each of the vehicles 100.

It is to be noted that the server 6 may transmit, to the vehicles 100, the field information to be collected from the vehicles 100, together with or in place of the primary processed information.

Figure 8:
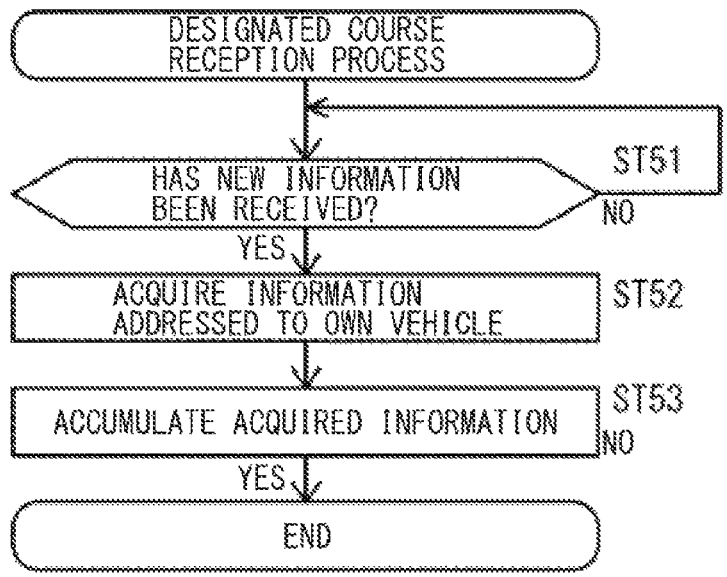
FIG. 8 is a flowchart illustrating a process of receiving information usable for determination or control of the movement of the vehicle by a terminal device of the control system for the vehicle illustrated in FIG. 3.

FIG. 8 is a flowchart illustrating a process of receiving the information usable for determination or control of the movement of the vehicle 100 by the terminal device 2 of the control system 20 of the vehicle 100 illustrated in FIG. 3.

The terminal device 2 of the vehicle 100 may receive the primary processed information from the wireless base station 4. The terminal device 2 may receive the field information from the wireless base station 4.

The external communication ECU 27 of the terminal device 2 may repeatedly execute the primary processed information reception process illustrated in FIG. 8. The external communication ECU 27 may repeatedly execute the reception process illustrated in FIG. 8, each time the primary processed information is received.

In Step ST51, the external communication ECU 27 may determine whether new information addressed to the own vehicle has been received. The communication device 71 may receive, from the server 6, the primary processed information addressed to the own vehicle or the field information addressed to the own vehicle. In this case, the external communication ECU 27 may determine that the new information addressed to the own vehicle has been received (Step ST51: YES), and cause the process to proceed to Step ST52. In a case where the communication device 71 has not received the new information addressed to the own vehicle from the server 6 (Step ST51: NO), the external communication ECU 27 may repeat the process in Step ST51.

In Step ST52, the external communication ECU 27 may acquire the information addressed to the own vehicle from the communication device 71. The information addressed to the own vehicle may refer to information usable for the control of the own vehicle. The information addressed to the own vehicle may include, for example, as well as information related to control of a device of the own vehicle, information related to surroundings of the own vehicle and processable into the information related to the control.

In Step ST53, the external communication ECU 27 may accumulate the acquired information addressed to the own vehicle in the communication memory 72. Thus, the information addressed to the own vehicle may be accumulated and recorded in the communication memory 72 of the vehicle 100.

As described above, the terminal device 2 of the vehicle 100 may receive and accumulate the primary processed information obtained on the basis of the field information related to the movement of the plurality of mobile bodies.

It is to be noted that the terminal device 2 may receive and accumulate the collected field information itself related to the movement of the plurality of mobile bodies.

Figure 9:
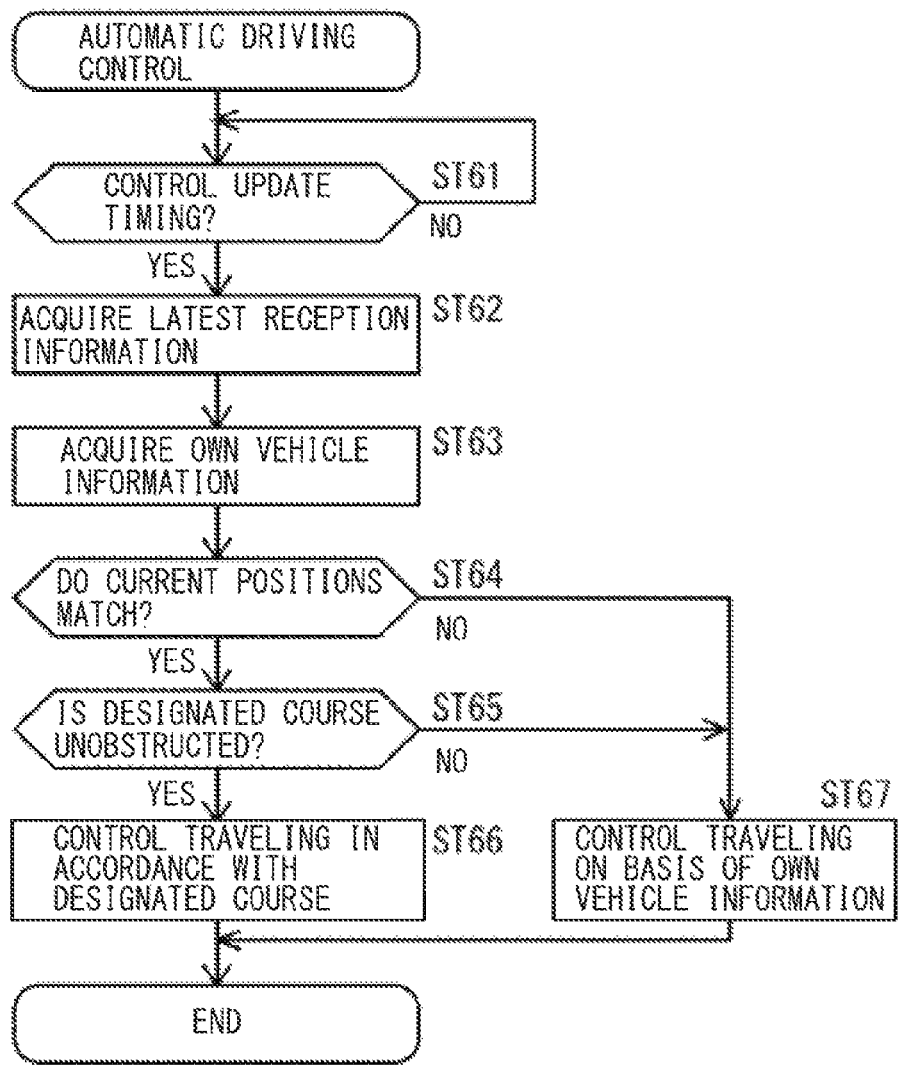
FIG. 9 is a flowchart illustrating a process of controlling automatic driving or driving assist of the vehicle by a traveling control ECU of the control system for the vehicle illustrated in FIG. 3.

FIG. 9 is a flowchart illustrating a process of controlling the automatic driving or the driving assist of the vehicle 100 by the traveling control ECU 24 of the control system 20 of the vehicle 100 illustrated in FIG. 3.

The traveling control ECU 24 that controls the traveling of the vehicle 100 may repeatedly execute the traveling control based on the primary processed information illustrated in FIG. 9. The traveling control ECU 24 may repeat the traveling control illustrated in FIG. 9 by, for example, a cycle shorter than time taken for the vehicle 100 to travel through the course based on the primary processed information. For example, the repetition cycle in this case may be about several ten milliseconds to about several hundred milliseconds.

In Step ST61, the traveling control ECU 24 may determine whether a timing of updating the control has arrived. The traveling control ECU 24 may determine, on the basis of the current time of the GNSS receiver 66, whether time elapsed from the previous control update timing has reached a predetermined update cycle. In another example, the traveling control ECU 24 may estimate a termination time of the currently executed control based on the course, and determine whether time left before the estimated termination time is less than a threshold. In a case where the update cycle has not been reached (Step ST61: NO), the traveling control ECU 24 may repeat the determination process in Step ST61. Upon determining that the update cycle has been reached and the control update timing has arrived (Step ST61: YES), the traveling control ECU 24 may cause the process to proceed to Step ST62.

In Step ST62, the traveling control ECU 24 may acquire the latest primary processed information. The traveling control ECU 24 may acquire, from the communication memory 72 via the external communication ECU 27, the primary processed information last-received by the communication device 71. The traveling control ECU 24 may also acquire other primary processed information received earlier than the latest primary processed information, together with the latest primary processed information. The plurality of pieces of primary processed information makes it possible to sense a change in the movement.

In Step ST63, the traveling control ECU 24 may acquire the own vehicle information from each part of the own vehicle. For example, the traveling control ECU 24 may acquire the current location and information on another surrounding mobile body from the detection ECU 26. In a case of the driving assist, the traveling control ECU 24 may acquire information on an operation performed by the user from the driving operation ECU 25.

In Step ST64, the traveling control ECU 24 may determine matching between the information and the actual current position. The traveling control ECU 24 may compare the current location detected by the own vehicle and the actual position included in the latest primary processed information. In a case where these positions match with a minor error that does not hinder the traveling control (Step ST64: YES), the traveling control ECU 24 may determine that the current positions match, and cause the process to proceed to Step ST65. In a case where an error between these positions is larger than the minor error (Step ST64: NO), the traveling control ECU 24 may determine that the current positions do not match, and cause the process to proceed to Step ST67.

In Step ST65, the traveling control ECU 24 may determine whether the course from the current position designated by the latest primary processed information is in an unobstructed state in which the own vehicle is able to travel. For example, the traveling control ECU 24 may determine, on the basis of the acquired peripheral information detected by the own vehicle, an obstacle, abnormality, presence or absence of risk, and presence or absence of another passing mobile body within the designated course or movable range. In a case where these hindrances are unlikely to be present (Step ST65: YES), the traveling control ECU 24 may determine that the designated course is unobstructed, and cause the process to proceed to Step ST66. In a case where a hindrance is present or likely to be present (Step ST65: NO), the traveling control ECU 24 may determine that the designated course or movable range is obstructed, and cause the process to proceed to Step ST67.

The traveling control ECU 24 may not only simply determine the unobstructedness of the designated course on the basis of the peripheral information detected by the own vehicle and acquired by the autonomous sensor. The traveling control ECU 24 may also compare the detection value of the autonomous sensor, and information included in the latest primary processed information. The traveling control ECU 24 may thus determine the unobstructedness of the designated course on the basis of an error between the detection value and the included information. In a case where a type of physical quantity or a coordinate system differs between the detection value of the autonomous sensor and information to be acquired externally, the traveling control ECU 24 may convert the physical quantity or the coordinate system of the externally acquired information, to make the information comparable with the detection value of the autonomous sensor. In this case, the traveling control ECU 24 may compare a value of a pseudo-sensor resulting from the conversion and the detection value of the autonomous sensor. In a case where the error is equal to or greater than a threshold (Step ST65: NO), the traveling control ECU 24 may determine that the designated course or movable range is obstructed, and cause the process to proceed to Step ST67. In a case where the error is less than the threshold (Step ST65: YES), the traveling control ECU 24 may determine that the designated course is unobstructed, and cause the process to proceed to Step ST66.

In Step ST66, the traveling control ECU 24 may control the traveling in accordance with the designated course.

The traveling control ECU 24 may generate, as the traveling control data, the designated course or a course within the designated movable range. In a case where a course represented by a vector including a direction and a distance or time has been acquired from the server 6, the traveling control ECU 24 may generate the traveling control data along the course. In a case where a safely movable range within which the own vehicle is able to travel has been acquired from the server 6, the traveling control ECU 24 may calculate a vector including a direction and a distance or time in which the own vehicle is able to travel at maximum within the safely movable range, and generate a course represented by the vector, as the traveling control data.

The traveling control ECU 24 may control the traveling of the own vehicle, on the basis of the generated traveling control data. In a case of the driving assist, the traveling control ECU 24 may adjust an operation performed by the user, to prevent the own vehicle from greatly deviating from the course based on the generated traveling control data. In the adjustment, the traveling control ECU 24 may adjust the operation performed by the user, to prevent the own vehicle from deviating from the designated movable range.

As described above, the traveling control ECU 24 may determine the course of the own vehicle and control or assist the traveling of the vehicle, on the basis of the primary processed information received by the terminal device 2 and obtained on the basis of the field information related to the movement of the plurality of mobile bodies.

In Step ST67, the traveling control ECU 24 may generate the traveling control data, on the basis of information independently detected by the autonomous sensor of the own vehicle, instead of the designated course. In the generation, the traveling control ECU 24 may use information on the designated course or movable range as subordinate information to obtain the traveling control data based on the autonomous sensor, and generate the traveling control data within the designated course or range.

The traveling control ECU 24 may control the traveling of the own vehicle, on the basis of the generated traveling control data. In a case of the driving assist, the traveling control ECU 24 may adjust an operation performed by the user, to prevent the own vehicle from greatly deviating from the course based on the generated traveling control data. In the adjustment, the traveling control ECU 24 may adjust the operation performed by the user, to prevent the own vehicle from deviating from the designated movable range.

As described above, the traveling control ECU 24 may, in the vehicle 100 serving as a mobile body, acquire the primary processed information received by the communication device 71, generate the traveling control data from the primary processed information, and control or assist the traveling of the vehicle 100 on the basis of the generated traveling control data. On the basis of the course designated in the acquired primary processed information, it is possible for the traveling control ECU 24 to execute determination or control of the movement of the vehicle, and control or assist the traveling of the vehicle 100. The traveling control data may serve as secondary processed information to be used for determination or control of the movement of the vehicle 100.

Unlike in the example embodiment, the terminal device 2 may receive information other than the information on the course or the movable range, for example, the field information, from the wireless base station 4. In this case, the traveling control ECU 24 may generate, on the basis of the information acquired by the reception, a course or a movable range by a process similar to that for the server 6, and execute the process illustrated in FIG. 9 on the basis of the course or the movable range. For example, the traveling control ECU 24 may generate, from the field information, information on a course or a movable range within which the own vehicle is able to travel in a short section, and execute the process illustrated in FIG. 9 on the basis of the generated information.

As described above, in the example embodiment, the server 6 may collect the field information related to the movement of the vehicles 100 serving as a plurality of mobile bodies. The server 6 may generate, on the basis of the collected field information, a course or a safely movable range in a short section for each of the mobile bodies. The courses or the safely movable ranges may allow the plurality of mobile bodies to travel therewithin safely without colliding with each other, for example. The server 6 may transmit the generated course or safely movable range in the short section to each of the communication devices 71 of the terminal devices 2, as the primary processed information. The communication device 71 of the terminal device 2 may be configured to receive, from the server 6, the primary processed information related to and usable in the corresponding mobile body. Consequently, it is possible for the communication device 71 to obtain course information related to the own movement generated in consideration of a course in accordance with which another mobile body moves. Each of the mobile bodies may obtain its own course information generated in consideration of a course in accordance with which another mobile body moves, and travel on the basis of the course information. This makes the mobile body less likely to be influenced by unpredicted movement of the other mobile body. The plurality of mobile bodies, such as vehicles, may thus move in accordance with common information, which enhances mutual safety during traveling.

Figure 10:
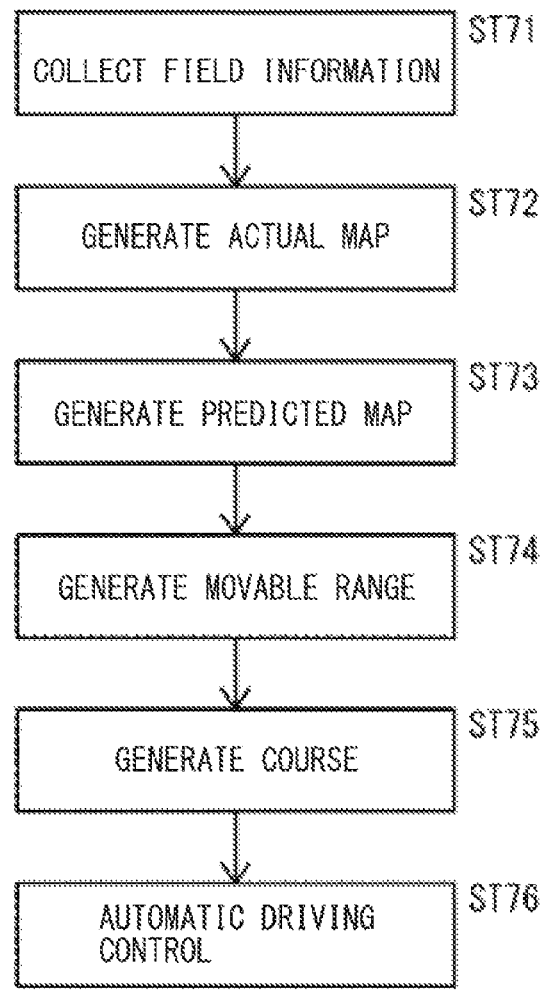
FIG. 10 is an explanatory diagram illustrating a series of processes of obtaining information on a course of a mobile body from field information according to one example embodiment.

FIG. 10 is an explanatory diagram illustrating a series of processes of obtaining the course information of the mobile body from the field information according to the first example embodiment.

In Step ST71, the mobility information provision system 1 may collect the field information related to the traveling of the vehicles 100.

In Step ST72, the mobility information provision system 1 may obtain the actual positions of the vehicles 100, on the basis of the field information related to the traveling of the vehicles 100, and map the actual positions on the actual map.

In Step ST73, the mobility information provision system 1 may obtain the predicted positions of the vehicles 100, on the basis of the field information related to the traveling of the vehicles 100, and map the predicted positions on the predicted map.

In Step ST74, the mobility information provision system 1 may obtain a movable range or a designated course for each of the vehicles 100, on the basis of the actual map and the predicted map.

In Step ST75, the mobility information provision system 1 may obtain, from the movable range or the designated course for each of the vehicles 100, the course to be used by each of the vehicles 100 for control or determination.

In Step ST76, in the mobility information provision system 1, the vehicles 100 may each control the traveling of the own vehicle by the automatic driving, for example, along the course for the vehicle 100.

In the first example embodiment, the server 6 coupled to the wireless base stations 4 may execute the processes from Step ST71 to Step ST74, and the control system 20 of the vehicle 100 may execute the processes from Step ST75 to Step ST76.

In another example, the server 6 may execute the processes from Step ST71 to Step ST72, execute the processes from the Step ST71 to Step ST73, or execute the processes from Step ST71 to Step ST75. In this case, the server 6 may transmit the primary processed information generated by the processes to the terminal devices 2 of the vehicles 100. Each of the vehicles 100 may execute the process in Step ST76 in processes based on the primary processed information received by the terminal device 2, to control the traveling of the own vehicle.

Second Example Embodiment

Description will be given below on various modification examples and specific but non-limiting examples of the mobility information provision system 1 for mobile bodies according to the first example embodiment.

The mobility information provision system 1 according to the first example embodiment may be allowed to supply each of the terminal devices 2 of the vehicles 100, serving as a plurality of mobile bodies, with information on a course in a case where all of the wireless base stations 4, the dedicated network 5, and the server 6 operate and function normally. If only the single mobility information provision system 1 provides information to the terminal devices 2 of the vehicles 100, serving as the mobile bodies, there is a possibility that it becomes difficult to appropriately supply the terminal devices 2 of the vehicles 100 with the information on the corresponding course, although the vehicles are the mobile bodies which are to be provided with the information. Such a situation can be caused, for example, in a case of disaster, in a case where a particular section is present where appropriate information provision by the mobility information provision system 1 according to the first example embodiment is prevented, or in any other case. Accordingly, it may be expected for the mobility information provision system 1, which provides a mobile body such as the vehicle 100 with information for controlling or determining movement, to appropriately supply information also in a case of emergency. An example that addresses such a situation is described below.

Figure 11:
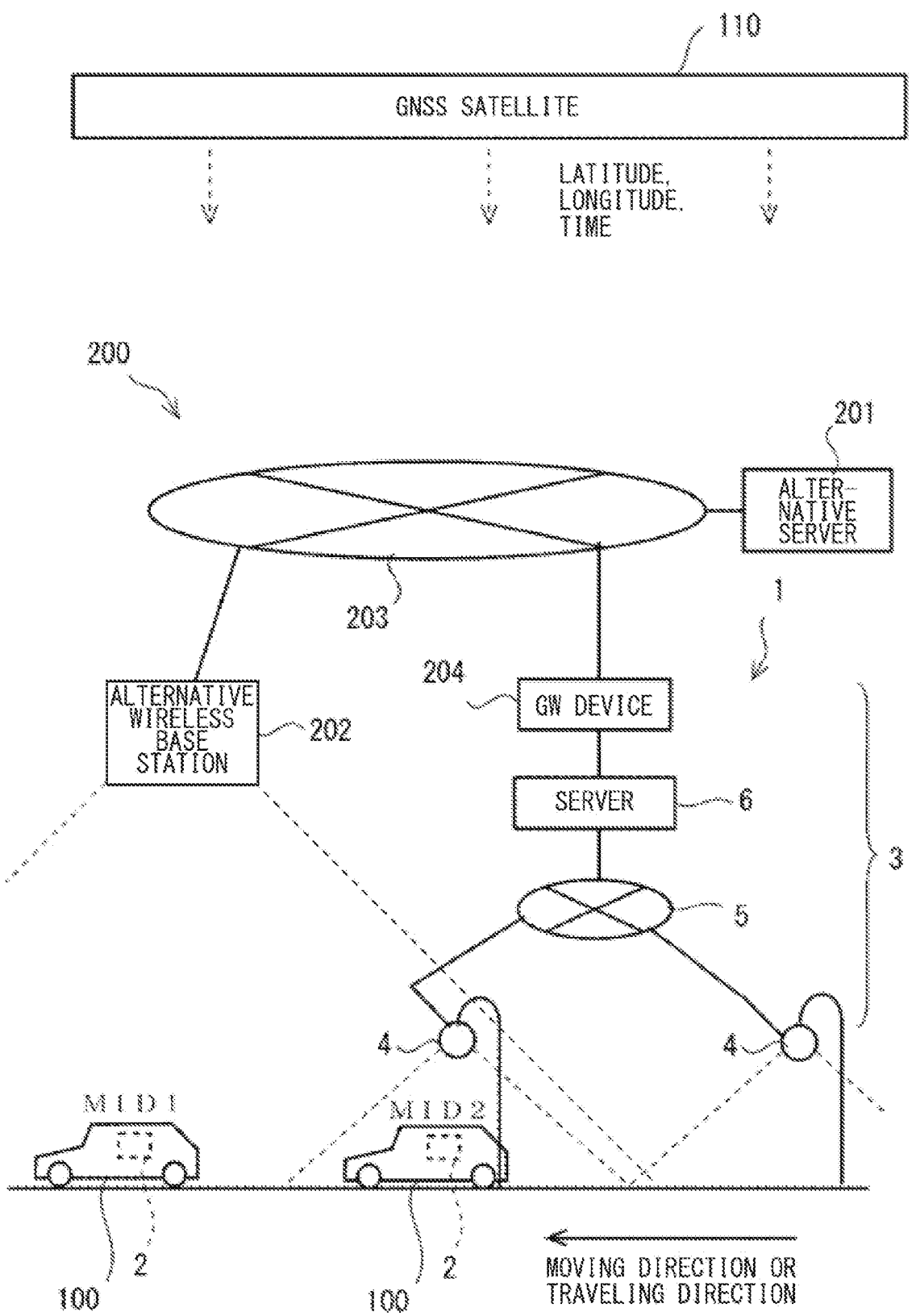
FIG. 11 is a configuration diagram illustrating a mobility information provision system for mobile bodies according to one example embodiment.

FIG. 11 is a configuration diagram illustrating the mobility information provision system 1 for mobile bodies according to a second example embodiment of the technology.

The mobility information provision system 1 illustrated in FIG. 11 may include, in addition to the configuration similar to that illustrated in FIG. 1, a gateway (GW) device 204, the Internet 203, an alternative server 201, and a plurality of alternative wireless base stations 202.

The alternative server 201 and the alternative wireless base stations 202 may belong, for example, to another mobility information provision system 1 different from the mobility information provision system 1 according to the first example embodiment. Such another mobility information provision system 1 may be provided by another entity, nation, or a group different from that of the mobility information provision system 1 according to the first example embodiment.

The alternative server 201 and the alternative wireless base stations 202 may be coupled to the Internet 203 and may perform data transmission and data reception via the Internet 203. The Internet 203 may be a public open network.

The alternative wireless base stations 202 may be provided for, for example, respective regions or respective sections of a road. The alternative wireless base stations 202 may communicate with the terminal device 2 used in each of the vehicles 100 in the region or the section of which the alternative wireless base station 202 is in charge.

The alternative servers 201 may provide the vehicles 100 with functions similar to those of the server 6 according to the first example embodiment.

The GW device 204 may be coupled to the server 6 and the Internet 203.

The server 6 may transmit information, which the server 6 holds, such as the field information or the primary processed information to the GW device 204 in a case where the server 6 is prevented from performing transmission and reception of data with the wireless base stations 4 via the dedicated network 5 under the server 6 for a certain period. Such a case may be caused, for example, by occurrence of a disaster. The GW device 204 may transmit the data received from the server 6 to the preset alternative server 201 via the Internet 203.

Upon starting to receive the information from the server 6, the alternative server 201 may start a process to serve as an alternative server. The alternative server 201 may perform, for example, processes similar to those of the server 6. For example, the alternative server 201 may acquire field information from the vehicles 100, generate the primary processed information from the acquired field information, and repeatedly transmit the generated primary processed information to the vehicles 100. Regarding the vehicle 100 which has received information from the mobility information provision system 1 according to the first example embodiment, the alternative server 201 may add, for example, unique information (identification information) provided for each wireless terminal of the vehicle 100 to the primary processed information, and repeatedly transmit the unique information and the primary processed information together to each of the vehicles 100. On this occasion, the alternative wireless base station 202 may associate the plurality of pieces of information for the respective wireless terminals of the vehicles 100 to corresponding pieces of unique information of the respective wireless terminals and transmit the plurality of pieces of information together at a single transmission process. The unique information of the vehicle 100 may be set uniquely for each vehicle. Examples of such unique information may include an entry prohibited zone based on a vehicle number, a day or time preset for vehicle entry prohibition, permission for use of an express lane, presence or absence of ETC card use, presence or absence of vignette, a vehicle body width, and presence or absence of cold-place specification. The unique information may include a server ID of the vehicle with which communication is to be performed. The unique information of the vehicle including the server ID may be transmitted to the server 6 when a request for behavior of the vehicle 100 is requested to the server 6. This may allow the server 6 to recognize that the received unique information belongs to the vehicle 100 from which the request has been transmitted. The unique information may include a system time of the vehicle.

With such a configuration, the terminal device 2 provided in any of the vehicles 100 may be allowed to receive the primary processed information associated with its own identification information from the alternative wireless base station 202. Even if the terminal device 2 provided in any of the vehicles 100 is prevented from receiving the primary processed information from the mobility information provision system 1 according to the first example embodiment, the terminal device 2 may be allowed to receive the primary processed information from the alternative server 201 or any of the alternative wireless base stations 202. The control system 20 of any of the vehicles 100 may be allowed to continue to determine and control travel on the basis of the primary processed information addressed to the own vehicle which the terminal device 2 has received.

According to the second example embodiment, in a case where it is difficult to continue appropriate transmission and reception of data because of a situation such as occurrence of a disaster, the terminal device 2 of any of the vehicles 100 may switch the system on the base station side from the system 3 on the base station side that has been used to an alternative system 3 on an alternative base station side, and thereby continue to receive information from the system 3 on the alternative base station side.

Third Example Embodiment

The wireless base stations 4 of the mobility information provision system 1 according to the first example embodiment may be arranged along a road. In one example embodiment, the wireless base stations 4 may be provided in respective areas that are divisional parts of a region.

For example, in a special area such as a roadside parking lot, the wireless base stations 4 may not necessarily be able to operate to allow the vehicles 100 to travel appropriately. Unlike on a major road such as a highway, a mobile body such as a pedestrian moves around in the special area such as a parking lot. For such a reason, a special mobility information provision system 1 different from the mobility information provision system 1 according to the first example embodiment may be used in the special area such as the parking lot, and the special mobility information provision system 1 may provide information to the vehicles 100 present in the special area.

In a case of performing such system switching, the vehicle 100 may keep using the closed communication to be coupled to a controlled zone in a public space. Because the system 3, on the base station side, providing information is to be changed, the vehicle 100 may need to determine the order of priorities between the system 3 on the base station side used before the switching and the system 3 on the base station side to be used after the switching in order to use information. An example that addresses such a situation is described below.

Figure 12:
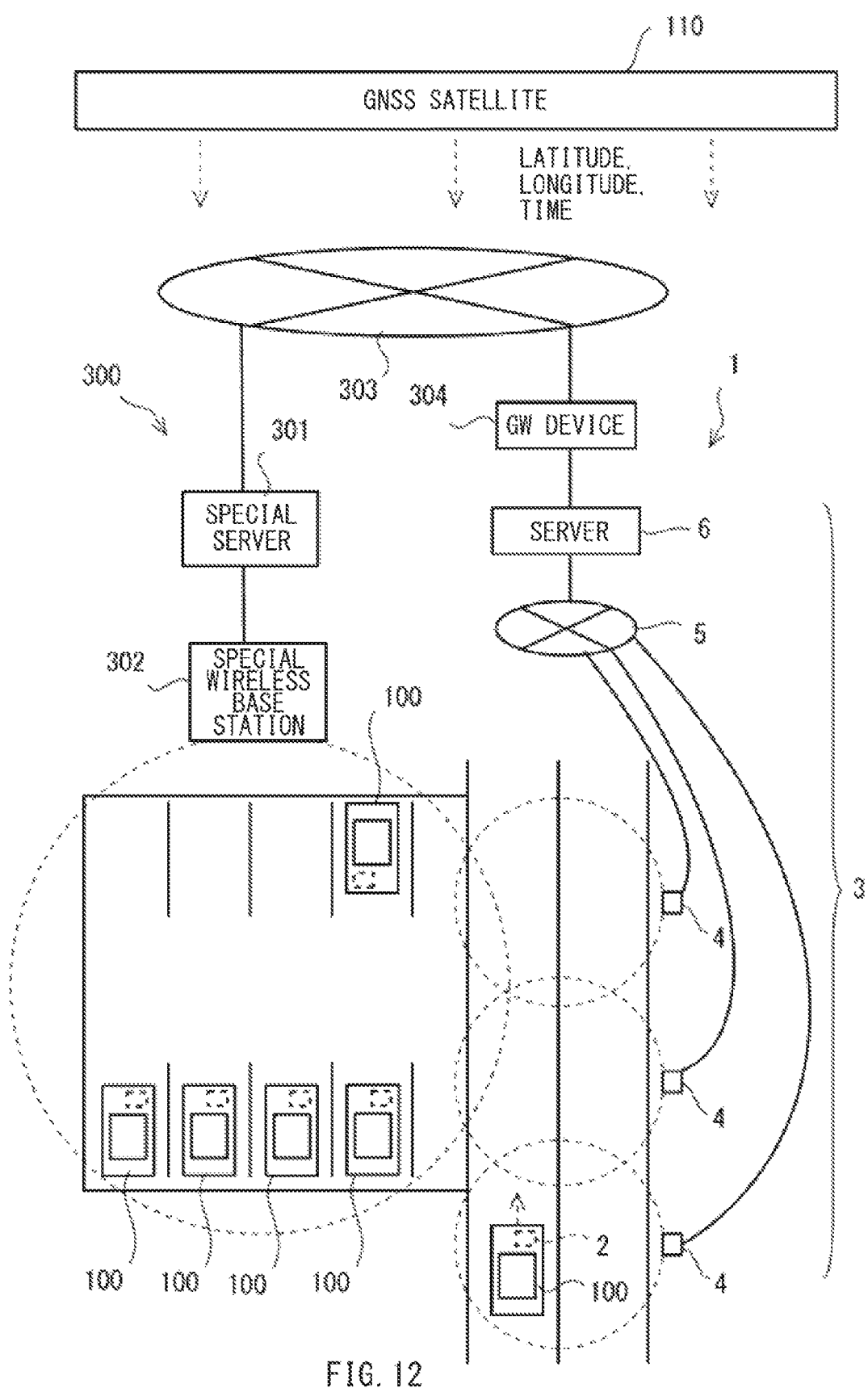
FIG. 12 is a configuration diagram illustrating a mobility information provision system for mobile bodies according to one example embodiment.

FIG. 12 is a configuration diagram illustrating the mobility information provision system 1 for mobile bodies according to a third example embodiment of the technology.

The mobility information provision system 1 illustrated in FIG. 12 may include, in addition to the configuration similar to that illustrated in FIG. 1, a GW device 304, the Internet 303, a special server 301, and a special wireless base station 302.

The special server 301 and the special wireless base station 302 may belong, for example, to another mobility information provision system 1 different from the mobility information provision system 1 according to the first example embodiment. Such another mobility information provision system 1 may be provided by another entity, nation, or a group different from that of the mobility information provision system 1 according to the first example embodiment.

The special server 301 may be coupled to the special wireless base station 302 and the Internet 303. The special server 301 may be coupled to the special wireless base station 302 via a public closed network.

The special wireless base station 302 may communicate with the terminal devices 2 of the vehicles 100 accommodated in the special area such as a parking lot.

The special server 301 may generate, in accordance with a situation of the special area such as the parking lot, information on a course or a movable range suitable for the special area, and repeatedly transmit the generated information to the vehicles 100.

The mobility information provision system 1 may include the GW device 304. The GW device 304 may be coupled to the server 6 and the Internet 303.

For example, when the vehicle 100 traveling on a road arrives at the vicinity of the destination, the server 6 may search for a parking lot along the road to park the vehicle 100. The server 6 may request the special server 301 related to the searched parking lot to take over information transmission. The special server 301 may receive such an information transmission takeover request via the GW device 304 and the Internet 303.

Upon receiving the information transmission takeover request, the special server 301 may start a process of repeatedly transmitting information to the vehicle 100 related to the received request. The special server 301 may generate, on the basis of an availability situation of the parking lot, information on a course or a movable range that leads the vehicle 100 to an available space. On this occasion, the special server 301 may take into consideration the special situation in the parking lot, movement of a pedestrian, and starting of the parked vehicle 100, and generate the information on the course or the movable range that secures safety in such a special situation. The special server 301 may add, to the generated information, the identification information of the vehicle 100 related to the request, and transmit the generated information and the added identification information. The special wireless base station 302 may transmit the information received from the special server 301 toward the parking lot.

The terminal device 2 of the vehicle 100 related to the information transmission takeover may receive the information transmitted by the special wireless base station 302. The control system 20 of the vehicle 100 may perform determination or a control of traveling of the own vehicle on the basis of the information received by the terminal device 2. The control system 20 of the vehicle 100 may convert a relative position regarding the received information on an as-needed basis, and generate vector data having an azimuth angle adapted to determine or control the course of the vehicle 100. The control system 20 may perform determination or control of the traveling of the own vehicle on the basis of the generated vector data.

As described above, according to the third example embodiment, the information on the course in the special area such as the parking lot may be transmitted from the system 3 on the base station side dedicated for the special area. The mobility information provision system 1 according to the first example embodiment may be configured to hand over or take over the provision of information to the vehicle 100 to or from the system 3 on the other base station side. The control system 20 of the vehicle 100 may give priority to the dedicated system 3 on the base station side for the special area over the system 3 on the base station side for a normal road.

The mobility information provision system 1 according to the first example embodiment may generate courses or movable ranges of the vehicles 100 for each road.

Some roads have several lanes directed in the same direction. The road traffic condition or the number of preceding vehicles may be different between the lanes. For example, the vehicles 100 are likely to be decelerated and congested at an exit or a junction of a highway.

An example that addresses such a situation is described below.

Figure 13A:
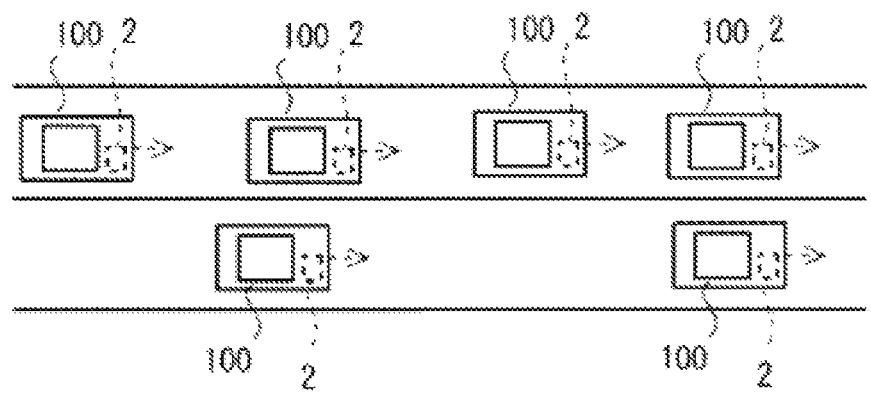
FIGS. 13A to 13C are each an explanatory diagram illustrating a process of generating, by a mobility information provision system for mobile bodies according to one example embodiment, information on a course or a movable range for each lane.
Figure 13B:
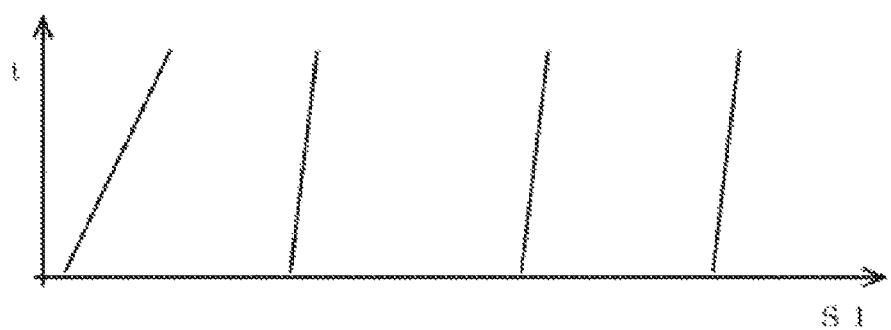
Figure 13C:
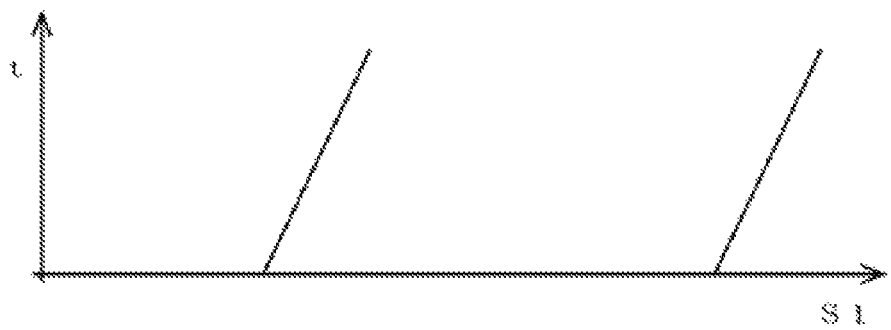

FIGS. 13A, 13B, and 13C illustrate a process executed by the mobility information provision system 1 for mobile bodies to generate information on the courses or movable ranges of the vehicles 100 for each lane, according to a fourth example embodiment.

FIG. 13A illustrates a road having a first lane and a second lane on which the vehicles 100 are traveling in the same direction.

FIG. 13B is a vehicle operation diagram illustrating traveling conditions of the vehicles 100 traveling on the first lane.

FIG. 13C is a vehicle operation diagram illustrating traveling conditions of the vehicles 100 traveling on the second lane.

The vehicle operation diagrams of FIGS. 13B and 13C may each have a horizontal axis representing a position along the lane, a vertical axis representing time, and an origin point corresponding to a current time. Lines in the vehicle operation diagrams may indicate the movement of the vehicles 100. Each of the vehicles 100 may change its position while moving along the corresponding line over time from a current position corresponding to an intersection between the vertical axis and the horizontal axis. The vehicle operation diagram may summarize, on the basis of positions and times, the positions of the vehicles 100 on the actual map and positions of the vehicles 100 on a plurality of predicted maps representing different times.

On the basis of the actual positions and the speeds included in the field information of the vehicles 100, the server 6 may generate the vehicle operation diagrams of FIGS. 13B and 13C that illustrate the traveling conditions of the vehicles 100. For example, the server 6 may select, on the basis of the positions or the history of the positions acquired from the vehicles 100, one vehicle operation diagram corresponding to the lane on which the vehicles 100 are actually traveling from the vehicle operation diagrams for the respective lanes. The server 6 may map an actual position or a predicted position of each of the vehicles 100 on the selected vehicle operation diagram on the basis of the time, position, speed, or acceleration rate acquired from the corresponding vehicle 100, for example.

The server 6 may generate information on the course or movable range of each of the vehicles 100 on the basis of the vehicle operation diagram so that a line of each of the vehicles 100 is prevented from intersecting with or coming too close to a line of the other vehicle 100 traveling in front of or behind the vehicle 100.

For example, in the vehicle operation diagram illustrated in FIG. 13B, first to third vehicles 100 in front in a traveling direction may be traveling from the left to the right of FIG. 13B at substantially the same speed. In contrast, a fourth vehicle 100, which is the closest to the origin point, may be traveling at a speed higher than those of the first, second, and third vehicles 100 traveling in front of the fourth vehicle 100. If these vehicles 100 keep traveling at this rate, the fourth vehicle 100 would collide with the third vehicle 100. The server 6 may predict and determine the possibility of such a collision on the basis of the mapping, and generate the information on the courses or the movable ranges that causes the first to fourth vehicles 100 to move avoiding the possible collision determined. For example, the server 6 may generate the information on the course or movable range of the first to third vehicles 100 that causes the first to third vehicles 100 to keep traveling at a current speed, and the information on the course or movable range of the fourth vehicle 100 that causes the fourth vehicle 100 to decelerate to the same speed as those of the first to third vehicles 100 traveling in front of the fourth vehicle 100. The automatic driving of the fourth vehicle 100 may then be controlled on the basis of the information received from the server 6 so that the fourth vehicle 100 decelerates to a specified speed within the movable range in which the fourth vehicle 100 is prevented from colliding with the third vehicle 100.

The server 6 may further calculate an average speed of the vehicles 100 for each lane and compare the average speeds. For example, the server 6 may preliminarily calculate and compare the average speeds of the vehicles 100 at a timing corresponding to the predicted map. In a case where the average speed is different among the lanes, the server 6 may generate the information on the course or movable range that causes the vehicle 100 traveling on the lane of a lower average speed to move to the lane of a higher average speed. In that case, the server 6 may generate the information on the course or movable range that causes the vehicle 100 to move to the lane of the highest average speed out of the lanes. For example, the server 6 may generate the course or movable range that causes the vehicle 100 to make a lane change at a decelerating or accelerating speed without coming too close to the other vehicles 100 traveling on the lane to which the vehicle 100 has moved.

The server 6 may transmit the generated information on the course or movable range involving lane changing.

The control system 20 of the vehicle 100 may control or determine the travel of the own vehicle along the course or movable range transmitted from the wireless base station 4 to the terminal device 2. This may cause the vehicle 100 to make a lane change in response to an instruction. After making the lane change, the vehicle 100 is able to smoothly travel avoiding the traffic congestion or deceleration on the original lane.

It is expected that execution of such control on the vehicles 100 helps to prevent occurrence of the traffic congestion in advance or helps to relieve the traffic congestion earlier.

For example, the traveling speeds and the average speed of the vehicles 100 traveling on the lane of FIG. 13B may be lower than those of the vehicles 100 traveling on the lane of FIG. 13C. In that case, the server 6 may instruct the fourth vehicle 100 traveling on the lane of FIG. 13B to make a lane change to the lane of FIG. 13C. In response to the instruction from the server 6, the fourth vehicle 100 illustrated in FIG. 13B may automatically execute, on the basis of the received information, the instructed lane change within the movable range in which the fourth vehicle 100 is prevented from colliding with the third vehicle 100, for example. Thereafter, the fourth vehicle 100 illustrated in FIG. 13B may be mapped as a third vehicle 100 newly added to the lane of FIG. 13C.

As described above, according to the fourth example embodiment, the information on the courses or movable ranges may be generated so that the vehicles 100 avoid traffic congestion.

Note that, in this example embodiment, the server 6 may generate the information on the courses or movable ranges involving lane changing by communicating with the wireless base stations 4 via the dedicated network 5 on the basis of the vehicle operation diagram indicating the traveling conditions that corresponds to a summary of the actual map and the predicted map.

In that case, the information on the courses or movable ranges involving lane changing is likely to be generated at a delayed timing when the vehicles 100 are traveling in a complicated flow, for example, when the vehicles 100 are merging at an exit or a junction of a highway. To address such a concern, multiple servers 6 may be assigned to the respective wireless base stations 4, and the information on the courses or movable ranges involving lane changing may be generated under the distributed control of the servers 6. This helps to minimize the transmission delay of the information.

Fifth Example Embodiment

In the mobility information provision system 1 according to the first example embodiment, the server 6 may be coupled to the dedicated network 5 coupled to the wireless base stations 4. The server 6 and the wireless base stations 4 may be coupled to a private closed network dedicated for the server 6 and the wireless base stations 4.

It may be difficult or may cost much to newly provide the dedicated network 5 for all the roads and regions in which the vehicle 100 travels.

For such a reason, the mobility information provision system 1 may use the Internet 502.

An example that addresses such a situation is described below.

Figure 14:
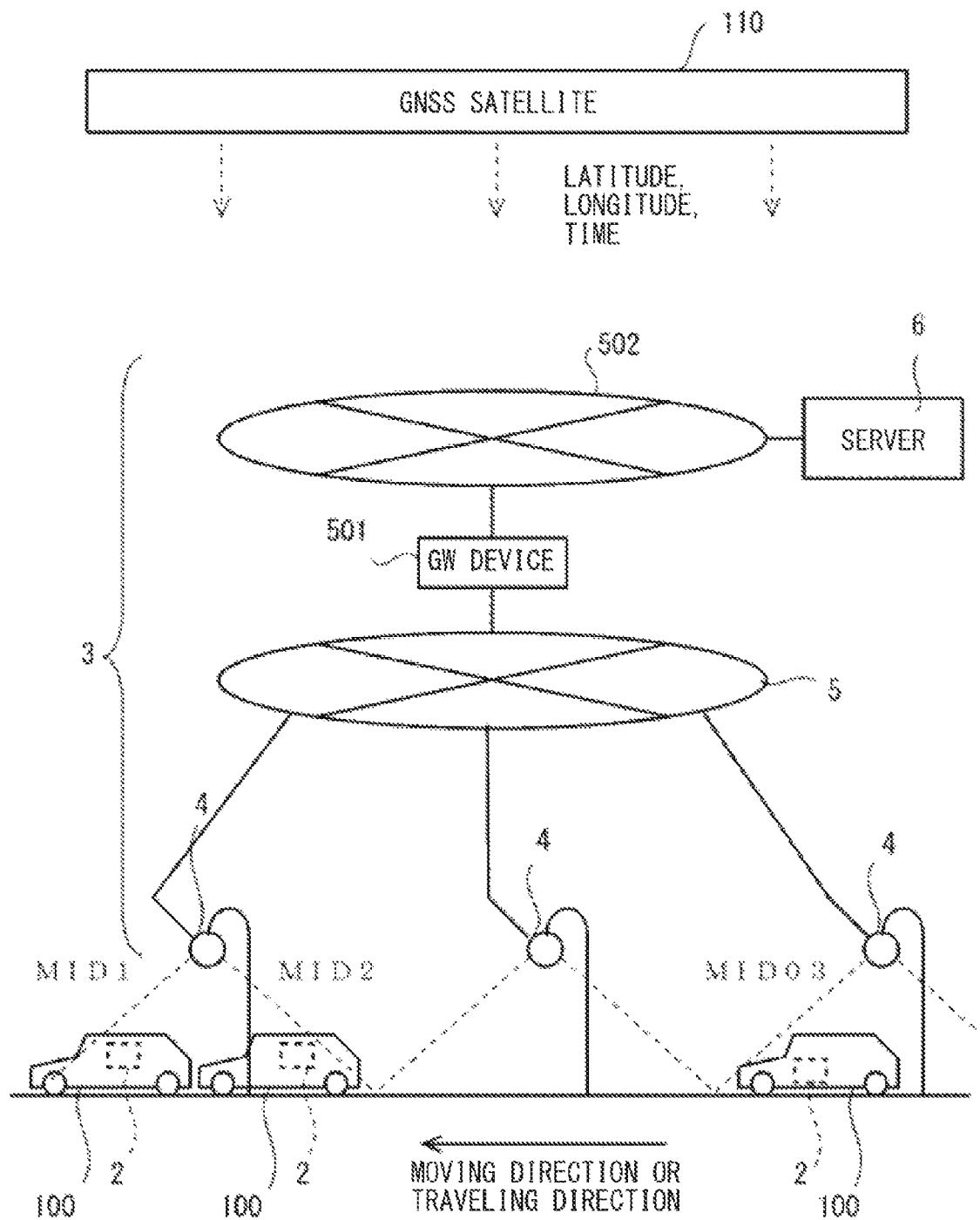
FIG. 14 is an explanatory diagram illustrating a process of generating, by a mobility information provision system for mobile bodies according to one example embodiment, information on a course or a movable range for each lane.

FIG. 14 is an explanatory diagram illustrating a process executed by the mobility information provision system 1 for mobile bodies according to a fifth example embodiment to generate information on courses or movable ranges for each lane.

Referring to FIG. 14, the mobility information provision system 1 may include the wireless base stations 4, the dedicated network 5, a GW device 501, the Internet 502, and the server 6.

The server 6 may be coupled to the Internet 502. The GW device 501 may be coupled to the dedicated network 5 and the Internet 502.

The wireless base stations 4 and the server 6 may perform transmission and reception of information with each other via the dedicated network 5, the GW device 501, and the Internet 502.

FIGS. 15A to 15D illustrate a process executed by the mobility information provision system 1 for mobile bodies according to the fifth example embodiment to generate information on the courses or the movable ranges of the vehicles 100.

Figure 15A:
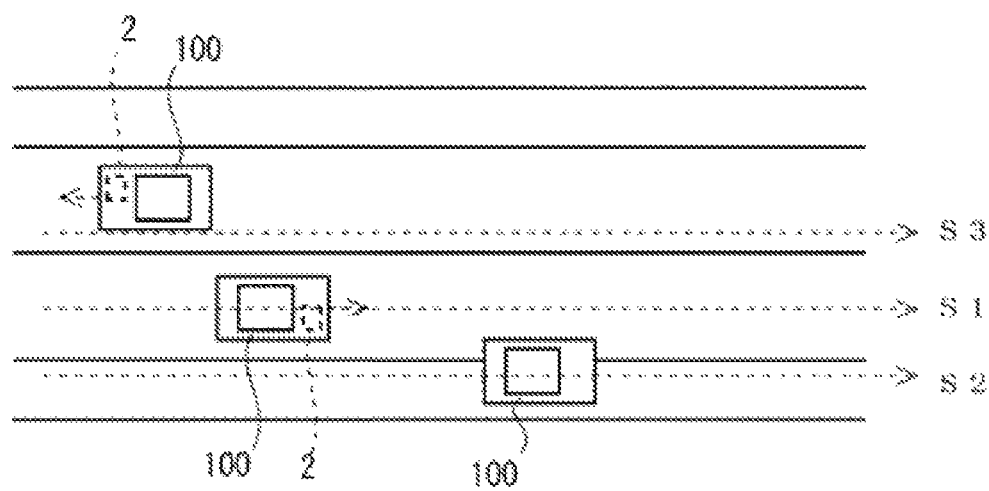
FIGS. 15A to 15D are each an explanatory diagram illustrating a process of generating, by a mobility information provision system for mobile bodies according to one example embodiment, information on a course or a movable range of a vehicle.

FIG. 15A illustrates a road having a first lane and a second lane. The second lane allows for traveling in a direction opposite to that of the first lane. The road illustrated in FIG. 15A may also have road shoulders on both sides of the lanes.

Figure 15B:
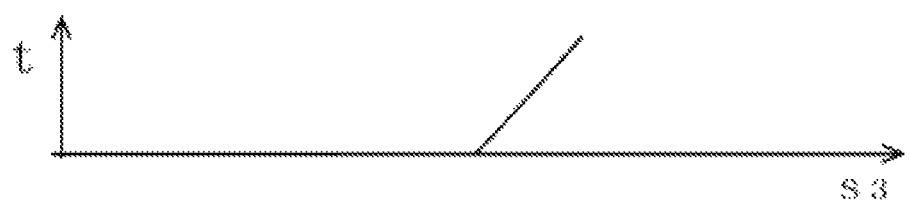

FIG. 15B is a vehicle operation diagram illustrating traveling conditions of the vehicles 100 for a course S3 in which the vehicle 100 traveling on the first lane is deviated from the first lane to travel into the oncoming second lane.

Figure 15C:
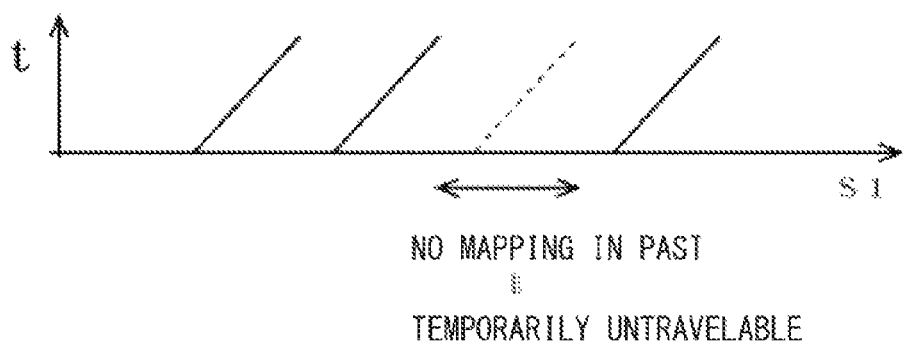

FIG. 15C is a vehicle operation diagram illustrating traveling conditions of the vehicles 100 for a course S1 in which the vehicle 100 traveling on the first lane travels within the first lane to travel.

Figure 15D:
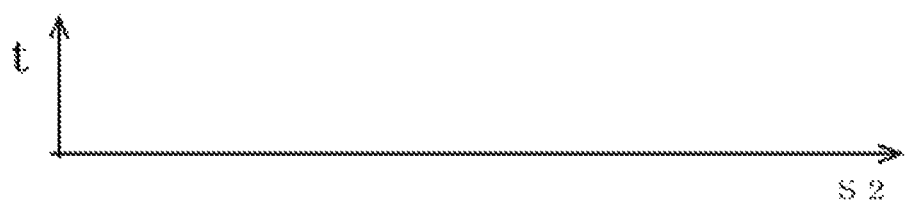

FIG. 15D is a vehicle operation diagram illustrating traveling conditions of the vehicles 100 for a course S2 in which the vehicle 100 traveling on the first lane is deviated from the first lane to travel into one of the road shoulders.

The server 6 may map actual positions of the vehicles 100 on any of the vehicle operation diagrams illustrated in FIGS. 15B to 15D on the basis of the field information on the travel of the vehicles 100 traveling on the first lane. A line of each of the mapped vehicles 100 may have a slope based on the speed of the corresponding vehicle 100. Accordingly, the vehicle operation diagram may include information on an actual map and a predicted map. A plurality of such vehicle operation diagrams allows for sensing of the actual position and the predicted position of each of the vehicles 100.

In a case where such mapping is performed, the following operation may be allowed. For example, referring to FIG. 15A, another vehicle 100 is parked on the road shoulder of the first lane. It may be necessary for the vehicle 100 traveling on the first lane to travel into the oncoming second lane to avoid contact with the other vehicle 100 parked on the road shoulder of the first lane. Accordingly, the server 6 may perform mapping for a section in which the vehicle 100 traveling on the first lane travels to avoid contact with the other parked vehicle 100 on the basis of the current location of the vehicle 100 traveling on the first lane, not on the usual vehicle operation diagram illustrated in FIG. 15C but on the vehicle operation diagram illustrated in FIG. 15B.

For the section in which the vehicle 100 traveling on the first lane travels to avoid contact with the other parked vehicle 100, the server 6 may generate information on a course or a movable range deviated into the oncoming second lane on the basis of a result of the mapping on the vehicle operation diagrams.

As described above, according to the fifth example embodiment, in a case of a temporal road work or a temporal impassable situation, the server 6 may generate the information on the courses or the movable ranges so as to obtain a similar mapping result on the basis of the result of the mapping of the actual positions and the predicted positions based on the vehicle operation diagrams. The server 6 may generate the information on the courses or the movable ranges so as to obtain a similar mapping result on the basis of the mapping result of still another vehicle 100 that has traveled to avoid the other parked vehicle 100. It is possible to generate the information on the courses or the movable ranges suitable for a situation that is not reflected in information of VICS (registered trademark), for example, for a temporal impassable situation including the other parked vehicle 100.

The server 6 may read in advance a particular time in future to pass a particular route or a point with use of the world map based on the vehicle operation diagrams. The server 6 may select, on the basis of the read behavior, which lane or road shoulder to pass through or determine a suitable route to avoid the impassable situation.

In one example, the servers 6 may be provided for the respective wireless base stations 4. In this case, the information on the courses or the movable ranges for deviated traveling may be generated under the distributed control of the servers 6. This helps to minimize the transmission delay of the information.

Sixth Example Embodiment

In the mobility information provision system 1 according to the first example embodiment, the single server 6 may perform the series of processes to generate the information on the courses or the movable ranges on the basis of the field information.

In this case, the server 6 may transmit and receive a great amount of information, and may be under a great process load. It may not be easy to transmit, with use of the Internet 602, such an amount of information with a small delay with securing real-time transmission.

An example that addresses such a situation is described below.

Figure 16:
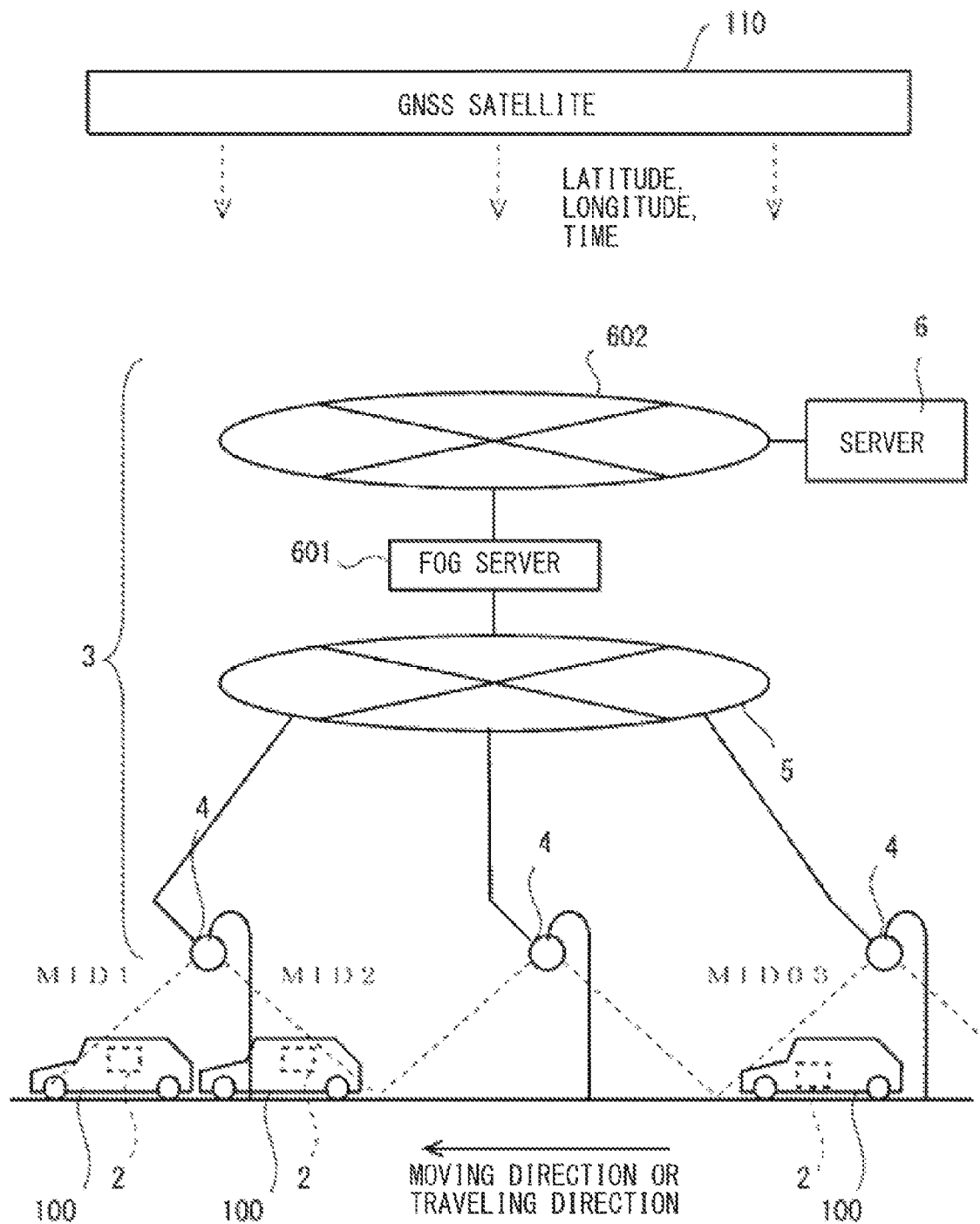
FIG. 16 is a configuration diagram illustrating a mobility information provision system for mobile bodies according to one example embodiment.

FIG. 16 is a configuration diagram illustrating the mobility information provision system 1 for mobile bodies according to a sixth example embodiment of the technology.

The mobility information provision system 1 illustrated in FIG. 16 may further include a fog server 601 and the Internet 602 in addition to the configuration similar to that illustrated in FIG. 1. The server 6 may be coupled to the Internet 602.

The fog server 601 may be coupled to the dedicated network 5 and the Internet 602.

The fog server 601 may receive the field information on the travel of the vehicles 100 from the dedicated network 5 and the wireless base stations 4.

For example, there may be a plurality of vehicles 100 in traffic congestion that are traveling slowly and close to each other within a predetermined distance. The server 6 may put pieces of information of such vehicles 100 into information of a single virtual vehicle 100. A current location of the virtual vehicle 100 may set to, for example, the center of the current locations of the vehicles 100. A speed of the virtual vehicle 100 may be, for example, an average of the speeds of the vehicles 100. The fog server 601 may transmit the information of the virtual vehicle 100 putting together the pieces of information of the vehicles 100 to the server 6 via the Internet 602. The server 6 may receive the information of the virtual vehicle 100 as the field information, generate information of a course or a movable range of the virtual vehicle 100, and transmit the generated information.

The fog server 601 may generate pieces of information of the vehicles 100 from the information on the course or the movable range of the virtual vehicle 100 received from the server 6. For example, the fog server 601 may calculate a difference between the center of the locations of the vehicles 100 (the point where the virtual vehicle 100 is most seen and/or the point where plots are most drawn in a scatter plot made for a predetermined map) used upon generating the current location of the virtual vehicle 100 and the center of the current location of each of the vehicles 100. The fog server 601 may add the calculated difference to the actual position of the virtual vehicle 100 received from the server 6 to obtain the actual position of the corresponding vehicle 100. The fog server 601 may transmit the generated actual position of the vehicle 100 to the server 6. Note that the center of the locations of the vehicles 100 may be the average point of the current locations of the vehicles 100.

As described above, according to the sixth example embodiment, the preliminary processing on the information by the fog server 601 allows for reduction in amount of information in local transmission from the fog server 601 to the server 6. It is expectable to suppress an increase in time to obtain the world map due to the increase in the amount of information.

According to the sixth example embodiment, although the information transmission is performed via the Internet 602 which is an open space shared with other systems, the use of the fog server 601 helps to reduce the amount of transmission performed in the open space, thereby reducing the delay caused in relation to the cloud server 6 coupled to the Internet 602.

Seventh Example Embodiment

The mobility information provision system 1 according to the first example embodiment is described with reference to a case of the single server 6 and the plurality of wireless base stations 4 under the single server 6.

However, in practical use, the mobility information provision system 1 may need to be provided with a plurality of sets each including the server 6 and the wireless base stations 4 under the server 6. In this case, the information related to the traveling vehicles 100 may need to be passed appropriately at a border of two adjacent sets. In a case where the two adjacent sets belong to the single mobility information provision system 1, the information related to the traveling vehicles 100 may be passed appropriately by merely performing transmission and reception of data between the servers 6 in charge of adjacent areas. The servers 6 may serve as edge servers 6. However, in a case where the two adjacent sets belong to different mobility information provision systems 1, it may be difficult to allow for transmission and reception of data between the servers 6 in charge of adjacent areas.

An example that addresses such a situation is described below.

Figure 17:
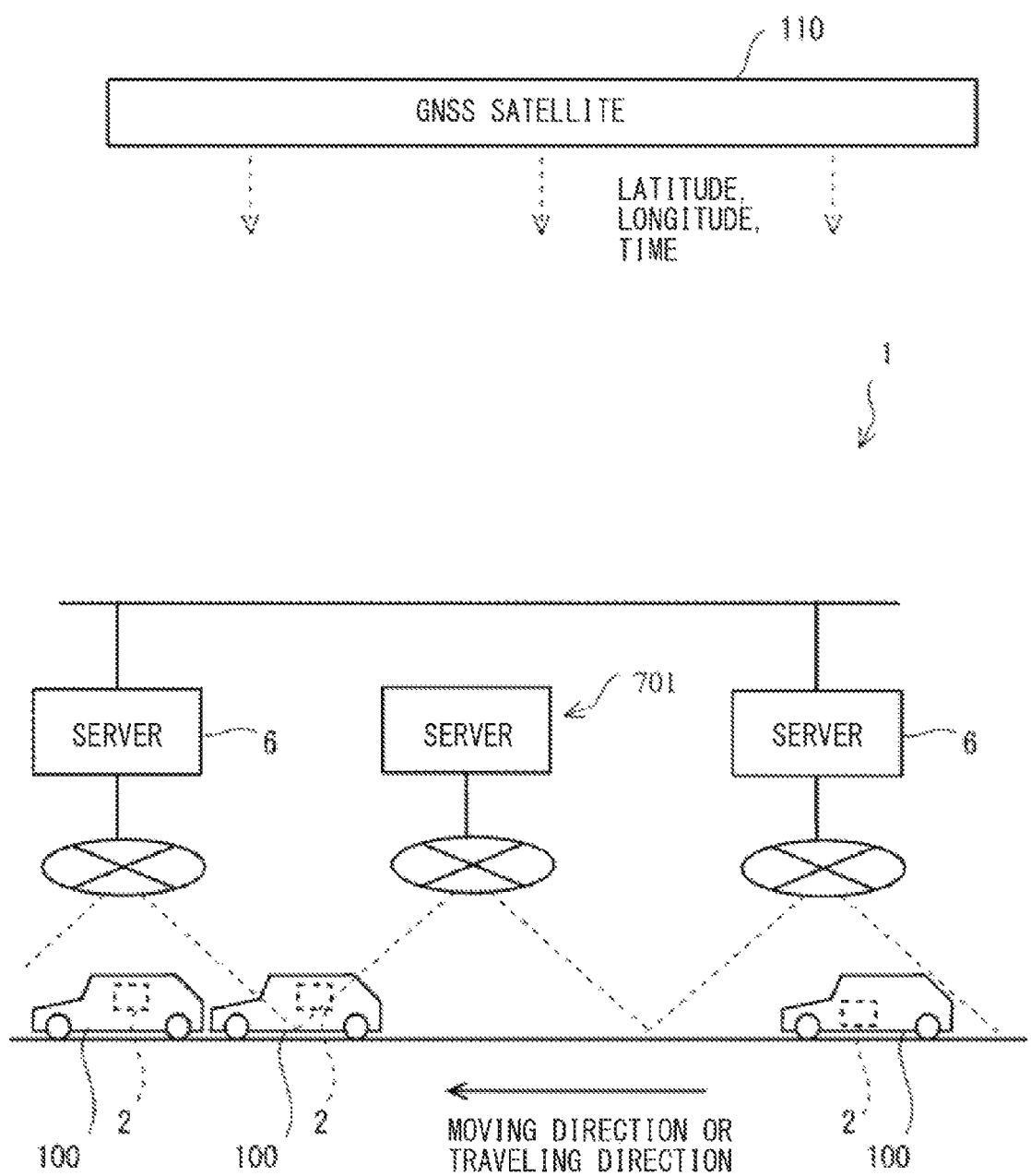
FIG. 17 is a configuration diagram illustrating a mobility information provision system for mobile bodies according to one example embodiment.

Referring to FIG. 17, the mobility information provision system 1 may include a plurality of servers 6 that are in charge of respective areas separated away from each other. Provided between the separated-away areas may be another mobility information provision system 701. The mobility information provision system 701 may include a server, a dedicated network, and a plurality of wireless base stations, as with the mobility information provision system 1. The mobility information provision system 701 may be in charge of an area between the separated-away areas of which the servers 6 of the mobility information provision system 1 according to the first example embodiment are in charge.

In this case, the server 6 in charge of the area accommodating the moving vehicle 100 may transmit the information related to the travel of the vehicle 100 to another server 6 in the system which is in charge of one of the separated-away areas, on the basis of exiting of the vehicle 100 from the area which the server 6 is in charge. When the vehicle 100 enters the area of which the other server 6 in the system is in charge, the other server 6 may transmit the information, which the other server 6 holds, related to the travel of the vehicle 100. This allows the vehicle 100 to receive, without missing, the information provided by the system 3 on the base station side of the mobility information provision system 1 according to the first example embodiment. Therefore, even in a case where the vehicle 100 travels at a high speed through the area of which the mobility information provision system 701 is in charge and moves between the separated-away areas of which the different servers 6 are in charge in a short time, the information related to the vehicle 100 and held by the vehicle 100 is usable by the own vehicle 100.

In such a process, the servers 6 may employ Uplink Classifier (UL CL). In this case, the terminal device 2 may request switching to the server 6 in charge of the area where the vehicle 100 using the terminal device 2 is present. The server 6 may transmit the information of the vehicle 100 using the terminal device 2 to another server 6 in charge of another area located ahead in the moving direction of the vehicle 100. This may allow the other server 6 to transmit the information held for the vehicle 100 on the basis of the entry of the moving vehicle 100 in the area of which the other server 6 is in charge. This helps to reduce uncompleted process.

On this occasion, in one example embodiment, the moving vehicle 100 and the servers 6 may be so coupled to each other that Session and Service Continuity (SSC) is achieved as much as possible.

In "SSC Mode 1", even if the terminal device 2 moves, the communication may be caused to eventually established along a route in the same network to secure the SSC, as in the 4G communication standard. In this case, it is less likely to have an issue if the vehicle 100 passes between the two areas in a short time and the continuity is established in a short time.

In the "SSC Mode 2", if the terminal device 2 moves from a first area to a second area, the coupling in the first area may be temporarily cut, and coupling in the second area may be established.

In the "SSC Mode 3", if the terminal device 2 moves from a first area to a second area, new coupling may be established in the second area while the terminal device 2 keeps the coupling in the first area. In this case, the terminal device 2 may have coupling in both the first area and the second area at the same time. When the terminal device 2 returns to the first area, the coupling to the wireless base station 4 in the first area is still established, which allows for the terminal device 2 to wait for the process of the server 6 in the first area.

Eighth Example Embodiment

The mobility information provision system 1 according to the first example embodiment has been described with reference to an example case where the vehicles 100 travel on a single straight road.

However, a plurality of roads may be merged or may intersect in some cases. For example, at a merging point such as a point where roads are merged or an intersection with no traffic light, a plurality of groups of traveling vehicles 100 may be considered together. On this occasion, if the traveling of each vehicle 100 is changed abruptly or if each vehicle 100 is caused to travel in an unpredictable and unusual way, the user may feel anxious.

An example that addresses such a situation is described below.

In a case where the vehicles 100 are traveling from two or more directions at the merging point such as the point where roads are merged or the intersection without a traffic light, the server 6 may determine whether close-merging is to occur. The close-merging refers to a situation where two or more vehicles 100 traveling from different directions come close to each other at the merging point.

In a case where the close-merging in which two groups of vehicles 100 come close to each other at the merging point is to occur, the server 6 may so generate information on courses or safely movable ranges of the vehicles 100 that a difference in speed between the two groups of the vehicles 100 is reduced and a distance between a preceding vehicle 100 and a following vehicle 100 in each of the groups is increased. Further, the server 6 may transmit the generated information. In this case, the speed of the following vehicle 100 of the vehicles 100 traveling in a row may be decreased more greatly and more gradually.

The vehicle 100 related to the close-merging may control the traveling of the own vehicle on the basis of the information generated by the server 6.

This increases the distance between the preceding vehicle 100 and the following vehicle 100 in each of the groups. This also reduces the speed of each of the groups. The increased distance between the preceding vehicle 100 and the following vehicle 100 in the group with the decreased speed allows for easier entry of the vehicle 100 from the other group. The change in the movement for achieving such a situation becomes slower and is provided with enough time. Therefore, sudden braking or sudden acceleration is not needed. Accordingly, it is less likely that the user on the vehicle 100 is surprised by the movement of the vehicle 100 or feels anxious.

Ninth Example Embodiment

The mobility information provision system 1 according to the first example embodiment supplies the vehicles 100 only with information within a range in which the wireless base stations 4 are communicable.

However, for example, in a case of disaster, the vehicle 100 may need to travel outside of the communicable range of the wireless base stations 4.

An example that addresses such a situation is described below.

Figure 18:
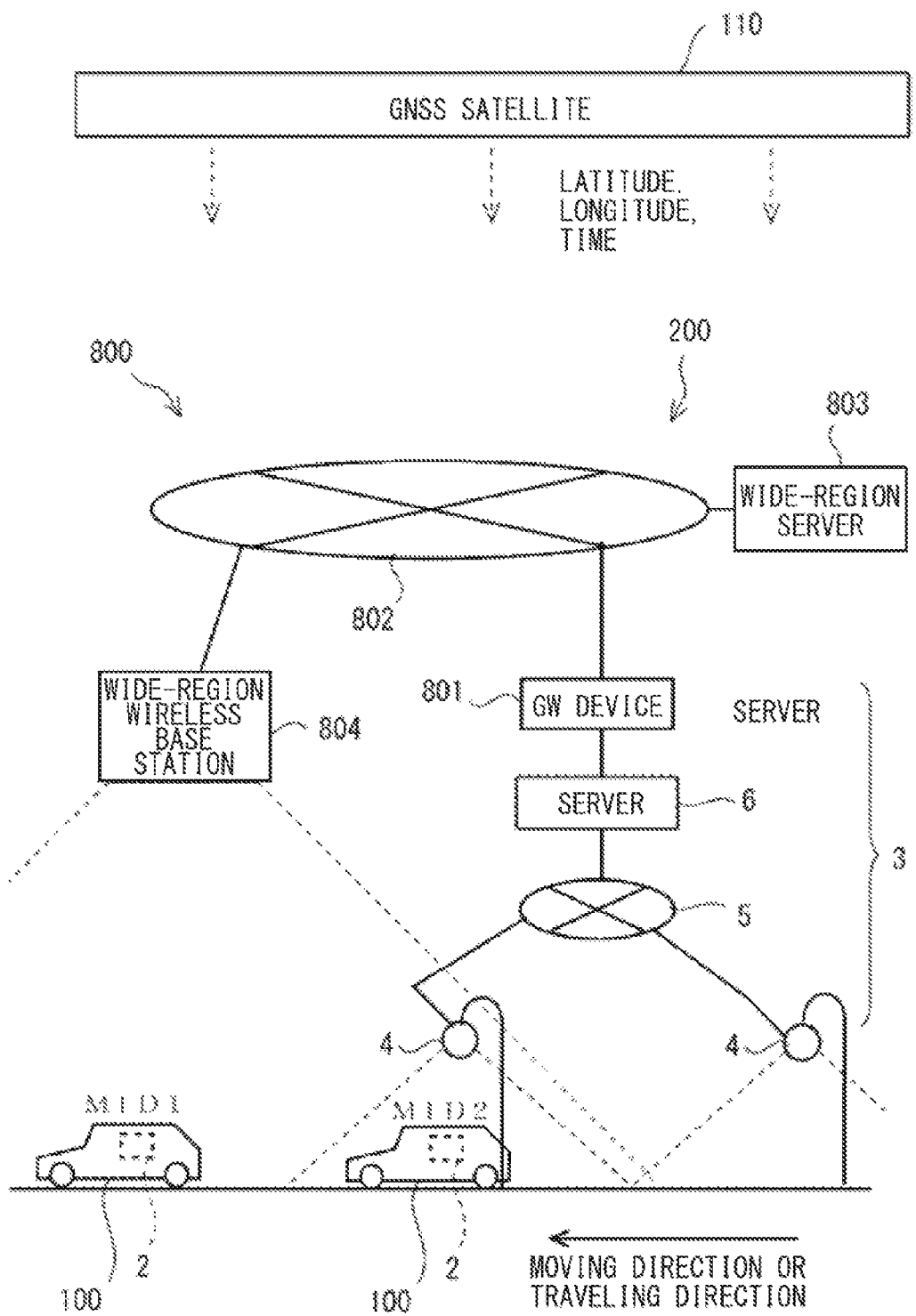
FIG. 18 is a configuration diagram illustrating a mobility information provision system for mobile bodies according to one example embodiment.

FIG. 18 is a configuration diagram illustrating the mobility information provision system 1 for mobile bodies according to a ninth example embodiment of the technology.

The mobility information provision system 1 illustrated in FIG. 18 may further include a GW device 801, the Internet 802, a wide-region server 803, and a plurality of wide-region wireless base stations 804 in addition to the configuration similar to that illustrated in FIG. 1. The GW device 801 may be coupled to the server 6 and the Internet 802.

The wide-region server 803 and the wide-region wireless base stations 804 may belong, for example, to another mobility information provision system 200 different from the mobility information provision system 1 according to the first example embodiment. The mobility information provision system 200 may be provided by another entity, nation, or a group different from that of the mobility information provision system 1 according to the first example embodiment. The mobility information provision system 200 may serve as a part of the mobility information provision system 1.

The wide-region server 803 and the wide-region wireless base stations 804 may be coupled to the Internet 802, and may transmit and receive data via the Internet 802. The Internet 802 may be a public open network.

For example, the wide-region wireless base stations 804 may be provided for respective regions or respective sections of a road greater than those of the mobility information provision system 1. The wide-region wireless base stations 804 may communicate with the terminal devices 2 used in the vehicles 100 accommodated in the region or the section of which the wide-region wireless base station 804 is in charge.

The wide-region server 803 may generate, in a case of disaster, an escape route in a greater region beyond the region of the mobility information provision system 1, and may provide the generated route to the vehicles 100.

For example, a situation such as occurrence of a disaster can prevent the server 6 from performing transmission and reception of data with the wireless base stations 4 via the dedicated network 5 under the server 6 for a certain period. In such a case, the server 6 may transmit a wide-region process request to the GW device 801. The GW device 801 transmit the wide-region process request received from the server 6 to the preset wide-region server 803 via the Internet 802.

Upon receiving the wide-region process request from the server 6, the wide-region server 803 may generate routes for the vehicles 100 controlled by the server 6. On this occasion, the wide-region server 803 may generate an escape route in a greater region beyond the region of the mobility information provision system 1. In one example, the wide-region server 803 may provide a world map and may generate the route on the basis of the world map, as with the server 6. The wide-region server 803 may supply information on the generated route to the wide-region wireless base stations 804. The wide-region wireless base stations 804 may transmit the information on the route to the vehicles 100 accommodated in the regions of which the wide-region wireless base stations 804 are in charge.

The terminal device 2 of each of the vehicles 100 may receive the information on the route from the wide-region wireless base station 804. The control system 20 of the vehicle 100 may cause the own vehicle to move along the obtained route.

Accordingly, the vehicles 100 may each acquire a route in a wider region in which the system 3 on the base station side in the region accommodating the vehicles 100 is not able to give a traveling instruction, and may be allowed to control the own vehicle on the basis of the acquired route. This allows for an escape into a far place beyond the communication range of the system 3 on the base station side in the case of emergency. Even if the communication range of the system 3 on the base station side serving as a fog server is small and is under a disaster, the vehicle 100 is allowed to acquire information for moving from the other mobility information provision system 200 and to thereby escape into a wider region from the disaster region.

Tenth Example Embodiment

In the mobility information provision system 1 according to the first example embodiment, if the vehicle 100 is traveling, the server 6 may generate the actual map and the predicted map on the basis of the field information, and may generate the course or the movable range of each of the vehicles 100 on the basis of a positional relationship on the world maps. Further, the server 6 may transmit the information on the courses or the movable ranges related to the vehicles 100.

The server 6 may transmit the information on the world map such as the actual map to the vehicles 100. However, the world map may basically have a large amount of information. Repetitive transmission of the world map having the large amount of data can cause a great communication load.

An example that addresses such a situation is described below.

The server 6 may determine whether each of the vehicles 100 is at a traveling start timing.

If any of the vehicles 100 is at the traveling start timing, the server 6 may transmit the world map at that time, for example, including the latest actual map and the latest predicted map. The control system 20 of the vehicle 100 is thereby allowed to execute safe traveling control on the basis of the information on the world map even in a situation where it is difficult for the terminal device 2 to communicate with the wireless base stations 4.

Thereafter, the server 6 may acquire a difference between another latest actual map generated as a new world map and the actual map immediately before, and may transmit information on the acquired difference. The control system 20 of the vehicle 100 may update the actual map as the world map with use of the information on the difference. The amount of information on the difference may be smaller than the amount of the information of the world map as a whole. This helps to reduce communication traffic.

Moreover, this provides the world map covering a greater region including the area managed by the single wireless base station 4. Accordingly, even if the information resulting from combining pieces of information of the respective areas is inconsistent, the information is allowed to be adjusted on the basis of the information on the world map. This helps to prevent inconsistent section combining.

Eleventh Example Embodiment

In the mobility information provision system 1 according to the first example embodiment, in a case where the vehicles 100 are traveling, the server 6 may generate the actual map and the predicted map on the basis of the field information, and generate the information on the courses or the movable ranges of the respective vehicles 100 on the basis of the positional relationship on such world maps. Further, the server 6 may transmit the information on the courses or the movable ranges of the vehicles 100.

However, the wireless base stations 4 may perform communication, for example, by dedicated short range communication (DSRC). The vehicle 100 may not necessarily travel in a communicable range of the wireless base stations 4 of the mobility information provision system 1.

An example that addresses such a situation is described below.

The server 6 may transmit the information on the generated courses or the generated movable ranges of the respective vehicles 100 and the information on the world maps including, for example, the actual map and the predicted map. In one example, the server 6 may transmit the information on the world map to the vehicle 100 present in a border range of the wireless base stations 4.

The terminal device 2 of the vehicle 100 may receive, from the wireless base stations 4, the generated information on the courses or the movable range of the respective vehicles 100 and the information on the world maps including, for example, the actual map and the predicted map.

In a case where the terminal device 2 is communicable with the wireless base stations 4, the control system 20 of the vehicle 100 may control the travel of the own vehicle on the basis of the received information on the course or the movable range of the own vehicle.

When the terminal device 2 becomes uncommunicable with the wireless base stations 4, the control system 20 of the vehicle 100 may determine a course or a movable range that allows for safe travel of the own vehicle on the basis of the actual map and the predicted map as the world map which the terminal device 2 has received lastly, and may generate information on such a course or a movable range. The control system 20 of the vehicle 100 may control the travel of the own vehicle on the basis of the information on the course or the movable range of the own vehicle generated by the control system 20 itself.

As described above, according to the eleventh example embodiment, even in a case where the vehicle 100 moves outside the communicable range of the wireless base stations 4, the vehicle 100 is allowed to determine the course or the movable range that allows for safe travel of the own vehicle on the basis of the information on the few-second-later world map that has been received immediately before moving outside the communicable range of the wireless base stations 4, and to generate such a course or a movable range. The vehicle 100 is allowed to determine the course or the movable range that allows for safe traveling of the own vehicle outside the communicable range of the wireless base stations 4, and to generate information on such a course or a movable range, without acquiring information from an alternative system of the system 3 on the base station side of the mobility information provision system 1. This may not require the information from an alternative system such as "ETC2.0 Traffic Congestion Information Service". This reduces an influence of a transmission delay, as in a case where similar information is transmitted by an alternative system.

Twelfth Example Embodiment

In the mobility information provision system 1 according to the first example embodiment, the server 6 may estimate a predicted position from the actual position of the traveling vehicle 100, and generate the information on the safe course or the safe movable range on the basis of the estimation. Further, for the mobility information provision system 1, it may be ideal that only the vehicles 100 controllable by the system are present in the communicable range of the wireless base stations 4.

However, in fact, another vehicle 100 that is uncontrollable by the mobility information provision system 1 may sometimes travel within the communicable range of the wireless base stations 4. The other vehicle 100 may be controlled by another mobility information provision system, or may be performing completely autonomous traveling. There is a possibility that such another vehicle 100 abruptly changes its course which the mobility information provision system 1 does not usually assumes.

An example that addresses such a situation is described below.

The vehicle 100 may receive, from the wireless base stations 4, the generated information on the courses or the movable ranges of the respective vehicles 100, and control the travel of the own vehicle on the basis of the received information on the course or the movable range of the own vehicle.

The vehicle 100 may detect another vehicle 100 around the own vehicle by means of detection performed by an autonomous sensor. The vehicle 100 may determine a possibility of a collision with the other vehicle 100 detected by the autonomous sensor. In a case where there is a possibility of collision with the other vehicle 100 within a few seconds, the control system 20 of the vehicle 100 may change and adjust the course before the collision so as to allow for offset contact of the own vehicle and the other vehicle 100. Thereafter, the control system 20 of the vehicle 100 may cause the offset collision of the own vehicle and the other vehicle 100.

According to the twelfth example embodiment, this helps to prevent the vehicle 100 from being involved in full contact with the other vehicle 100 present around the own vehicle.

Thirteenth Example Embodiment

In the mobility information provision system 1 according to the first example embodiment, the server 6 may estimate a predicted position from the actual position of the traveling vehicle 100, and generate the information on the safe course or the safe movable range on the basis of the estimation, which may not take into consideration collision.

In fact, however, even traveling on the basis of the mobility information provision system 1, the vehicle 100 may not be able to perfectly avoid collision with another mobile body such as another vehicle 100. For example, in a case where the other vehicle 100 abruptly change its course, the own vehicle 100 may not necessarily be able to perfectly avoid collision with the other vehicle 100.

An example that addresses such a situation is described below.

The server 6 may transmit the generated information on the courses or the movable ranges of the respective vehicles 100 and the information on the world maps including, for example, the actual map and the predicted map.

The terminal device 2 of the vehicle 100 may receive, from the wireless base stations 4, the generated information on the courses or the movable ranges of the respective vehicles 100 and the information on the world maps including, for example, the actual map and the predicted map.

Usually, the control system 20 of the vehicle 100 may control the traveling of the own vehicle on the basis of the received information on the course or the movable range of the own vehicle.

When the own vehicle 100 undergoes collision, the control system 20 of the vehicle 100 may confirm safety around the own vehicle on the basis of the detection information of the autonomous sensor as well as the actual map and the predicted map which are the latest world map. In a case where the terminal device 2 is not malfunctioning, the vehicle 100 may be allowed to receive the world map after the collision. The control system 20 of the vehicle 100 may confirm the safety around the own vehicle on the basis of the world map in a disordered state after the collision. A state after the collision of a range unconfirmable by the autonomous sensor may be confirmed on the basis of the world map. The control system 20 of the vehicle 100 may be allowed to, for example, subtly move the position of the own vehicle so as not to cause a secondary damage after the collision.

For example, after the collision at an intersection with poor visibility, the vehicle 100 may attempt to travel rearward in order to increase safety after the collision. In such a case, the rearward traveling may be halted. This may reduce the possibility of collision of the own vehicle 100 with another vehicle 100 or a pedestrian entering the intersection from outside of a visible range.

Fourteenth Example Embodiment

In the mobility information provision system 1 according to the first example embodiment, the server 6 may generate the information on the safe courses or the safe movable ranges individually for the traveling vehicles 100. In this case, the vehicles 100 may travel individually along their respective courses.

However, the vehicles 100 may sometimes move to the same destination.

An example that addresses such a situation is described below.

The terminal device 2 of each of the vehicles 100 may transmit information on a destination or a scheduled route to the server 6.

The server 6 may generate the information on the courses or the movable ranges of the respective vehicles 100 on the basis of the field information received from the vehicles 100. On this occasion, for example, the server 6 may compare the destinations or the scheduled routes of the vehicles 100 on the actual map or the predicted map. The server 6 may group two or more of the vehicles 100 that have the routes at least partially match each other into a single platooning group.

The server 6 may generate information on a course or a movable range of the single platooning group.

The terminal device 2 of the vehicle 100 may receive the information on the course or the movable range of the single platooning group from the wireless base stations 4.

The control system 20 of the vehicle 100 may determine the position or the order of the own vehicle in the platooning group on the basis of the received information. The control system 20 may cause the own vehicle 100 to follow the other preceding vehicle 100 and thereby travel along a route similar to that of the other preceding vehicle 100.

In some cases, another vehicle 100 may attempt to enter between the vehicles 100 in the platooning group as a result of, for example, merging. In this case, the control system 20 of the vehicle 100 that has a possibility to intersect with the other vehicle 100 may so adjust the course of the own vehicle that the inter-vehicle distance between the preceding vehicle and the own vehicle increases.

In some cases, the preceding vehicle in the platooning group may pass the traffic signal but the control system 20 of the own vehicle 100 may stop the own vehicle in response to the traffic signal being turned red.

In such a case, the inter-vehicle distance between the preceding vehicle and the following vehicle may increase. Accordingly, another vehicle 100 not belonging to the platooning group may be present between the preceding vehicle and the following vehicle.

The control system 20 of the respective vehicles 100 in the platooning group may receive the information on the courses or the movable ranges of the common platooning group and may control the vehicles 100 also in such a situation. The control system 20 of the following vehicle in the platooning group may be allowed to continue the traveling along the course in which safety is guaranteed by the preceding vehicle. In a case where the own vehicle is separated away from the preceding vehicle due to interruption by a traffic light or entry of another vehicle during the platooning or any other co-traveling, an advantage of the platooning, which is, traveling in a region with safety guaranteed by the preceding vehicle may be achieved on the basis of the world map.

Fifteenth Example Embodiment

In the mobility information provision system 1 according to the first example embodiment, the server 6 may collect the field information related to the traveling of the traveling vehicles 100, and generate information on safe courses or safe movable ranges for movement of the vehicles 100 on the basis of the collected information. Further, the control system 20 of each of the vehicles 100 may control the traveling of the own vehicle basically on the basis of the information on the safe course or the safe movable range generated by the server 6.

However, there is a possibility that various objects are present on the road on which the vehicle 100 actually travels. Examples of such various objects may include another mobile body not managed by the mobility information provision system 1 and a fallen object.

An example that addresses such a situation is described below.

The mobility information provision system 1 may transmit, to each of the vehicles 100, the information on the course or the movable range of the corresponding vehicle 100 and information on the course or the movable range of another vehicle 100 that is present around the own vehicle and which the mobility information provision system 1 manages.

The terminal device 2 of the vehicle 100 may receive the information on the courses or the movable ranges of the two or more vehicles 100 from the wireless base stations 4.

The control system 20 of the vehicle 100 may control the travel of the own vehicle 100 on the basis of the received information on the course or the movable range of the own vehicle.

Further, the control system 20 of the vehicle 100 may detect the mobile body or the object around the own vehicle by the autonomous sensor. The control system 20 of the vehicle 100 may calculate, on the basis of the information on the course or the movable range of the other vehicle 100 that is present around the own vehicle and which the mobility information provision system 1 manages, a relative direction and a relative distance of the other vehicle 100 with respect to the current location of the own vehicle. The control system 20 of the vehicle 100 may compare the relative direction and the relative distance of the object detected by the autonomous sensor with respect to the current location of the own vehicle and the calculated relative direction and the calculated relative distance. The control system 20 of the vehicle 100 may thereby determine whether the mobile body around the own vehicle is the other vehicle 100 having the traveling controlled by the same mobility information provision system 1. In a case where the mobile body around the own vehicle is not the other vehicle 100 having the traveling controlled by the same mobility information provision system 1, the control system 20 of the vehicle 100 may so control the traveling of the own vehicle as to prevent the vehicle 100 from approaching the mobile body.

Note that the control system 20 of the vehicle 100 may not necessarily perform the comparison on the basis of exact matching. The control system 20 may determine the matching also in a case where the map information and the actual position are slightly different from each other. In one example, the control system 20 of the vehicle 100 may further perform comparison related to the identification information of the vehicle 100.

As described above, according to the fifteenth example embodiment, the control system 20 of the vehicle 100 may determine whether the mobile body around the own vehicle detected by the autonomous sensor is the other vehicle 100 having the traveling controlled by the same mobility information provision system 1. In a case where the mobile body is not the other vehicle 100 having the traveling controlled by the same mobility information provision system 1, the control system 20 of the vehicle 100 may so control the traveling of the vehicle 100 as to prevent the own vehicle from approaching the mobile body.

It may not be easy to determine whether the object present around the own vehicle is the other vehicle 100 having the traveling controlled by the same mobility information provision system 1, on the basis of only the information obtained by the autonomous sensor. According to the fifteenth example embodiment, such a determination may be made more easily with the use of the information of the other vehicle 100 having the traveling controlled by the same mobility information provision system 1. It is easier for the control system 20 of the vehicle 100 to determine whether the object is the other vehicle 100 having the traveling controlled by the same mobility information provision system 1, which the own vehicle is allowed to approach without any concern, or whether the object is something which the own vehicle should be prevented from approaching, such as another vehicle 100 having the traveling controlled by another mobility information provision system.

Sixteenth Example Embodiment

In the mobility information provision system 1 according to the first example embodiment, the server 6 may collect field information related to the travel of the vehicles 100 having the traveling controlled by the mobility information provision system 1.

However, there is a possibility that various objects are present on the road on which the vehicle 100 actually travels. Examples of such various objects may include another mobile body not managed by the mobility information provision system 1 and a fallen object.

Such another vehicle 100 may sometimes perform dangerous driving or tailgating.

An example that addresses such a situation is described below.

The server 6 of the mobility information provision system 1 may collect the information related to the travel of the vehicles 100 having the traveling controlled by the mobility information provision system 1, and may also collect the information related to travel about another vehicle 100 traveling within a communicable range of the wireless base stations 4. In one example, the server 6 may receive the information related to the travel of the other vehicle 100 from another mobility information provision system.

The server 6 may map all of the mobile bodies related to the received information on the actual map and the predicted map serving as the world maps.

Further, the server 6 may compare the position and the traveling state such as the speed of the other vehicle 100 on the previous actual map and those on the current actual map. In a case where a difference resulting from the comparison is equal to or greater than a threshold, the server 6 may pick up the other vehicle 100 as a dangerous traveling vehicle. The factor such as the position or the speed of the vehicle 100 that performs dangerous driving or tailgating may abruptly change as a result of sudden start or sudden deceleration.

The server 6 may so generate the information on the courses or the movable ranges of the vehicles 100 having the travel controlled by the mobility information provision system 1 that any of the vehicles 100 does not intersect with the course of the picked-up dangerous driving vehicle in a short time or that any of the vehicles 100 does not approach the picked-up dangerous driving vehicle.

The terminal device 2 of the vehicle 100 may receive such information on the course or the movable range from the wireless base stations 4.

The control system 20 of the vehicle 100 may control the travel of the own vehicle on the basis of the received information on the course or the movable range of the own vehicle.

In a case where the autonomous sensor detects an interruption in a course or sudden stopping of the dangerous driving vehicle, for example, the control system 20 of the vehicle 100 may cause the own vehicle to stop, lock the own vehicle, and provide information to the world map. Further, the control system 20 of the vehicle 100 may notify a nearby police of information of the vehicle, cause the own vehicle to make a loud alarming sound, and perform transmission of a real-time camera image.

Seventeenth Example Embodiment

The vehicles 100 having the traveling controlled by the mobility information provision system 1 according to the first example embodiment may each be a general vehicle.

However, an emergency vehicle may sometimes travel on the road on which the vehicle 100 actually travels.

An example that addresses such a situation is described below.

The server 6 may transmit the generated information on the courses or the movable ranges of the respective vehicles 100, and may also transmit the information on the world map including, for example, the actual map and the predicted map.

The terminal device 2 of the vehicle 100 may receive, from the wireless base stations 4, the generated information on the courses or the movable ranges of the respective vehicles 100 and the information on the world map including, for example, the actual map and the predicted map.

Usually, the control system 20 of the vehicle 100 may control the travel of the own vehicle on the basis of the received information on the course or the movable range of the own vehicle.

During such usual traveling control, the autonomous sensor of the vehicle 100 may detect another vehicle 100 approaching from behind the own vehicle.

The control system 20 of the vehicle 100 may determine whether the other vehicle 100 approaching from behind the own vehicle is an emergency vehicle. In a case where the other vehicle 100 is not the emergency vehicle, the control system 20 of the vehicle 100 may continue to execute the normal traveling control.

In a case where the other vehicle 100 is the emergency vehicle, the control system 20 of the vehicle 100 may start special traveling control that allows the emergency vehicle to pass by.

In the special traveling control that allows the emergency vehicle to pass by, for example, the control system 20 of the vehicle 100 may acquire information on a space at which the own vehicle is allowed to smoothly arrive and stop, on the basis of the latest world map. The control system 20 of the vehicle 100 may so control the course that the own vehicle 100 immediately enter the space indicated by the acquired information and stop at the space. The control system 20 of the vehicle 100 may change the criterion of the approaching determination based on the autonomous sensor, and may allow for closest approaching. For example, the control system 20 of the vehicle 100 may allow for approaching up to 1 cm, thereby making it difficult to determine approaching on the basis of the autonomous sensor when the emergency vehicle passes by the own vehicle. In a case where the approaching is determined on the basis of the autonomous sensor, the control system 20 of the vehicle 100 may so control the traveling of the own vehicle as to cause the own vehicle to travel away. However, such control may be prevented from being executed while the emergency vehicle is passing by.

As described above, according to the seventeenth example embodiment, in a case where the emergency vehicle suddenly starts traveling for emergency, the control system 20 of the vehicle 100 is allowed to control the traveling of the own vehicle to prioritize the course of the emergency vehicle over that of the own vehicle on the basis of the latest world map that has been received in advance. It is possible to execute irregular traveling control that allows the emergency vehicle to pass by. It may not be necessary for the server 6 to execute any special process that allows the emergency vehicle to pass by.

Eighteenth Example Embodiment

The wireless base stations 4 of the mobility information provision system 1 according to the first example embodiment may be arranged along a road. In one example, the wireless base stations 4 may be provided in respective divisional areas of the region.

However, such wireless base stations 4 may not necessarily operate to allow the vehicles 100 to travel appropriately in a special area such as a tollgate or a parking lot, for example. Unlike a highway, the special area such as the tollgate or the parking lot may sometimes do not have an apparent lane. In such a case, the vehicles 100 may move in separate directions different from a direction directly leading to the tollgate. Further, the special area such as the tollgate or the parking lot may include vehicles 100 belonging to different systems. Any other situation such as sudden running-out of a child, a cat, a dog, a cow, or a dear or an escape of a horse may be assumable. Therefore, if the information on the course or the movable range of each of the vehicles 100 is generated, there is a relatively high possibility that the traveling cannot be performed on the basis of the generated information.

An example that addresses such a situation is described below.

Figure 19:
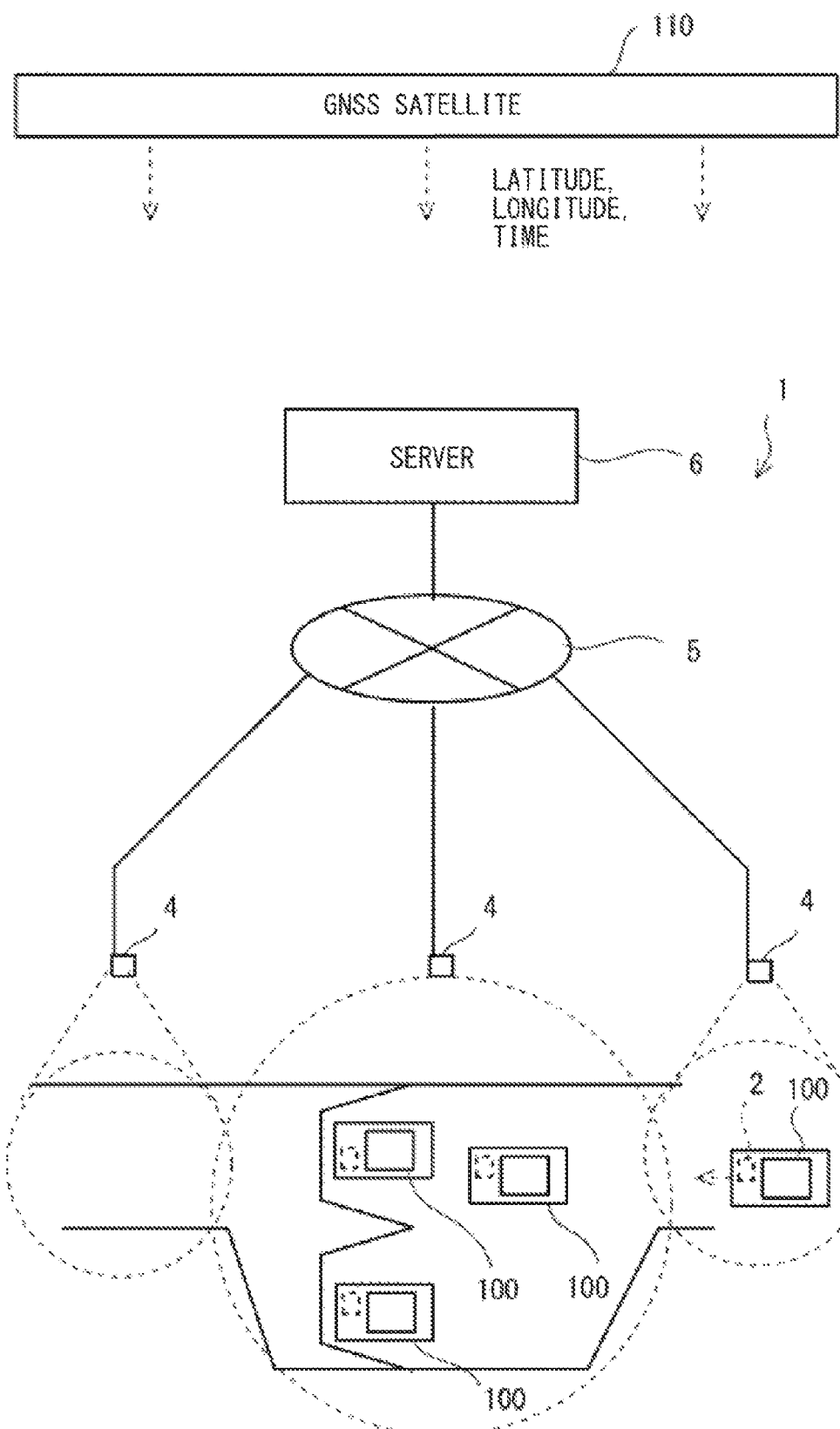
FIG. 19 is a configuration diagram illustrating a mobility information provision system for mobile bodies according to one example embodiment.

FIG. 19 is a configuration diagram illustrating the mobility information provision system 1 for mobile bodies according to an eighteenth example embodiment of the technology.

Referring to FIG. 19, the vehicles 100 may be traveling around a tollgate. The tollgate may include a plurality of passing gates provided side by side.

For example, if a vehicle 100 traveling on the road approaches a place such as the tollgate or a parking lot, the server 6 may stop generating the information on the course or the movable range for that vehicle 100. The server 6 may transmit, to the wireless base stations 4 in the place such as the tollgate or the parking lot, the latest actual map and the latest predicted map as the world map of the place such as the tollgate or the parking lot, unlike to other wireless base stations 4.

The terminal device 2 of the vehicle 100 may receive, from the wireless base stations 4 of the place such as the tollgate or the parking lot, the information on the world map including, for example, the latest actual map and the latest predicted map, instead of the information on the course or the movable range of the own vehicle.

The control system 20 of the vehicle 100 may determine a safe course in the place such as the tollgate or the parking lot on the basis of the acquired world map including, for example, the actual map and the predicted map. The position of the own vehicle may be identifiable on the basis of the unique ID. The control system 20 of the vehicle 100 may start traveling control based on the information on the course or the movable range of the own vehicle determined by the control system 20 itself. For example, the control system 20 of the vehicle 100 may be allowed to select a course toward a not-crowded passing gate, on the basis of the information on a few-second-later predicted map. The control system 20 of the vehicle 100 may be allowed to acquire the information on a movable range up to a few seconds later, and may be allowed to avoid collision in the few seconds.

In a case where it is highly possible that a concern such as collision occurs, the control system 20 of the vehicle 100 may temporarily stop the own vehicle. In this case, the control system 20 of the vehicle 100 may stop the own vehicle until the control system 20 receives new information on the world map.

In one example, the wireless base stations 4 may transmit the information on the latest world map in the server 6 simultaneously to the vehicles 100 in the place such as the tollgate or the parking lot. The open information transmission toward the public space helps to reduce a transmission delay.

As described above, in the place such as the tollgate or the parking lot, the server 6 may stop generating information such as that on the course, and the control system 20 of each of the vehicles 100 may determine the course on the basis of the latest common world map to control the travel. This helps to increase safety as a whole. Note that the terminal device 2 of each of the vehicles 100 may keep the line coupled to the corresponding wireless base station 4 also during the traveling in the place such as the tollgate or the parking lot. When exiting the place such as the tollgate or the parking lot, the control system 20 of each of the vehicles 100 may control the course of the own vehicle on the basis of the newly received information on the course or the movable range.

Nineteenth Example Embodiment

When controlling its own travel on the basis of the own vehicle information, the control system 20 of the vehicle 100 in the mobility information provision system 1 according to the first example embodiment may preferentially use the information acquired by the autonomous sensor over the information received from the wireless base station 4.

However, the autonomous sensor sometimes finds it difficult to exhibit sufficient detection accuracy due to the traveling environment. One possible solution to address such a concern is to add various autonomous sensors so that the control system 20 controls the travel of the vehicle 100 on the basis of comprehensive results of detection by these autonomous sensors. However, increasing the number of autonomous sensors of high detection performance without limitation is unfavorable for the manufacture of the vehicle 100. Moreover, such addition of various autonomous sensors does not necessarily secure sufficient detection accuracy in every traveling environment.

Described below is an example configuration to address such a circumstance.

Figure 20:
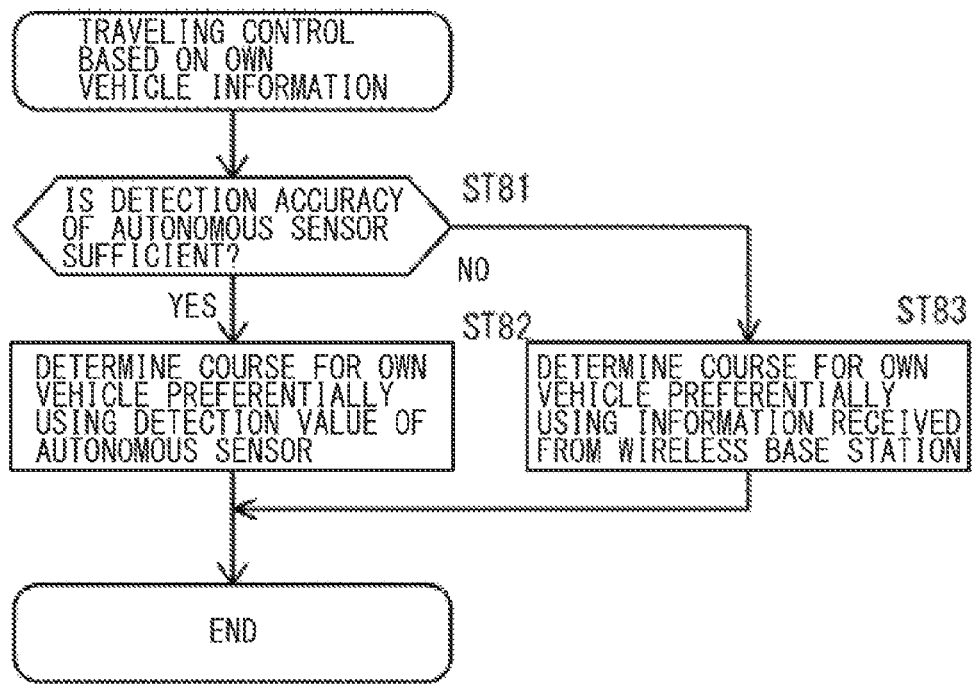
FIG. 20 is a flowchart illustrating a process in Step ST67 of FIG. 9 according to one example embodiment in detail.

FIG. 20 is a flowchart illustrating a process in Step ST67 of FIG. 9 in detail.

The process of FIG. 20 may be executed by the traveling control ECU 24 of the vehicle 100 in Step ST67 of FIG. 9.

In Step ST81, the traveling control ECU 24 may determine whether the autonomous sensor is able to exhibit sufficient detection accuracy. The autonomous sensor may be a stereo camera that captures an image of an environment in front of the vehicle 100, for example. The stereo camera sometimes finds it difficult to capture a clear image of a mobile body around the own vehicle, a lane of the road, or other objects due to backlight or any factors in the peripheral environment. The stereo camera may be allowed to determine whether its detection accuracy is favorable on the basis of, for example, a luminance distribution of a captured image as a whole or a range in which imaging is allowed. If the captured image is clear, the traveling control ECU 24 may determine that the autonomous sensor is exhibiting sufficient detection accuracy (Step ST81: YES), and may cause the process to proceed to Step ST82. If the captured image is unclear, the traveling control ECU 24 may determine that the autonomous sensor is exhibiting insufficient detection accuracy (Step ST81: NO), and may cause the process to proceed to Step ST83.

In Step ST82, the traveling control ECU 24 may preferentially use the detection value of the autonomous sensor over the information received from the wireless base station 4 to determine a course for controlling the travel of the own vehicle.

In Step ST83, the traveling control ECU 24 may preferentially use the information received from the wireless base station 4 over the detection value of the autonomous sensor to determine the course for controlling the travel of the own vehicle. On the basis of the information received from the wireless base station 4, the traveling control ECU 24 may generate pseudo-sensor detection information in the same format and the same physical quantity as those of the detection information of the autonomous sensor. The traveling control ECU 24 may use the pseudo-sensor detection information to determine the course for controlling the travel of the own vehicle.

According to the nineteenth example embodiment described above, the information to be preferentially used may be switched between the detection value of the autonomous sensor and the information received from the wireless base station 4 depending on the detection accuracy of the autonomous sensor. Such a configuration according to the nineteenth example embodiment addresses a temporal loss of the visual field.

For example, when image recognition by the stereo camera is hindered or falls below a threshold due to backlight, the control may be temporally executed preferentially using the world map over the information acquired by the stereo camera. The world map information may be bird's eye view information in a short period of time. Therefore, a past course of a preceding vehicle may be extracted from the world map information. Further, information acquired by the autonomous sensors of the other vehicles 100 may be reflected on the world map information.

In a case where the recognition rate of the autonomous sensor is inappropriate for use, e.g., 80% or less, the traveling control ECU 24 may compare the result of the recognition by the autonomous sensor with the world map information also for automatic brake control. If there is a difference between the result of the recognition by the autonomous sensor and the world map information equal to or greater than the threshold, the traveling control ECU 24 may preferentially use the world map information over the result of the recognition by the autonomous sensor.

In another case where any of the autonomous sensors is exhibiting low detection accuracy, the traveling control ECU 24 may generate the pseudo-sensor detection information based on the world map information, and combine the pseudo-sensor detection information and the information acquired by the other autonomous sensors. On the basis of the combined information, the traveling control ECU 24 may determine the course for controlling the travel of the own vehicle 100.

Twentieth Example Embodiment

The mobility information provision system 1 according to the first example embodiment may be allowed to generate the world map well suitable to an actual traffic situation in a case where the infrastructure including a map and a traffic system such as a traffic light is well prepared and the terminal devices 2 of the considerable number of mobile bodies are present at the time of processing.

However, in a case where the smaller number of vehicles 100 are present, it may be difficult for the mobility information provision system 1 to operate appropriately due to an interference such as a small animal, a moving body outside the mobility information provision system 1, or a temporal non-mobile body such as a large amount of garbage waiting to be collected. Examples of the case where the smaller number of vehicles 100 are present may include a single road in a desert or a field, a snowfield, a grassland, and at night.

For example, it may be highly possible that a motorcycle approaching from a blind spot of the own vehicle, for example, behind the own vehicle, in a situation where the construction accuracy of the world map may be low, such as a single road in a desert or a field, a snowfield, a grassland, or at night, is another vehicle that is not basically covered by the mobility information provision system 1. As the motorcycle has a high-speed tricky move, it can be difficult for the mobility information provision system 1 to predict the movement of the motorcycle.

An example that addresses such a situation is described below.

The terminal device 2 of the vehicle 100 may transmit, to the server 6, auxiliary information on another mobile body provided by the autonomous sensor together with the information on the own vehicle.

The server 6 may determine whether the other mobile body related to the auxiliary information provided by the autonomous sensor is another vehicle 100 which is basically covered by the mobility information provision system 1. In a case where the other mobile body is not the other vehicle 100 which is basically covered by the mobility information provision system 1, the server 6 may deem the other mobile body related to the auxiliary information provided by the autonomous sensor as a new mobile body. The server 6 may map the other mobile body related to the auxiliary information provided by the autonomous sensor on the actual map and the predicted map together with the vehicles 100 basically covered by the mobility information provision system 1. Regarding the mobile body other than the vehicles 100 basically covered by the mobility information provision system 1, the server 6 may determine a type of the mobile body on the basis of accumulated information of actual movement of the mobile body. Examples of the type of the mobile body may include a motorcycle, a bike, a runner, and a pedestrian. The server 6 may obtain the actual position and the predicted position on the basis of the determined type. This may allow the world map including, for example, the actual map and the predicted map, to include information on a course of the mobile body, for example, recognized as a motorcycle. The server 6 may generate the information on the courses or movable ranges of the respective vehicles 100 with a sufficient space with respect to the course of the motorcycle. In one example, on this occasion, the server 6 may generate the information on the course or movable range that deviates from the lane for the own vehicle to travel into a road shoulder or an oncoming lane in order to secure the sufficient space with respect to the course of the motorcycle.

This allows the vehicle 100 to obtain the information on the course or movable range that takes into consideration the movement of the mobile body, such as a motorcycle, that is not basically covered by the mobility information provision system 1, without additionally providing an expensive autonomous sensor such as a camera or a system monitoring outside of the vehicle which is to be provided on a pillar.

According to the twentieth example embodiment, the information on the courses or movable ranges of the respective vehicles 100 may be so generated that the sufficient space is secured with respect to the course of the motorcycle in order to perform operation suitable for a mobile body, such as the motorcycle, other than the vehicles 100 basically covered by the mobility information provision system 1.

In another example case, the world map may include a point to be avoided and the vehicles 100 travel avoiding the to-be-avoided point while shifting lanes from each other. In such a case, the server 6 may detect the to-be-avoided point, for example, as a temporarily blocked road. Further, the server 6 may generate the information on the courses or movable ranges of the respective vehicles 100 with a sufficient space with respect to the to-be-avoided point so that the vehicles 100 similarly avoid the to-be-avoided point. This may allow the server 6 not to determine, as a point not passable by the vehicle 100, the temporarily blocked road that is not passable with a normal course. The course avoiding the to-be-avoided point may be a course that deviates into the road shoulder beside the lane or into the oncoming lane, for example.

Twenty-First Example Embodiment

In the first example embodiment described above, the control system 20 of the vehicle 100 in the mobility information provision system 1 may preferentially use the information acquired by the autonomous sensor over the information received from the wireless base station 4 when controlling the travel of the own vehicle on the basis of the own vehicle information.

However, the autonomous sensor sometimes finds it difficult to exhibit sufficient detection accuracy. For example, the autonomous sensor such as a stereo camera finds it difficult to exhibit sufficient detection accuracy in a case where the vehicle 100 is traveling in an environment in which the visual field is lost, such as a snow field or snowstorm environment. In such an environment, the vehicle 100 can lose its way and become unable to detect the direction to go and an oncoming vehicle suddenly appearing. Thus, the autonomous sensor can work improperly and capture an image only in a limited range.

Described below is an example configuration to address such a circumstance.

On the basis of the world map or the weather information received, the control system 20 of the vehicle 100 may determine a travel section in which the autonomous sensor is expected to fail to detect.

In a case where the vehicle 100 travels in this travel section, the control system 20 of the vehicle 100 may estimate the width of the road in which the vehicle 100 is allowed to travel on the basis of trees on both sides of the road, for example, and determine a course extending in a predicted direction in which the vehicle 100 is allowed to travel. The direction in which the vehicle 100 is allowed to travel may be predicted in the wireless base station 4 on the basis of the images transmitted from the terminal device 2 of the vehicle 100 to the server 6 and the wireless base station 4.

If it is determined that the visual field of the autonomous sensor is completely lost, the control system 20 of the vehicle 100 may preferentially use the pseudo-sensor detection information obtained from the received world map over the detection information of the autonomous sensor even in a case where the traveling control is executed on the basis of the own vehicle information. Note that, however, the detection information of the autonomous sensor may be preferentially used in terms of safety information, such as detection information of an actual collision. When traveling in a snowstorm zone, the vehicle 100 may be generally caused to travel at a speed as low as possible. The control system 20 of the vehicle 100 may determine a course of the vehicle 100 using the pseudo-sensor detection information obtained from the world map. In such a process, the control system 20 of the vehicle 100 may further acquire the number of other vehicles 100 traveling in the zone, actual positions of the other vehicles 100, and a timing at which each of the other vehicles 100 enters the zone, simulate traveling tracks of the other vehicles 100, and determine the course of the vehicle 100 on the basis of the simulated traveling tracks.

When an oncoming vehicle approaching the own vehicle is detected on the basis of the world map, the server 6 or the wireless base station 4 may warn both of the vehicles about the approach. This helps to avoid a collision between the vehicles.

In a case where the oncoming vehicle is outside the control of the mobility information provision system 1 and recognized outside the snowstorm zone, the server 6 or the wireless base station 4 may simulate a predicted passable zone which the own vehicle would pass through on the basis of a predicted time at which the own vehicle would pass by the oncoming vehicle and the traveling tracks of the other vehicles up to the current time. The server 6 or the wireless base station 4 may then warn the own vehicle not to cause interference in the passable zone. If it is difficult to avoid the interference, the simulation may be made so that the interference is avoided at least in a short period of time when the own vehicle passes by the oncoming vehicle.

In a case where the ongoing vehicle, which may be a motorcycle, is outside the control of the mobility information provision system 1 and recognized in the snowstorm zone for the first time, the server 6 or the wireless base station 4 may issue an urgent warning to the vehicles 100 traveling in a specific section, and update the world map. The simulation may be made focusing on ensuring safety (i.e., placing an emphasis on safety) on the basis of an increased number of uncertain factors of the mobile body moving fast. If a pedestrian such as a child is detected, the server 6 or the wireless base station 4 may notify the vehicle 100 traveling closest to the pedestrian of the presence of the pedestrian, and update the world map.

Twenty-Second Example Embodiment

The mobility information provision system 1 according to the first example embodiment may be allowed to generate the world map well suitable to an actual traffic situation in a case where the infrastructure including a map and a traffic system such as a traffic light is prepared and the terminal devices 2 of the considerable number of mobile bodies are present at the time of processing.

However, in a case where the smaller number of vehicles 100 are present such as at night, information related to the actual traveling environment may be insufficient.

An example that addresses such a situation is described below.

The server 6 may generate the world map with the use of the field information collected in the past, for example, from the vehicles 100. This allows to compensate for the lack of information in the world map. The server 6 may generate the world map with the use of the field information collected in the past at a time of day similar to the current time.

According to the twenty-second example embodiment, it is expectable to generate a world map closer to the actual traveling environment at the current time by compensating for the real-time lack of information as a result.

Twenty-Third Example Embodiment

In the mobility information provision system 1 according to the first example embodiment, the control system 20 of the vehicle 100 may control the travel of the own vehicle on the basis of the detection information of the autonomous sensor. In that case, even if the user presses down the accelerator pedal instead of the brake pedal by mistake despite that no pedestrian or no obstacle is recognized, the vehicle 100 is prevented from moving toward the pedestrian or the obstacle.

However, the autonomous sensor mounted on the vehicle 100 does not always work properly at any time. The autonomous sensor can work improperly due to aging degradation. If the detection by the autonomous sensor is improper due to the traveling environment, e.g., backlight or light from an oncoming vehicle traveling in the night, the control system 20 of the vehicle 100 can find it difficult to control the travel of the own vehicle properly on the basis of the detection information of the autonomous sensor.

Described below is an example configuration to address such a circumstance.

The control system 20 of the vehicle 100 may determine whether the detection information of the autonomous sensor is proper. For example, in a case where an image captured by the stereo camera is entirely dark or white, the control system 20 of the vehicle 100 may determine that the detection information of the autonomous sensor is improper. In such a case, the control system 20 of the vehicle 100 may confirm, on the basis of the world map information, the presence of another mobile body moving in the traveling direction. If the other mobile body moving in the traveling direction is confirmed on the basis of the world map information, the control system 20 of the vehicle 100 may determine that there is the other mobile body moving in the traveling direction even though the control system 20 has not confirmed the other mobile body moving in the traveling direction on the basis of the detection information of the autonomous sensor. The control system 20 of the vehicle 100 may then execute the traveling control based on the determination. The control system 20 of the vehicle 100 may execute brake control that stops the vehicle 100 on the basis of the pseudo-sensor detection information obtained from the world map.

For example, in a situation where a pedestrian and another vehicle are recognized on the basis of the world map but are not recognized by the automatic sensor of the own vehicle, the control system 20 of the vehicle 100 may determine the situation and use the pseudo-sensor detection information.

In a case where the determination has been retained for a given time or made in predetermined number of times or more, the control system 20 of the vehicle 100 may set the level of reliability of the pseudo-sensor detection information to a high level. Using the pseudo-sensor detection information set at a high reliability level, the control system 20 of the vehicle 100 may select a course or a time difference that causes the vehicle 100 to avoid interference with the pedestrian or the moving direction of the pedestrian that the autonomous sensor has failed to recognize. On the basis of the course or time difference selected, the control system 20 of the vehicle 100 may execute the traveling control.

Twenty-Fourth Example Embodiment

The mobility information provision system 1 according to the first example embodiment may generate the information on the courses or the movable ranges of the respective vehicles 100.

However, the user of the vehicle 100 may walk away from the vehicle 100, for example, in a case where the vehicle 100 involves any malfunction. The user of the vehicle 100 may also walk away from the vehicle 100, for example, after stopping the vehicle 100 at a place where the vehicle 100 has escaped or for overnight stay in the vehicle 100.

An example that addresses such a situation is described below.

In a case where the user gets off the vehicle 100 and moves away from the vehicle 100, the control system 20 of the vehicle 100 may generate a walking route for the user on the basis of the latest world map the control system 20 has received. The control system 20 may use the information of a plurality of mobile bodies registered in the world map, and generate the walking route that allows the user to arrive at the destination safely avoiding an object such as any of the mobile bodies or a fallen object. For example, in a multiple collision case in which a lot of malfunctioning vehicles are stopped in the scene, the control system 20 may generate a walking route that allows the user to safely move away from the scene without interrupting the course of the following vehicle or the course of the oncoming vehicle.

The control system 20 of the vehicle 100 may transmit, via the terminal device 2, information on the generated walking route to a mobile terminal which the user carries. On this occasion, the control system 20 may also transmit the world map with the scene omitted therefrom, together with the generated walking route to the mobile terminal of the user. This allows the user who has got off the vehicle 100 to follow the navigation of the walking route displayed on the mobile terminal.

Twenty-Fifth Example Embodiment

In the first example embodiment, the control system 20 of the vehicle 100 in the mobility information provision system 1 may switch the operation mode between the automatic driving mode and the driving assist mode that assists the manual driving by the user.

The user of the vehicle 100 needs to take responsibility also for the travel in the automatic driving mode.

For example, when the operation mode of the vehicle 100 is switched from the automatic driving mode to the driving assist mode while the vehicle 100 is traveling, the user needs to take responsibility for operations before and after the switching. Therefore, it is necessary to control the travel of the vehicle 100 so that responsibility for compensation is not generated for the user during the travel in the automatic driving mode including the timing of switching to the driving assist mode.

For example, the user can be in a demanding situation forcing the user to perform a hard braking operation immediately after switching of the operation mode of the vehicle 100 from the automatic driving mode to the driving assist mode. If such a situation actually happens, it can be hard for the user to fully press down the brake pedal.

Described below is an example embodiment that addresses such a concern.

The control system 20 of the vehicle 100 may repeatedly evaluate the reliability of the world map transmitted from the server 6 to the terminal device 2 while the vehicle 100 is traveling. If the reliability of the received world map is low, the control system 20 of the vehicle 100 may prohibit the operation mode of the vehicle 100 from being switched from the manual operation mode to the automatic driving mode.

The control system 20 of the vehicle 100 may repeatedly compare the pseudo-sensor detection information obtained from the world map with the detection information of the autonomous sensor while the vehicle 100 is traveling in the automatic driving mode. In a case where a difference between the pseudo-sensor detection information and the detection information of the autonomous sensor is equal to or greater than a threshold, the control system 20 of the vehicle 100 may refrain from using the pseudo-sensor detection information obtained from the world map. The control system 20 of the vehicle 100 may use the detection information of the autonomous sensor to control the vehicle 100 traveling in the automatic driving mode.

In case of any disturbance, the control system 20 of the vehicle 100 may terminate the automatic driving mode and execute control to switch the operation mode of the vehicle 100 from the automatic driving mode to the manual driving mode. To achieve the switching control, the control system 20 of the vehicle 100 may first control the travel of the own vehicle so that an inter-vehicle distance between the own vehicle and a preceding vehicle is increased. The inter-vehicle distance between the own vehicle and the preceding vehicle may be determined depending on the speed. When the autonomous sensor detects that a predetermined inter-vehicle distance is secured, the control system 20 of the vehicle 100 may notify the user that the automatic driving mode is going to be switched to the manual driving mode. For the detection, the control system 20 of the vehicle 100 may refrain from using the world map information. A few seconds later, the control system 20 of the vehicle 100 may actually switch the operation mode from the automatic driving mode to the manual driving mode.

Securing the inter-vehicle distance between the own vehicle and the preceding vehicle helps to reduce the necessity of a hard braking operation by the user immediately after switching of the operation mode of the vehicle 100 from the automatic driving mode to the driving assist mode. This allows the user to be notified well in advance of switching from the automatic driving mode to the manual driving mode, enabling the user to prepare for starting the manual driving. Accordingly, an urgent circumstance forcing the user to perform a hard braking operation immediately after switching to the manual driving mode is unlikely to occur.

Twenty-Sixth Example Embodiment

In the foregoing example embodiments, the server 6 collects the field information from the vehicles 100 moving in a predetermined zone or section in charge, performs mapping, generates information to be used for determining or controlling the movement of the vehicles 100, and transmits the information to each of the vehicles 100. Each of the vehicles 100 may determine or control its movement using the information received from the server 6.

Alternatively, part or all of the processing executed by the server 6 in the foregoing example embodiments may be executed by each of the vehicles 100, for example. For instance, each of the vehicles 100 collects the field information from the other vehicles 100 as illustrated in FIG. 7, performs mapping on the actual map or the predicted map, generates the information on the movable range or the course to be used for determining or controlling the movement of the own vehicle, and uses the information to determine or control the movement of the own vehicle, e.g., to execute the automatic driving. In that case, the server 6 and the wireless base stations 4 may be used to exchange data between the vehicles 100. Each of the wireless base stations 4 may be provided in a predetermined zone or section in which the vehicle 100 are to move, and communicate with the terminal device 2 used in the vehicle 100 moving in the predetermined zone or section in charge.

In that case, the server 6 may generate primary processed information based on the field information, and transmit the primary processed information.

The terminal device 2 of the vehicle 100 may receive the information generated by the server 6 via the wireless base station 4.

On the basis of the field information or the primary processed information received by the terminal device 2, the control system 20 of the vehicle 100 may generate secondary processed information serving as traveling control data.

The term "primary processed information" used herein may refer to information generated by the server 6 on the basis of the field information. The term "secondary processed information" may refer to information generated by the control system 20 of the vehicle 100 on the basis of the field information or the primary processed information.

Figure 21:
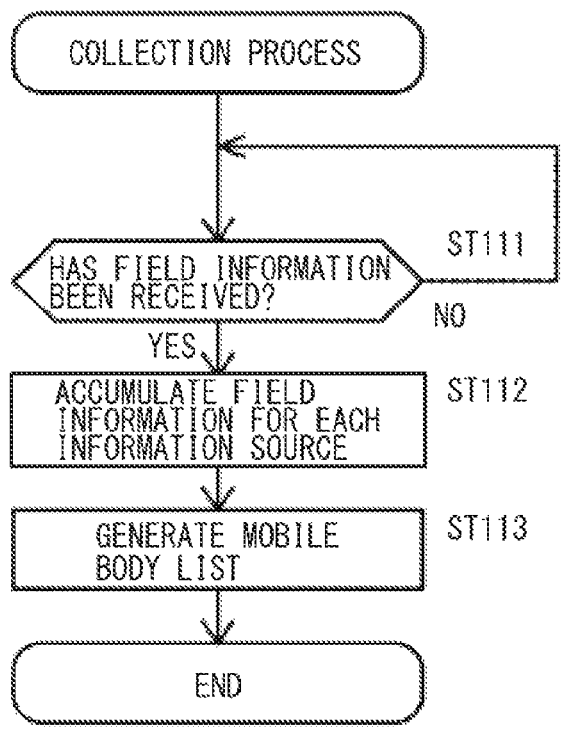
FIG. 21 is a flowchart illustrating a process executed by a server to collect field information on the movement of the vehicles according to one example embodiment.

FIG. 21 is a flowchart of a process executed by the server 6 according to the twenty-sixth example embodiment to collect the field information on movement of the vehicles 100.

The server CPU 14 of the server 6 may repeatedly execute the collection process of FIG. 21 each time the server communication device 11 of the server 6 receives new field information.

In Step ST111, the server CPU 14 may determine whether the server communication device 11 has received the field information. The field information may include, for example, the own vehicle information transmitted by the terminal devices 2 of the respective vehicles 100, and the detection information acquired by detectors such as cameras installed on a road. A non-illustrated server of an advanced traffic system may transmit, to the server 6, traffic information of the region to be managed. The server communication device 11 may receive these pieces of information. If the server communication device 11 has not received the field information (Step ST111: NO), the server CPU 14 may repeat Step ST111. If the server communication device 11 has received the field information (Step ST111: YES), the server CPU 14 may cause the process to proceed to Step ST112.

In Step ST112, the server CPU 14 may classify the received field information according to the information sources and accumulate the classified pieces of field information into the server memory 13. The server memory 13 of the server 6 may thereby accumulate and record the field information on the movement of the vehicles 100. The field information may include information received from the respective vehicles 100, such as information on the vehicles 100 and the users, information on peripheral environments, and traffic information on the region in which each of the vehicles 100 is moving. The server CPU 14 may record a reception time of each piece of field information in connection with the corresponding piece of the field information received.

In Step ST113, the server CPU 14 may generate the mobile body list on the basis of the received field information. The mobile body list may include data on the vehicles 100 to which the server 6 needs to send the information at present. The mobile body list may also include data on other mobile bodies or vehicles 100 to which the server 6 does not need to send the information, in such a manner that the vehicles 100 to which the server 6 needs to send the information are distinguishable from the vehicles 100 to which the server 6 does not need to send the information.

Figure 22:
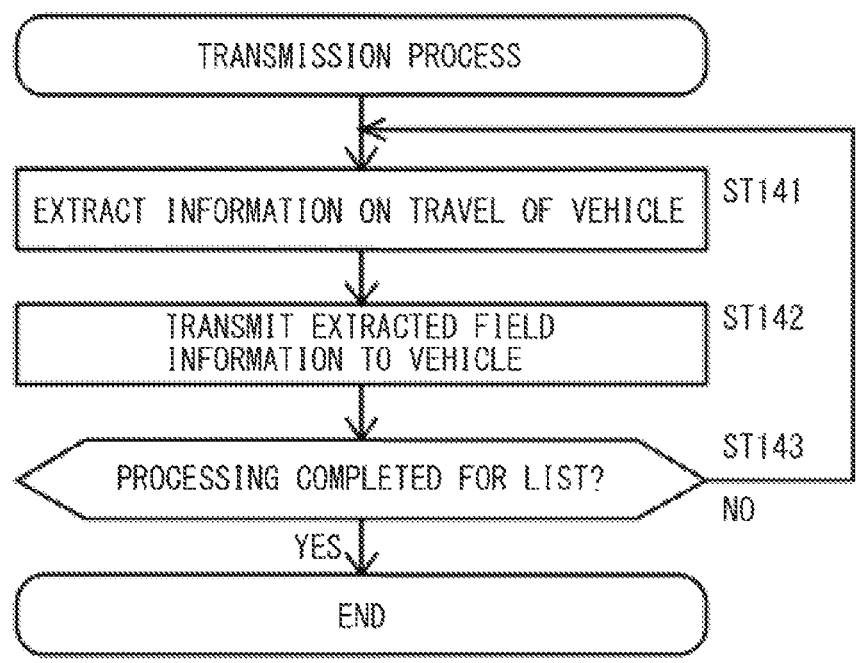
FIG. 22 is a flowchart illustrating a process executed by a server to transmit the collected field information according to one example embodiment.

FIG. 22 is a flowchart illustrating a process executed by the server according to the example embodiment to transmit the collected field information.

The server CPU 14 of the server 6 may repeatedly execute the transmission process of FIG. 22.

In Step ST141, the server CPU 14 may extract the information related to the travel of each of the vehicles 100 from the pieces of the field information recorded in the server memory 13. The server CPU 14 may extract the information related to the travel of any of the vehicles 100 together with the information related to the travel of a preceding vehicle in front of the vehicle 100.

In Step ST142, the server CPU 14 may cause the server communication device 11 to transmit the extracted field information to the communication device 71 of the corresponding vehicle 100. The field information may be transmitted from the server 6 to the wireless base station 4 via the dedicated network 5, and then transmitted from the wireless base station 4 to the terminal device 2 of the corresponding vehicle 100. The wireless base stations 4 may thereby transmit the field information to the terminal devices 2 in the respective vehicles 100.

In Step ST143, the server CPU 14 may determine whether the transmission process has been completed for all the vehicles 100 in the mobile body list. If the transmission process has not been completed for all the vehicles 100 in the mobile body list (Step ST143: NO), the server CPU 14 may cause the process to return to Step ST141. The server CPU 14 may select the vehicle 100 to be processed next and repeat the transmission process from Step ST141 to Step ST143. If the transmission process has been completed for all the vehicles 100 in the mobile body list (Step ST143: YES), the server CPU 14 may end the transmission process of FIG. 22.

In this way, the server 6 may transmit, to the vehicles 100, the field information used for controlling or determining the movement of the vehicles 100. For example, the server 6 may transmit the mobile body list and the primary processed information indicating the traveling direction and the traveling speed of each vehicle 100 together with the field information. The primary processed information may further include information for verification, such as data on an actual position, a current time, and a predicted time after a short period of time from the current time. The server 6 may repeat the processes of FIGS. 21 and 22 to keep transmitting the field information related to a course in a short section to the vehicles 100 in a repeated manner.

Optionally or alternatively, the server 6 may transmit the field information collected from the vehicles 100 to each of the vehicles 100 together with or instead of the extracted field information.

After receiving the field information from the server 6, each of the vehicles 100 may execute the course generation process of FIG. 6 to generate the information on the course of the own vehicle. Note that, in that case, it is not necessary to execute the process of Step ST24 because each of the vehicles 100 has already received the mobile body list or the information based on the mobile body list from the server 6.

Further, each of the vehicles 100 may execute the process of FIG. 9 using the information on the course of the own vehicle generated by the own vehicle to control the travel of the own vehicle.

According to the example embodiment described above, the server 6 collects the field information on the movement of the mobile bodies or vehicles 100, and transmits the collected field information to each of the vehicles 100. Thereafter, each of the vehicles 100 may determine and control the movement of the own vehicle based on the information common to the vehicles 100. On the basis of the information common to the vehicles 100, each of the mobile bodies or vehicles 100 may generate and use the course or the safely movable range in a short section that causes the vehicle 100 to travel avoiding a collision with the other vehicles 100. Accordingly, each of the vehicles 100 is less susceptible to unexpected movement of the other vehicles 100, enhancing mutual safety during the travel of the vehicles 100.

In this example embodiment, the processing executed by the server 6 in the first example embodiment may be performed by each vehicle 100. Similarly, the processing executed by the server 6 in the second to twenty-fifth example embodiments may be executed by each vehicle 100 in this example embodiment. In that case, the processing executed by the server 6 in the foregoing example embodiments may be read as the processing executed by the control system 20 of each vehicle 100. According to this example embodiment, the processing may be executed by the control system 20 of each vehicle 100, rather than by the server 6, in a distributed or individual manner. Each vehicle 100 may execute processing for its own vehicle. Optionally, any of the vehicles 100 may execute processing for another of the vehicles 100 and transmit a result of the processing on behalf of the other vehicle 100 depending on the capacity, for example.

In such a case, the control system 20 of each vehicle 100 may execute all or part of the processing executed by the server 6 in the foregoing example embodiments.

In one example, the server 6 may relay the field information received from the vehicles 100 to each of the vehicles 100. In this example, the control system 20 of each vehicle 100 may execute all the processing—including collecting the field information from the vehicles 100—executed by the server 6 in the foregoing example embodiments.

In another example, the server 6 may receive and collect the field information from the vehicles 100, and transmit the collected field information to each of the vehicles 100. In this example, the control system 20 of each vehicle 100 may execute the processing—after collecting the field information from the vehicles 100—executed by the server 6 in the foregoing example embodiments.

In still another example, the server 6 may receive and collect the field information from the vehicles 100, and perform mapping on the mapping data including the actual map and the predicted map. In this example, the control system 20 of each vehicle 100 may execute the processing subsequent to the processing based on the mapping data described in the foregoing example embodiments.

In either example, the server 6 of the mobility information provision system 1 according to the foregoing example embodiments or the modification examples may collect or relay the field information on the movement of the vehicles 100 moving in a predetermined zone or section under the control of the mobility information provision system 1, in communication with the terminal devices 2 to be used in the respective moving vehicles 100. The server 6 may communicate with the terminal devices 2 usable in the respective mobile bodies or vehicles 100 via the plurality of wireless base stations 4 serving as communication apparatuses. The server 6 may be an integrated server as in the foregoing example embodiments, or may include a plurality of servers 6 distributed to the respective wireless base stations 4, for example. The vehicles 100 or the server 6 may map the collected or relayed field information on the movement of the vehicles 100 on the mapping data, and generate information for determining or controlling the movement of the vehicles 100 on the basis of the mapping data. Alternatively, the vehicles 100 and the server 6 may perform the mapping process and the information generation process in a shared manner. Each of the vehicles 100 may then move on the basis of the information generated for each of the vehicles 100. Accordingly, it is possible to move the vehicles 100 in safety without causing a collision with one another.

It should be understood that the foregoing example embodiments of the technology are mere example, and the technology should not be limited thereto. Various modifications or changes may be made without departing from the gist of the technology.

For example, in the foregoing example embodiments, the server 6 and the control system 20 of each vehicle 100 in the mobility information provision system 1 may operate in cooperation with each other to execute the series of processes described in the foregoing example embodiments.

However, in another example, all of the various processes described in the foregoing example embodiments may be executed by the server 6. In such a case, the control system 20 of each vehicle 100 may transmit information necessary for the processes to the server 6 via the terminal device 2 and the wireless base station 4, and receive a result of the processes from the server 6 via the wireless base station 4 and the terminal device 2. Further, on the basis of the received information, the control system 20 of each vehicle 100 may determine and control the travel of the vehicle 100.

In still another example, the server 6 may execute some of the various processes described in the foregoing example embodiments, and the control system 20 of each vehicle 100 may execute the remaining processes. In that case, the server 6 may only have to collect the field information and transmit the field information to the terminal devices 2 of the respective vehicles 100. The control system 20 of each vehicle 100 may perform all of the processes based on the field information.

In still another example, the control system 20 of each vehicle 100 may execute all of the various processes described in the foregoing example embodiments in place of the server 6. In that case, the processes executed by the server 6 in the foregoing example embodiments may be read as the processes executed by each vehicle 100. The server 6 may relay the information collected from the vehicles 100 to each of the vehicles 100. When relaying the field information, the server 6 may transmit necessary pieces of the field information to each vehicle 100, rather than uniformly transmitting the same field information to each vehicle 100. The necessary pieces of the field information may contain the field information on the other vehicles 100 traveling in a peripheral range of the own vehicle, for example. For instance, the server 6 may classify the field information on the other vehicles 100 traveling in a predetermined section or range according to the roads on which the other vehicles 100 are traveling, and transmit the classified field information to the respective vehicles 100. In still another example, the server may control at least one of the mobile bodies, and the least one of the mobile bodies may be only the vehicle of which the server takes charge.

In still another example, the server 6 may include a plurality of servers 6 distributed to the respective wireless base stations 4. The servers 6 may be distributed according to the stages of the processing, or may be distributed to respective regions so as to cover the respective areas of the wireless base stations 4. The servers 6 distributed to the respective wireless base stations 4 may be provided integrally with the respective wireless base stations 4. In that case, each of the distributed servers 6 may manage data routing of the corresponding wireless base station 4. For example, the distributed server 6 may process the data received from the vehicles 100 promptly and transmit the processed data to the respective vehicles 100. The wireless base station 4 provided with the distributed server 6 helps to minimize the transmission delay of the information. The wireless base station 4 provided with the distributed server 6 may serve as some of the components of the control system 20 of the vehicle 100. For example, the wireless base station 4 provided with the distributed server 6 may execute a part of the processing of the control system 20 of the vehicle 100 on behalf of the control system 20. The processing executed by the server 6 in the foregoing example embodiments may thus be achieved in a distributed manner by the plurality of wireless base stations 4 communicating with one another without via the server 6, for example. In that case, for example, each of the wireless base stations 4 dedicated to the corresponding road may classify the information on the vehicles 100 accommodated in the communication area according to the roads on the basis of the positions within the communication area. The wireless base station 4 may then group the classified pieces of information on the basis of the roads, and relay the grouped information to the other wireless base stations 4. In that case, another server 6 separate from the wireless base stations 4 may be omitted. Further, the processing executed by the server 6 in the foregoing example embodiments may be achieved in a distributed manner by the wireless base stations 4 and the servers 6 operating in cooperation with each other.

In still another example, the wireless base station 4 used together with the server 6 may be a general-purpose wireless base station capable of communicating with a mobile terminal or a wireless base station dedicated to the vehicle 100. For example, the wireless base station 4 of the foregoing example embodiments may be a base station for ADAS communication provided on a roadway. Further, the vehicle 100 may communicate with the base station or the server 6 through another vehicle 100 by, for example, a vehicle-to-vehicle (V2V) communication, rather than directly communicating with the base station or the server 6.

The term "time" used in the description of the mobility information provision system 1 may refer to a time when the vehicle 100 transmits information to the server 6, a time when the server 6 receives the information, a time when the server 6 transmits the processing result to the vehicle 100, a measurement time when the vehicle 100 receives the processing result, a predicted schedule time when the vehicle 100 passes by, or an actual traveling time when the vehicle 100 actually travels in a predicted section. In the case of a closed system, it is possible to shorten the time difference between the vehicle 100 and the server 6.

Each of the server CPU 14 illustrated in FIG. 2 and the control ECUs illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the server CPU 14 and the control ECUs. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the server CPU 14 illustrated in FIG. 2 and the control ECUs illustrated in FIG. 3.

The invention claimed is:

1. A mobility information provision system for vehicle, the mobility information provision system comprising:
communication controllers incorporated in respective vehicles;
wireless base stations configured to provide communication coverage to respective areas, each wireless base station communicating with one of the communication controllers in a respective area when the one of the vehicles having the one of the communication controllers is traveling in the respective areas,
a server coupled to the wireless base stations, the server being configured to:
acquire first information related to movement of the vehicles traveling a road, the road including a first lane and a second lane adjacent to the first lane;
identify respective actual positions and respective predicted positions of the vehicles based on the first information;
generate, based on the first information,
first operation data representing a first operation diagram including (1) a first axis indicating a positional relationship among vehicles, including a first vehicle, in the first lane, (2) a second axis, perpendicular to the first axis, indicating time from current time, and (3) lines respectively corresponding to the vehicles in the first lane and each line showing a respective vehicle in first lane moving from an actual position at the current time to a predicted position at future time, a slope of each line indicating a speed of the respective vehicle in the first lane,
second operation data representing a second operation diagram including (1) a third axis indicating a positional relationship among vehicles, including a second vehicle, in the second lane, (2) a fourth axis, perpendicular to the third axis, indicating the time from the current time, and (3) lines respectively corresponding to the vehicles in the second lane and each line showing a respective vehicle in second lane moving from an actual position at the current time to a predicted position at the future time, a slope of each line indicating a speed of the respective vehicle in the second lane,
determine
courses or movable ranges for the vehicles in the first lane to travel to the respective predicted positions based on the first operation diagram wherein the courses or movable ranges are so determined that, in the first operation diagrams, one of the lines corresponding to the first vehicle is prevented from being closer to, or crossing, another one of the lines in order to avoid the first vehicle from colliding with another vehicle in the first lane, and
courses or movable ranges for the vehicles in the second lane to travel to the respective predicted positions based on the second operation diagram wherein the courses or movable ranges are so determined that, in the second operation diagrams, one of the lines corresponding to the second vehicle is prevented from being closer to, or crossing, another one of the lines in order to avoid the second vehicle from colliding with another vehicle in the second lane; and
generate second information on a basis of the courses or the movable ranges for the vehicles in the first lane and the vehicles in the second lane,
wherein each wireless base station transmits the second information to the one of the communication controllers in the respective area, and
wherein when the server determines based on the first information that the first vehicle changes a lane from the first lane to the second lane, the server maps the first vehicle in the second operation diagram and determines a course or a movable range for the first vehicle in the second lane based on the second operation diagram.

2. The mobility information provision system for vehicles according to claim 1, wherein each wireless base station is configured to repeatedly receive, from the one of the communication controllers in the respective area, the first information including current information, past information, or both of the one of the vehicles.

3. The mobility information provision system for vehicles according to claim 1, wherein
the wireless base stations are configured to be coupled to each other via a dedicated network, and
each wireless base station are each is configured to transmit, to the one of the communication controllers in the respective area, third information related to movement of the vehicles.

4. The mobility information provision system for vehicles according to claim 1, wherein each communication controllers is configured to provide a respective vehicle with the second information received from any of the wireless base stations.

5. The mobility information provision system for vehicles according to claim 1, wherein each vehicle is configured to determine or control its movement on a basis of the second information from a respective communication controller.

6. A server configured to be coupled to wireless base stations in a mobility information provision system for vehicles,
the mobility information provision system comprising:
communication controllers incorporated in respective vehicles;
wireless base stations configured to provide communication coverage to respective areas, each wireless base station communicating with one of the communication controllers in a respective area when the one of the vehicles with the one of the communication controllers is traveling in the respective area; and
the server comprising a processor, the processor configured to:
acquire first information related to movement of the vehicles traveling a road, the road including a first lane and a second lane adjacent to the first lane;
identify respective actual positions and respective predicted positions of the vehicles based on the first information;
generate, based on the first information,
first operation data representing a first operation diagram including (1) a first axis indicating a positional relationship among vehicles, including a first vehicle, in the first lane, (2) a second axis, perpendicular to the first axis, indicating time from current time, and (3) lines respectively corresponding to the vehicles in the first lane and each line showing a respective vehicle in first lane moving from an actual position at the current time to a predicted position at future time, a slope of each line indicating a speed of the respective vehicle in the first lane second operation data representing a second operation diagram including (1) a third axis indicating a positional relationship among vehicles, including a second vehicle, in the second lane, (2) a fourth axis, perpendicular to the third axis, indicating the time from the current time, and (3) lines respectively corresponding to the vehicles in the second lane and each line showing a respective vehicle in second lane moving from an actual position at the current time to a predicted position at the future time, a slope of each line indicating a speed of the respective vehicle in the second lane, determine courses or movable ranges for the vehicles in the first lane to travel to the respective predicted positions based on the first operation diagram, wherein the courses or movable ranges are so determined that, in the first operation diagram, one of the lines corresponding to the first vehicle is prevented from being closer to, or crossing, another one of the lines in order to avoid the first vehicle from colliding with another vehicle in the first lane, and courses or movable ranges for the vehicles in the second lane to travel to the respective predicted positions based on the second operation diagram wherein the courses or movable ranges are so determined that, in the second operation diagrams, one of the lines corresponding to the second vehicle is prevented from being closer to, or crossing, another one of the lines in order to avoid the second vehicle from colliding with another vehicle in the second lane; and generate second information on a basis of the courses or the movable ranges for the vehicles in the first lane and the vehicles in the second lane; and transmit the generated second information to the communication controllers in the respective vehicles via the wireless base stations, wherein each wireless base station transmits the second information to the one of the communication controllers in the respective area, and wherein when the processor determines based on the first information that the first vehicle changes a lane from the first lane to the second lane, the server maps the first vehicle in the second lane in the second operation diagram and determines a course or a movable range for the first vehicle in the second lane based on the second operation diagram.

7. The server according to claim 6, wherein the processor is configured to acquire, from the vehicles, as the first information, one of information related to movement of any of the vehicles, information unique to any of the vehicles, information on surroundings of any of the vehicles, and regional information.

8. The server according to claim 6, wherein the processor is further configured to:

map, on an actual map, the respective actual positions of the vehicles estimated on a basis of the acquired first information;

estimate the respective predicted positions of the vehicles in future on a basis of the actual map and any of traveling directions, traveling speeds, and traveling states of the respective vehicles estimated on the basis of the acquired first information, and to map the estimated predicted positions on a predicted map;

generate the courses or movable ranges from the respective actual positions in the actual map to the respective predicted positions in the predicted map, the courses being generated based on determining that 1) a first course of a first vehicle of the vehicles from an actual position of the first vehicle to a predicted position of the first vehicle does not intersect with a second course of another vehicle of the vehicles from an actual position of the another vehicle to a predicted position of the another vehicle or 2) the first course of the first vehicle intersects with the second course of the another vehicle with a time lag, the movable ranges being generated based on determining that a movable range of the first vehicle does not overlap with a movable range of the another vehicle; and generate the second information on a basis of the courses or the movable ranges.

9. The server according to claim 6, wherein the server comprises a plurality of distributed servers.

10. A vehicle configured to serve as any of the vehicles in the mobility information provision system for vehicles according to claim 1, the vehicle having one of the communication controllers and comprising a movement controller configured to control its movement on a basis of the second information received by the one of the communication controllers from any of the wireless base stations, the second information including information used to control the movement of the vehicle, wherein the movement controller is configured to determine a course of the vehicle on a basis of one of (1) third information related to the movement of the vehicles received by the communication controllers and (2) the second information and to control or assist travel of the vehicle on a basis of a determined course.

11. The vehicle according to claim 10, further comprising an autonomous sensor configured to detect any of information related to the movement of the vehicle, user information of the vehicle, vehicle unique information, information on surroundings of the vehicle, and regional information, wherein the one of the communication controllers of the vehicle is configured to transmit current or past information detected by the autonomous sensor to one of the wireless base stations for one of the areas in which the vehicle is present, the current or past information detected by the autonomous sensor serving as the first information.

12. The vehicle according to claim 10, wherein the movement controller includes:

a receiver configured to receive the third information related to the movement of the vehicles;

a generator configured to generate fourth information on a basis of the third information from the receiver, the fourth information being used to determine the movement of the vehicle, to control the movement of the vehicle, or both; and a traveling controller configured to determine the movement of the vehicle, to control the movement of the vehicle, or both, on a basis of the fourth information.

13. The vehicle according to claim 12, wherein
the generator is configured to generate as the fourth information, information on a course or a movable range for the vehicle to travel, on a basis of the third information from the receiver, and
the traveling controller is configured to determine a traveling course of the vehicle on a basis of the fourth information, and to control the movement of the vehicle to travel along the determined traveling course.

14. The vehicle according to claim 12, wherein the generator is configured to:
map, on an actual map, actual positions of the respective vehicles estimated on a basis of the third information from the receiver;
estimate predicted positions of the respective vehicles in future on a basis of the actual map and any of traveling directions, traveling speeds, and traveling states of the respective vehicles estimated on the basis of the field third information from the receiver, and to map the estimated predicted positions on a predicted map; and
generate, as the fourth information, courses or movable ranges for the vehicles from the respective actual positions in the actual map to the respective predicted positions in the predicted map.

15. The vehicle according to claim 12, wherein the generator is further configured to:
map positions of the respective vehicles on a basis of the third information from the receiver, the positions of the respective vehicles to be mapped including at least actual positions of the respective vehicles predicted positions of the respective vehicles; and
generate as the fourth information, information on courses or movable ranges for the vehicles to travel, on a basis of the third information on the mapped positions of the vehicles.

16. The mobility information provision system for vehicles according to claim 1, wherein the server is further configured to:
map, on an actual map, the respective actual positions of the vehicles estimated on a basis of the acquired first information;
estimate the respective predicted positions of the vehicles in future on a basis of the actual map and any of traveling directions, traveling speeds, and traveling states of the respective vehicles estimated on the basis of the acquired field first information, and to map the estimated predicted positions on a predicted map;
generate the courses or movable ranges from the respective actual positions in the actual map to the respective predicted positions in the predicted map, the courses being generated based on determining that a course of the one of the vehicles from an actual position to a predicted position does not intersect with a course of the other another of the vehicles from an actual position to a predicted position, or intersects with the course of another of the vehicles with a time lag, the movable ranges being generated based on determining that a movable range of the one of the vehicles does not overlap with a movable range of the other of the vehicles; and
generate the second information on a basis of the courses or the movable ranges.

17. The vehicle according to claim 10, wherein the movement controller is configured to:
acquire a current location of the vehicle detected by an autonomous sensor;
compare an actual position of the vehicle included in the second information and the current location; and
control the movement of the vehicle based on a result of comparing the actual position and the current location.

18. The vehicle according to claim 17, wherein the movement controller configured to:
determine whether the autonomous sensor exhibits sufficient detection accuracy;
when the autonomous sensor is determined to exhibit insufficient detection accuracy, control the movement of the vehicles on a basis of the second information received by the communication controller from any of the wireless base stations, the second information received by the communication controller including the information used to determine the movement of the corresponding one of the vehicles or the information used to control the movement of the corresponding one of the vehicles; and
when the autonomous sensor is determined to exhibit sufficient detection accuracy, control the movement of the vehicle on a basis of information detected by the autonomous sensor.

\* \* \* \* \*